United States Patent
Kim

(10) Patent No.: US 12,085,838 B2
(45) Date of Patent: Sep. 10, 2024

(54) CAMERA MODULE

(71) Applicant: LG INNOTEK CO., LTD., Seoul (KR)

(72) Inventor: Chul Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 93 days.

(21) Appl. No.: 17/797,581

(22) PCT Filed: Feb. 10, 2021

(86) PCT No.: PCT/KR2021/001784
§ 371 (c)(1),
(2) Date: Aug. 4, 2022

(87) PCT Pub. No.: WO2021/162450
PCT Pub. Date: Aug. 19, 2021

(65) Prior Publication Data
US 2023/0076838 A1    Mar. 9, 2023

(30) Foreign Application Priority Data

Feb. 13, 2020 (KR) .................. 10-2020-0017599
Jun. 26, 2020 (KR) .................. 10-2020-0078434

(51) Int. Cl.
| | |
|---|---|
| *G01S 17/894* | (2020.01) |
| *G02B 7/02* | (2021.01) |
| *G02B 27/58* | (2006.01) |
| *G03B 15/05* | (2021.01) |
| *H04N 23/56* | (2023.01) |

(Continued)

(52) U.S. Cl.
CPC ............ *G03B 15/05* (2013.01); *G01S 17/894* (2020.01); *G02B 27/58* (2013.01); *H04N 23/56* (2023.01); *H04N 23/951* (2023.01); *G02B 7/02* (2013.01); *G03B 2215/0503* (2013.01); *G03B 2215/0567* (2013.01); *G03B 2215/0592* (2013.01); *H01F 7/081* (2013.01)

(58) Field of Classification Search
CPC ...... G01S 17/894; H04N 23/56; G02B 27/58; G02B 7/02
USPC .......................................................... 348/370
See application file for complete search history.

(56) References Cited

U.S. PATENT DOCUMENTS

| | | | |
|---|---|---|---|
| 9,325,973 B1 | 4/2016 | Hazeghi et al. | |
| 2006/0214084 A1 | 9/2006 | Barnes et al. | |
| 2016/0278613 A1* | 9/2016 | Kuriyama ............ | A61B 1/0646 |

(Continued)

FOREIGN PATENT DOCUMENTS

| | | |
|---|---|---|
| CN | 108337492 A | 7/2018 |
| EP | 3 407 601 A1 | 11/2018 |

(Continued)

*Primary Examiner* — Joel W Fosselman
(74) *Attorney, Agent, or Firm* — Birch, Stewart, Kolasch & Birch, LLP

(57) ABSTRACT

Disclosed according to an embodiment of the present invention is a camera module, comprising: a light source; an optical unit which converts light, output by the light source, into a planar form or a multi-point form and outputs same; and an image sensor, wherein the light source is periodically turned on/off, and when the light source is turned on, the optical unit moves to be positioned in a first position, and when the light source is turned off, the optical unit moves to the initial position thereof.

9 Claims, 67 Drawing Sheets

(a)

(b)

(51) Int. Cl.
*H04N 23/951* (2023.01)
*H01F 7/08* (2006.01)

(56) References Cited

U.S. PATENT DOCUMENTS

2019/0313007 A1    10/2019   Kim
2021/0099618 A1*    4/2021   O ........................... H04N 23/51

FOREIGN PATENT DOCUMENTS

| EP | 3 502 767 A1 | 6/2019 |
| KR | 10-0181797 B1 | 4/1999 |
| KR | 10-2007-0118654 A | 12/2007 |
| KR | 10-2010-0097920 A | 9/2010 |
| KR | 10-2019-0110231 A | 9/2019 |
| WO | WO 2019/209064 A1 | 10/2019 |

\* cited by examiner

[FIG. 1]
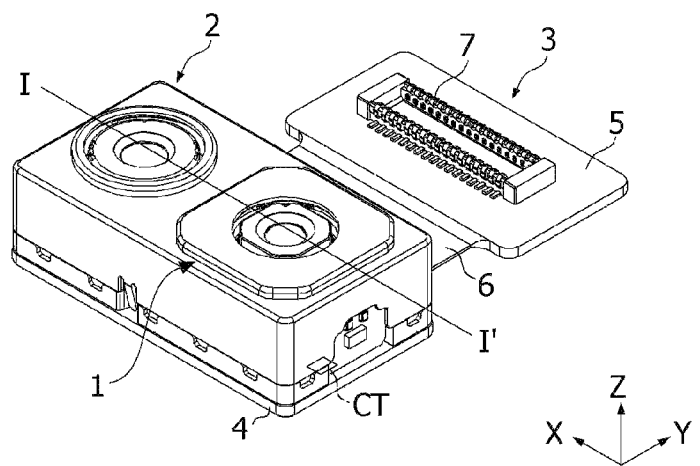
[FIG. 2]
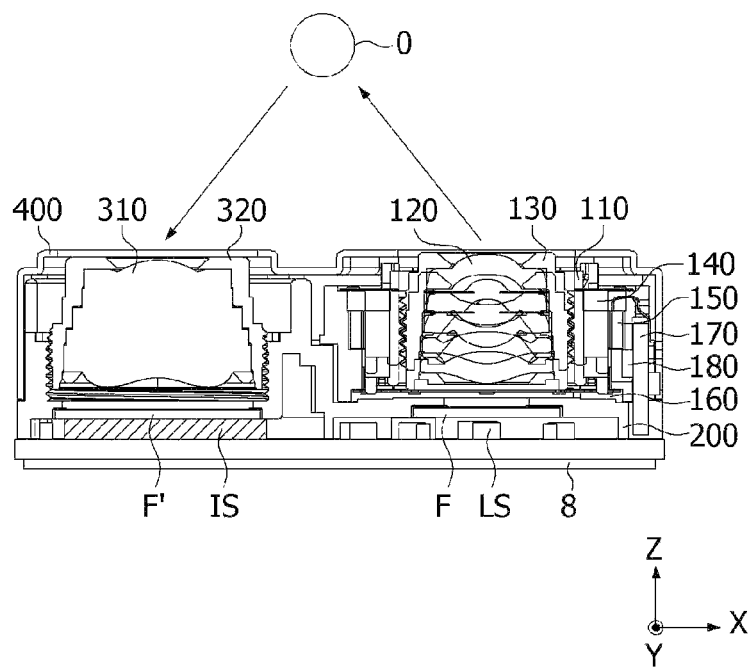

[FIG. 3]
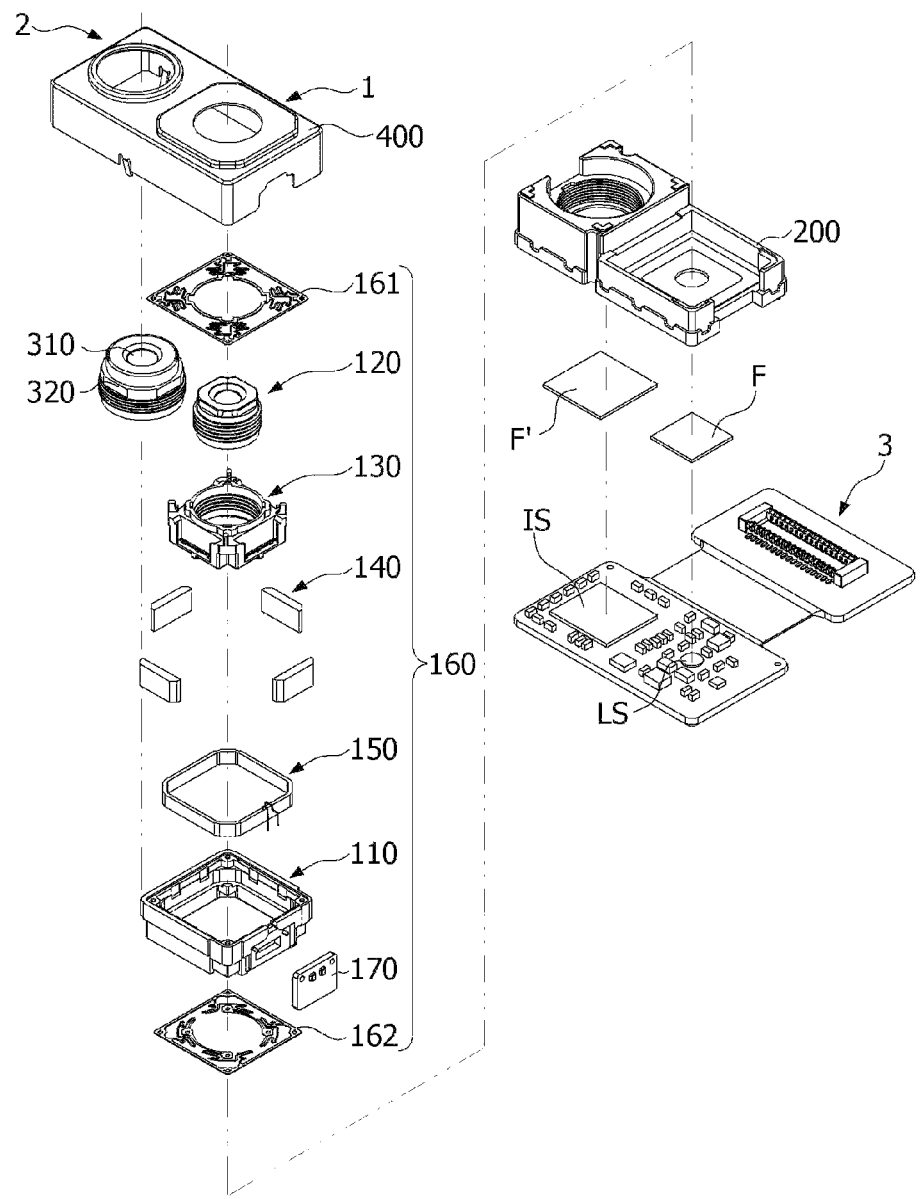

[FIG. 4]
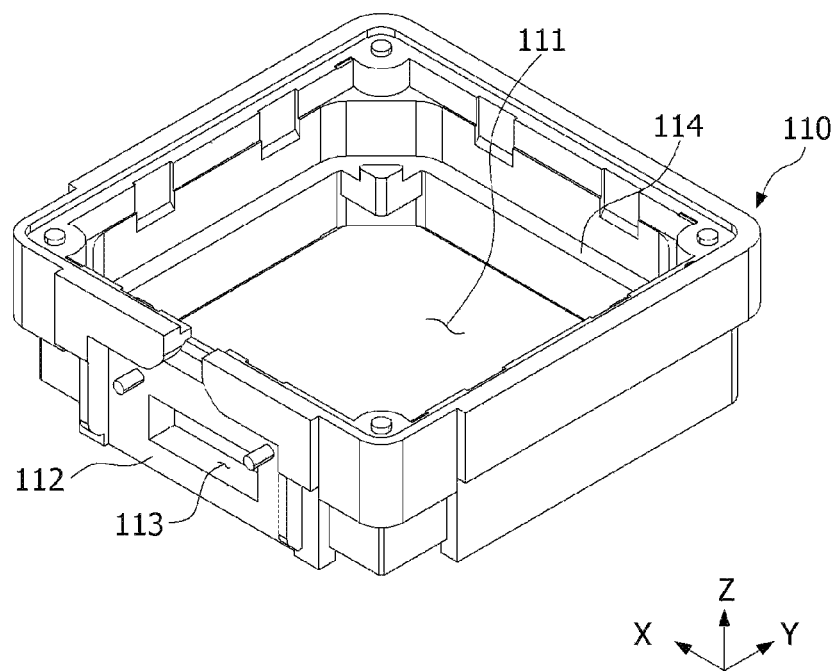

[FIG. 5]
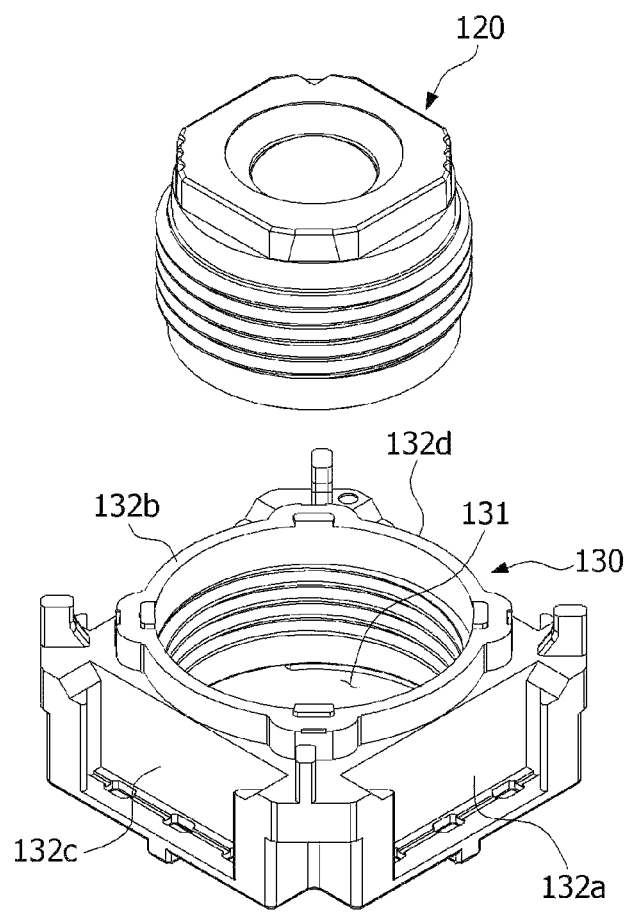

[FIG. 6]
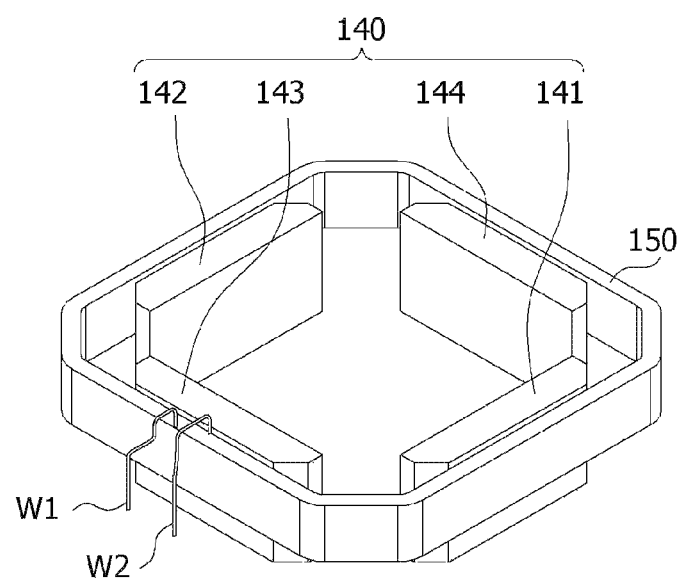

[FIG. 7]
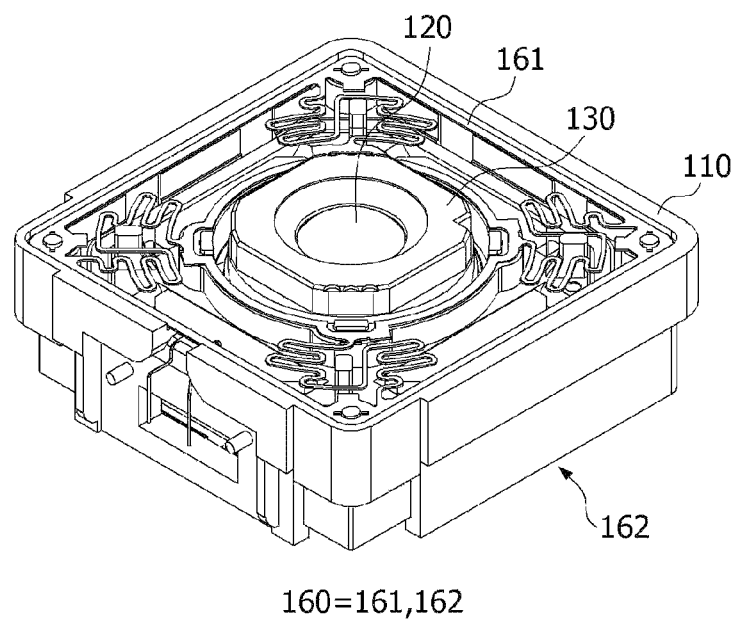
160=161,162
[FIG. 8]
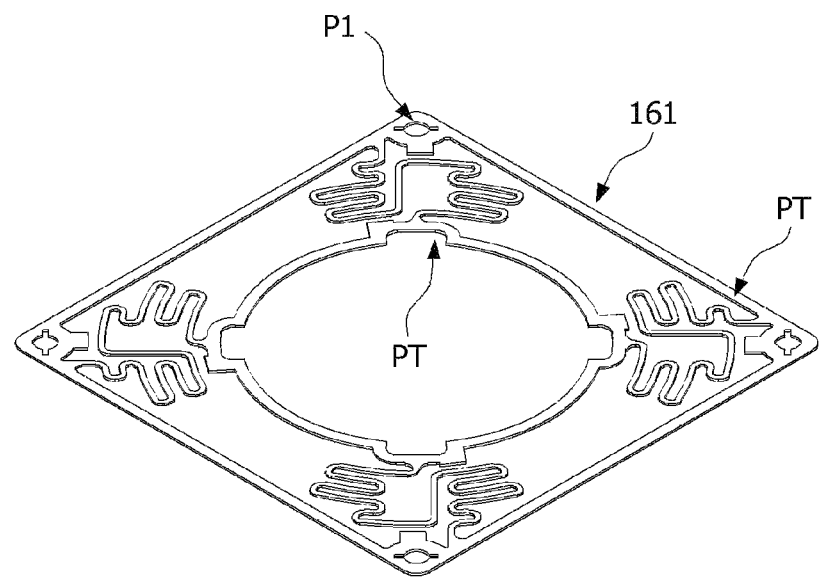

[FIG. 9]
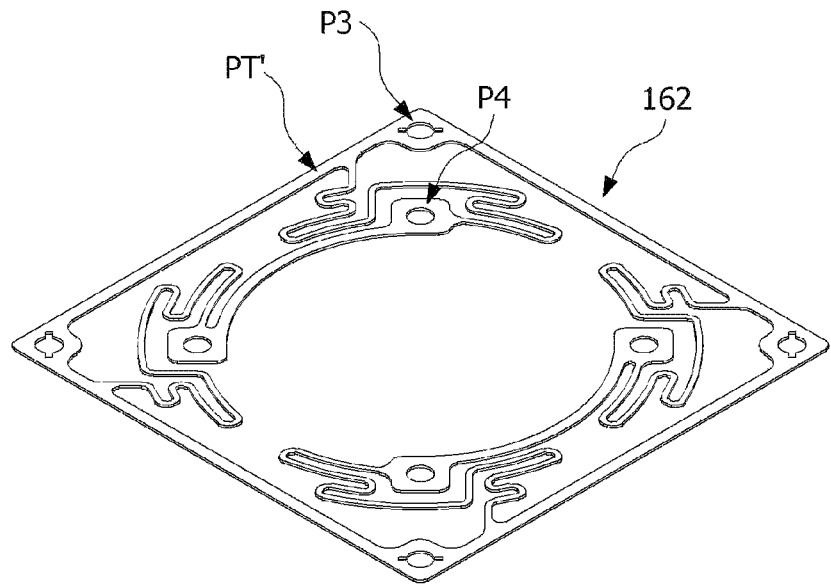
[FIG. 10]
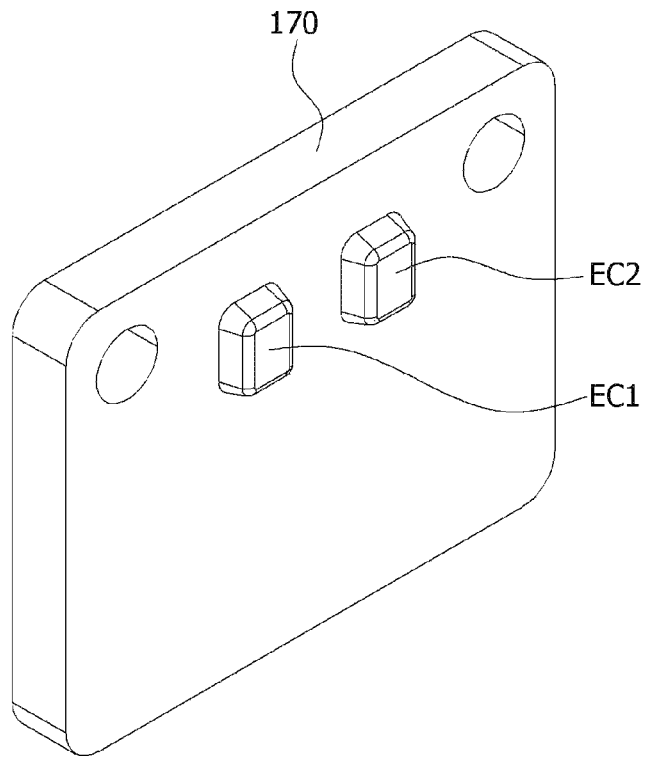

[FIG. 11]
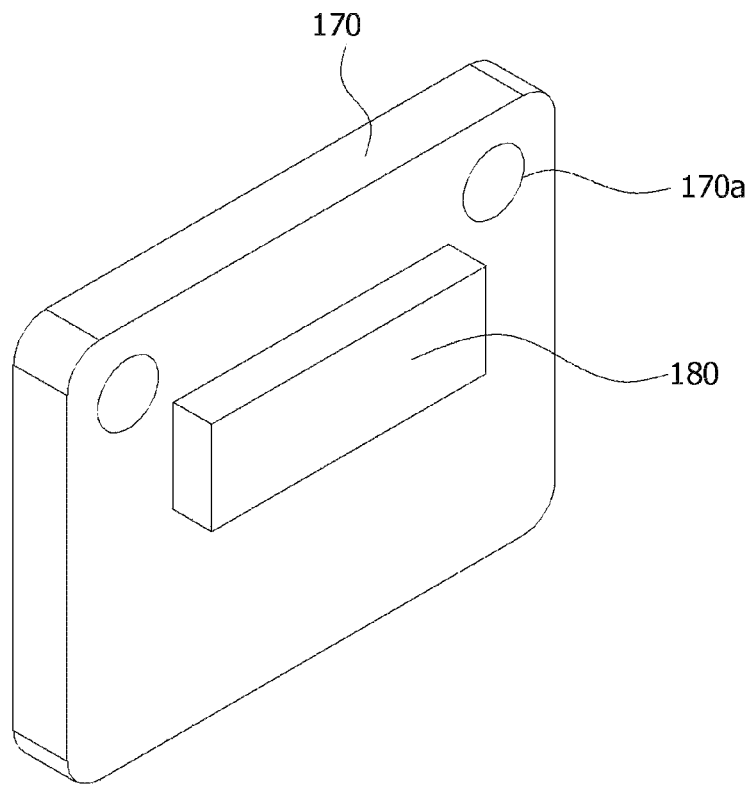
[FIG. 12]
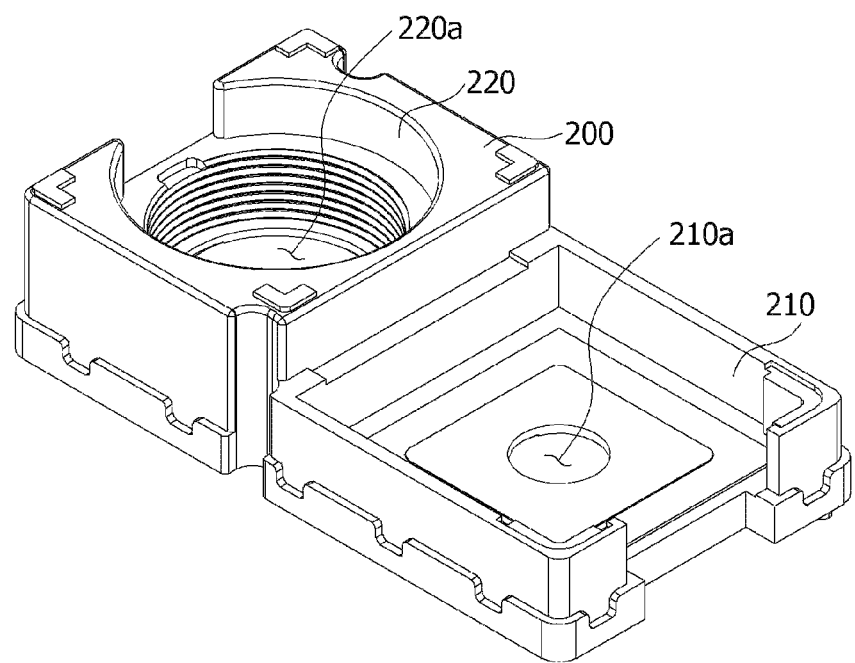

[FIG. 13]
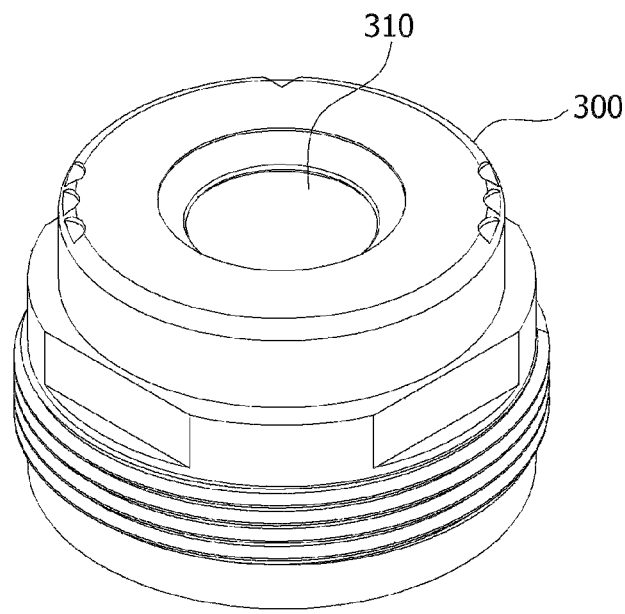
[FIG. 14]
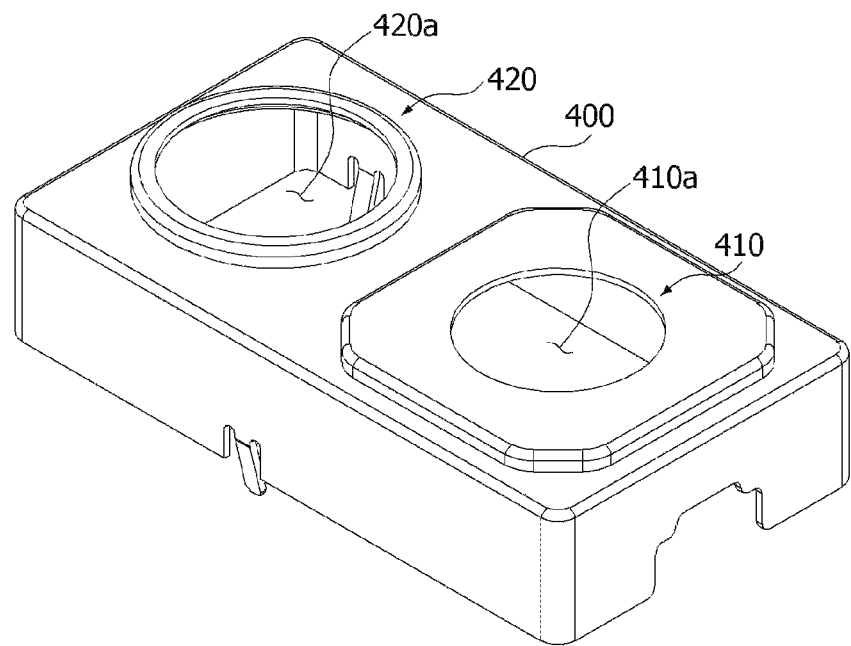

[FIG. 15]
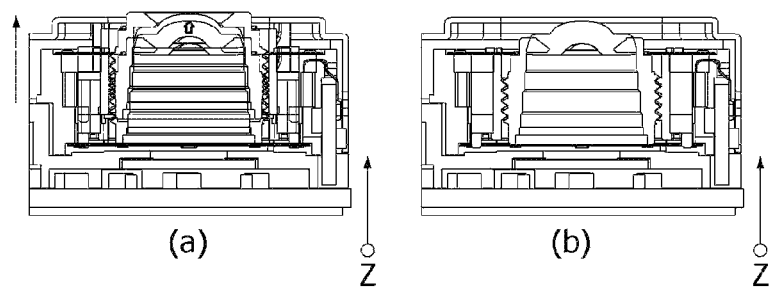
(a)  (b)
[FIG. 16]
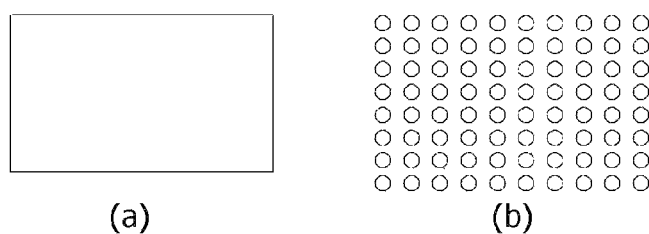
(a)  (b)

[FIG. 17]
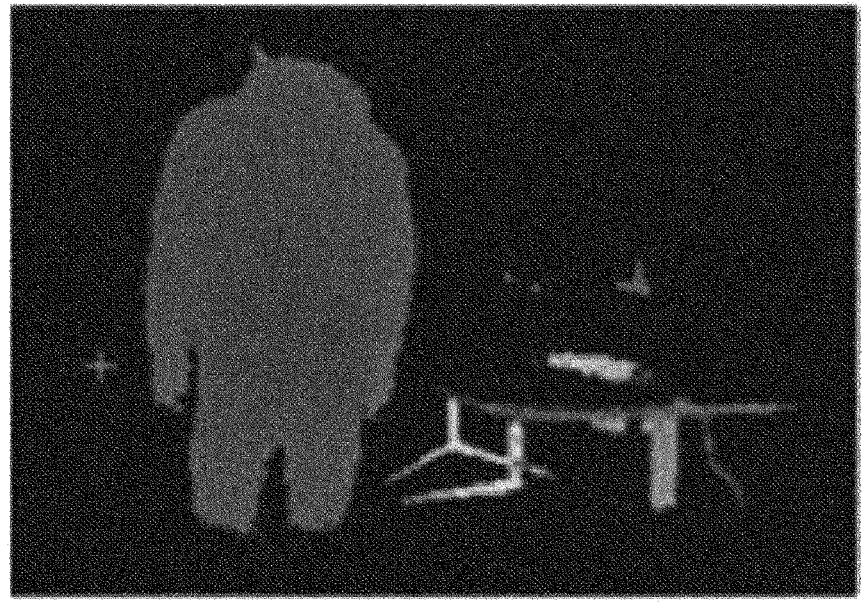
(a)
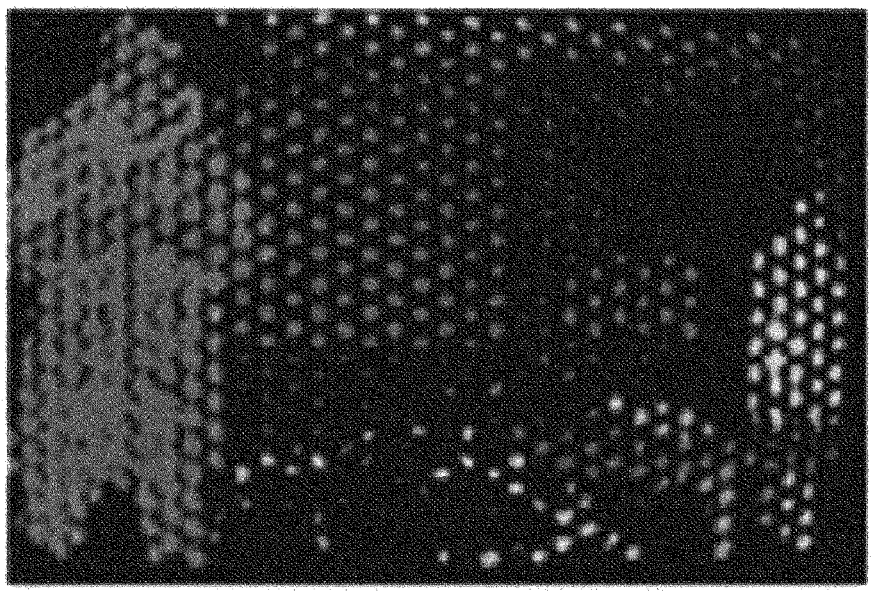
(b)

[FIG. 18]
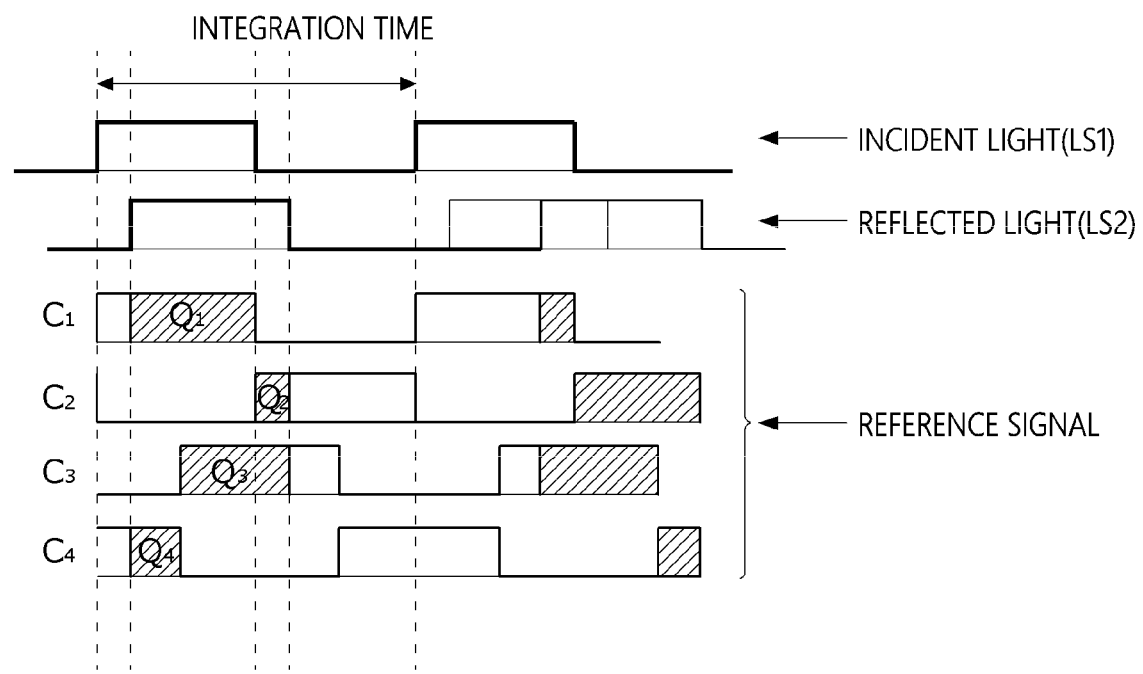

[FIG. 19]
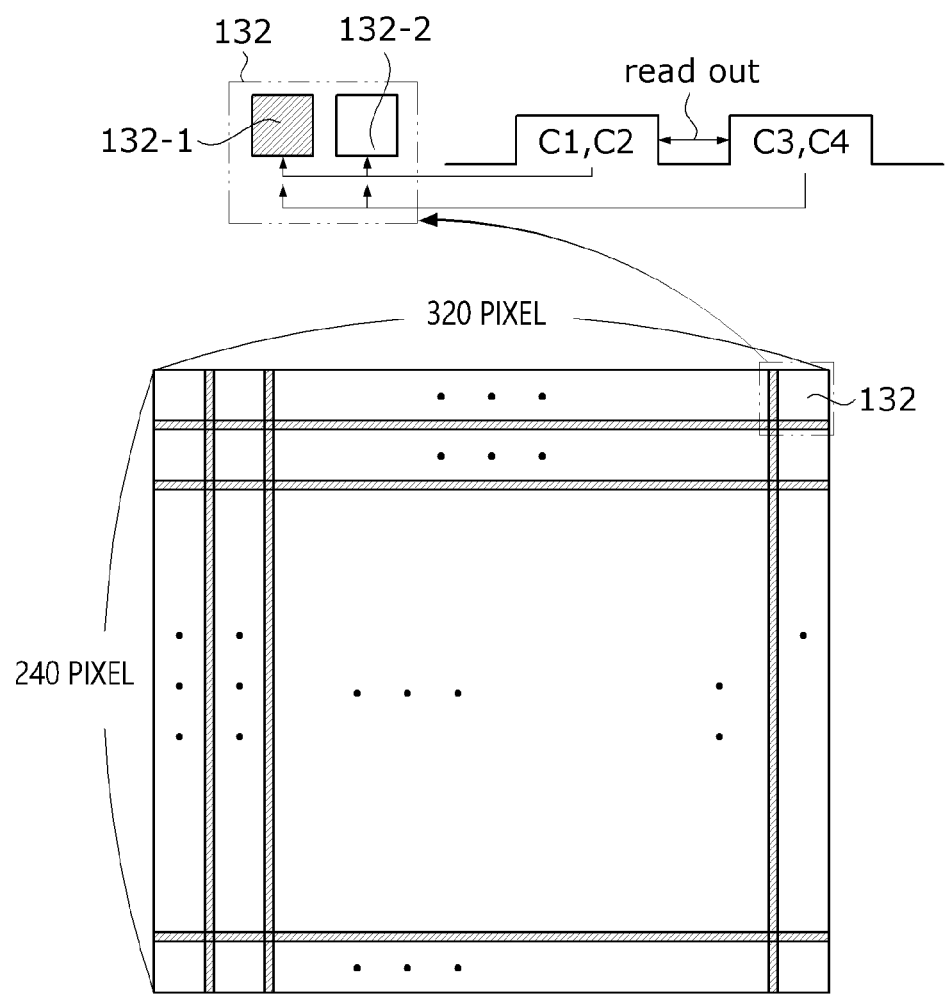

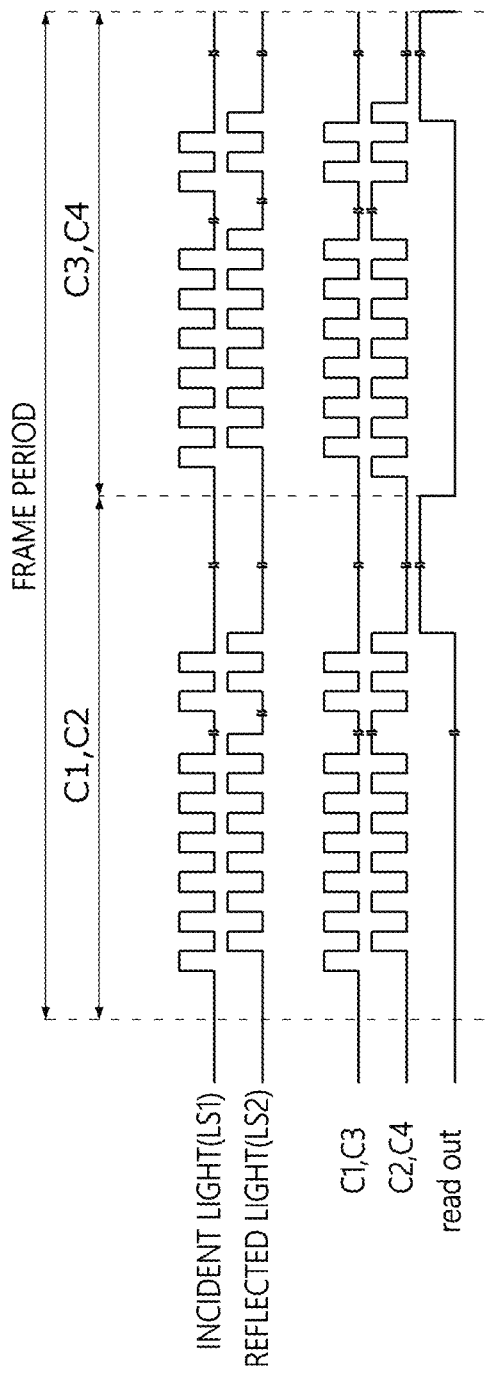
[FIG. 20]

[FIG. 21]
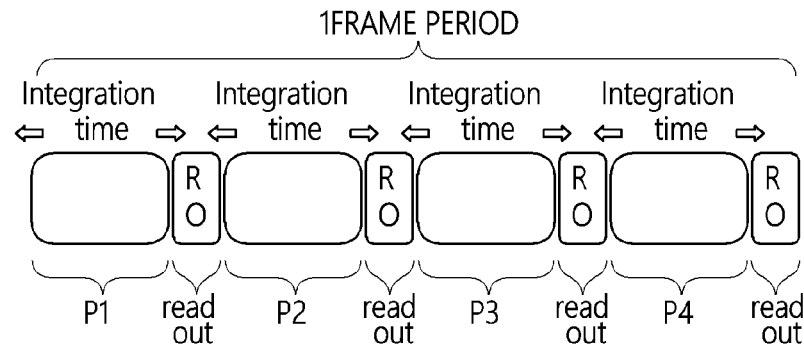
[FIG. 22]
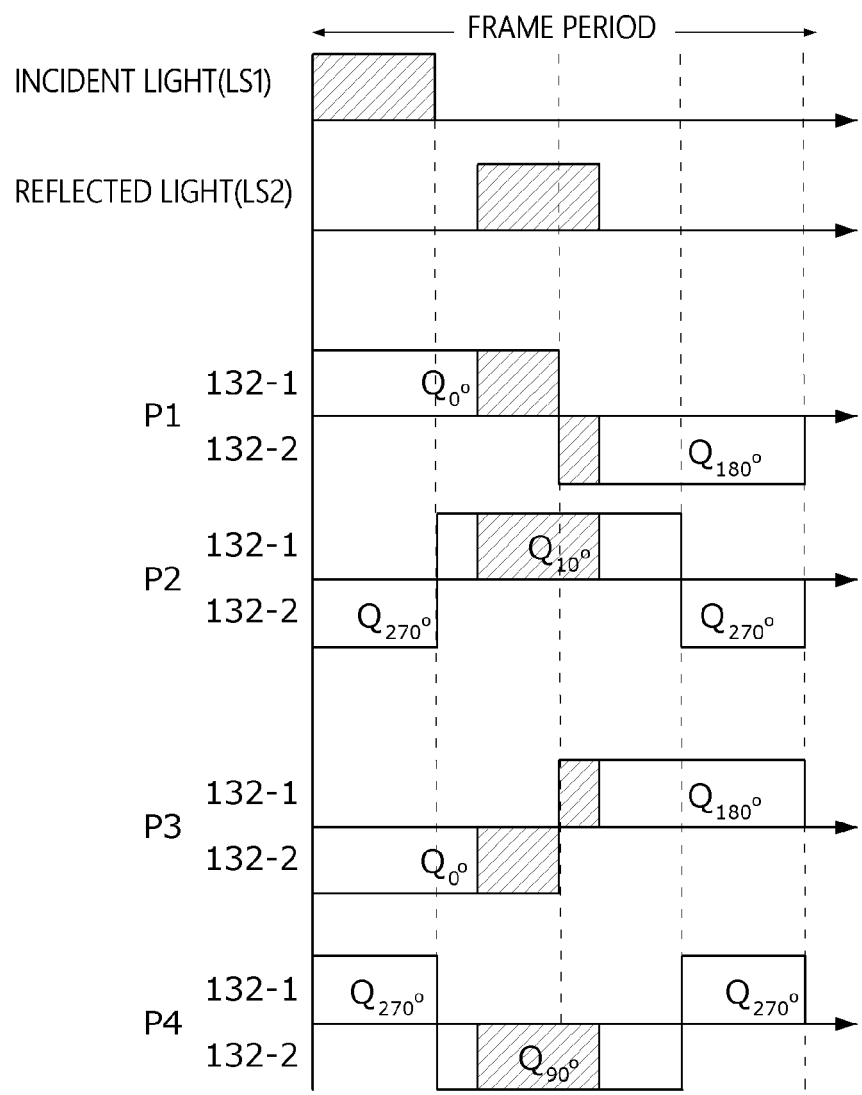

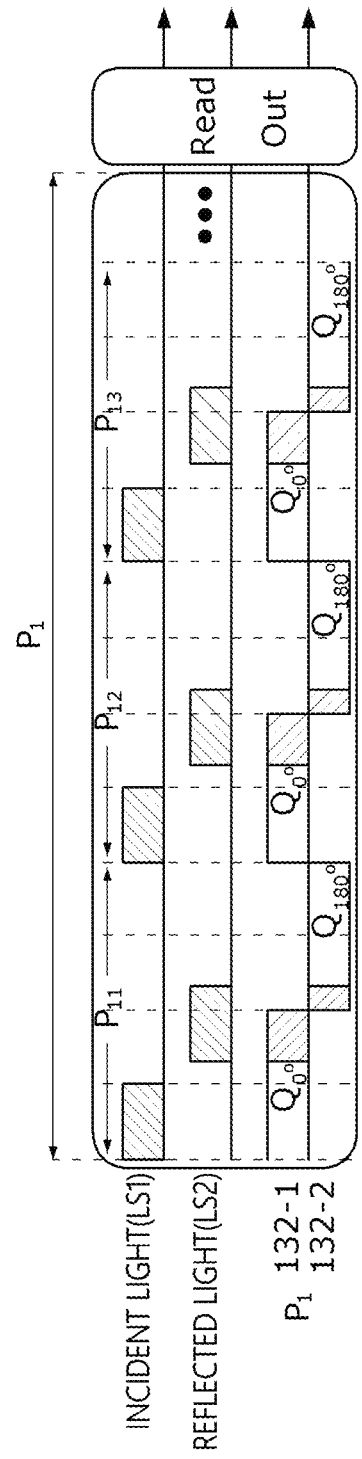

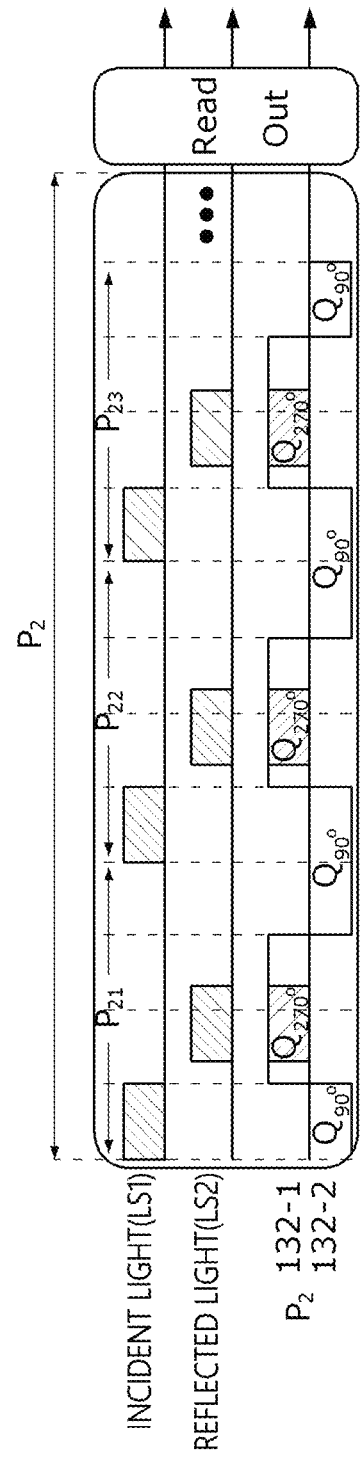
[FIG. 24]

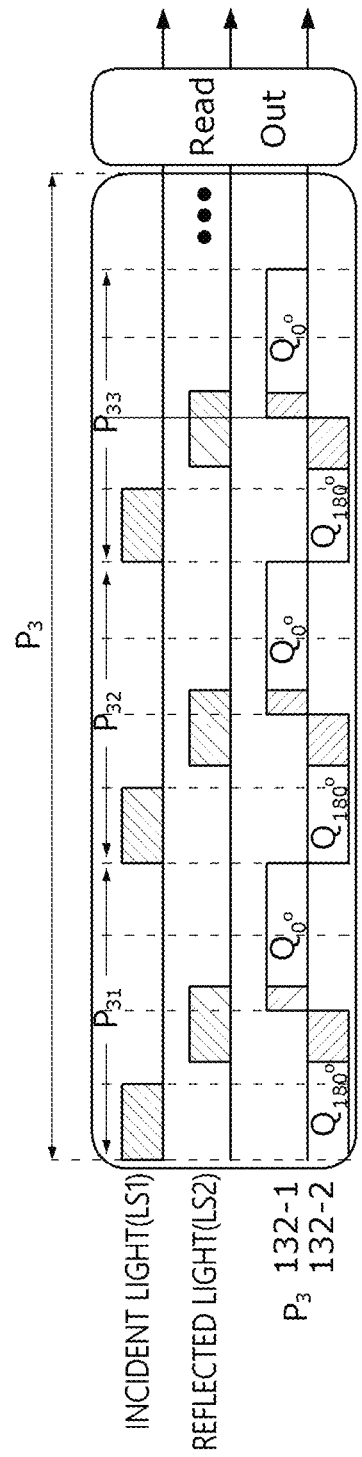

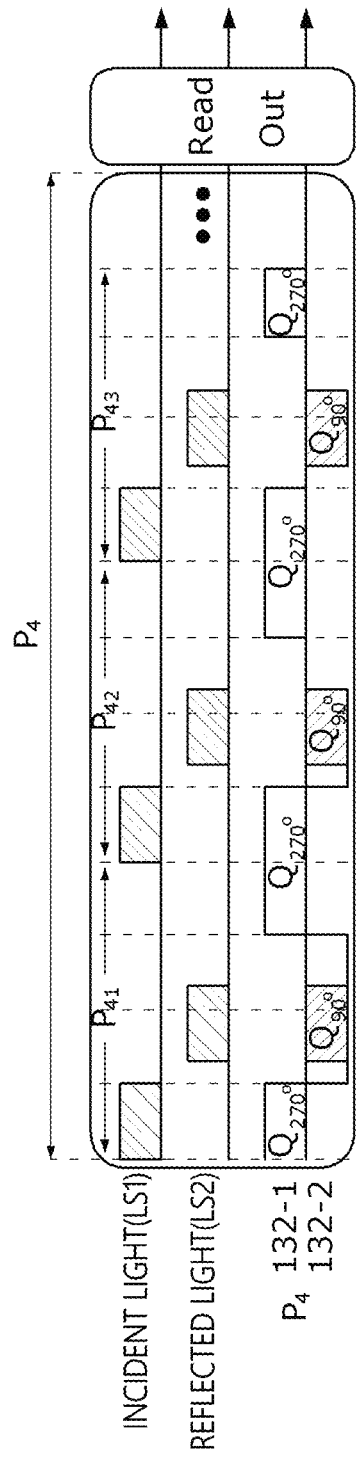
[FIG. 26]

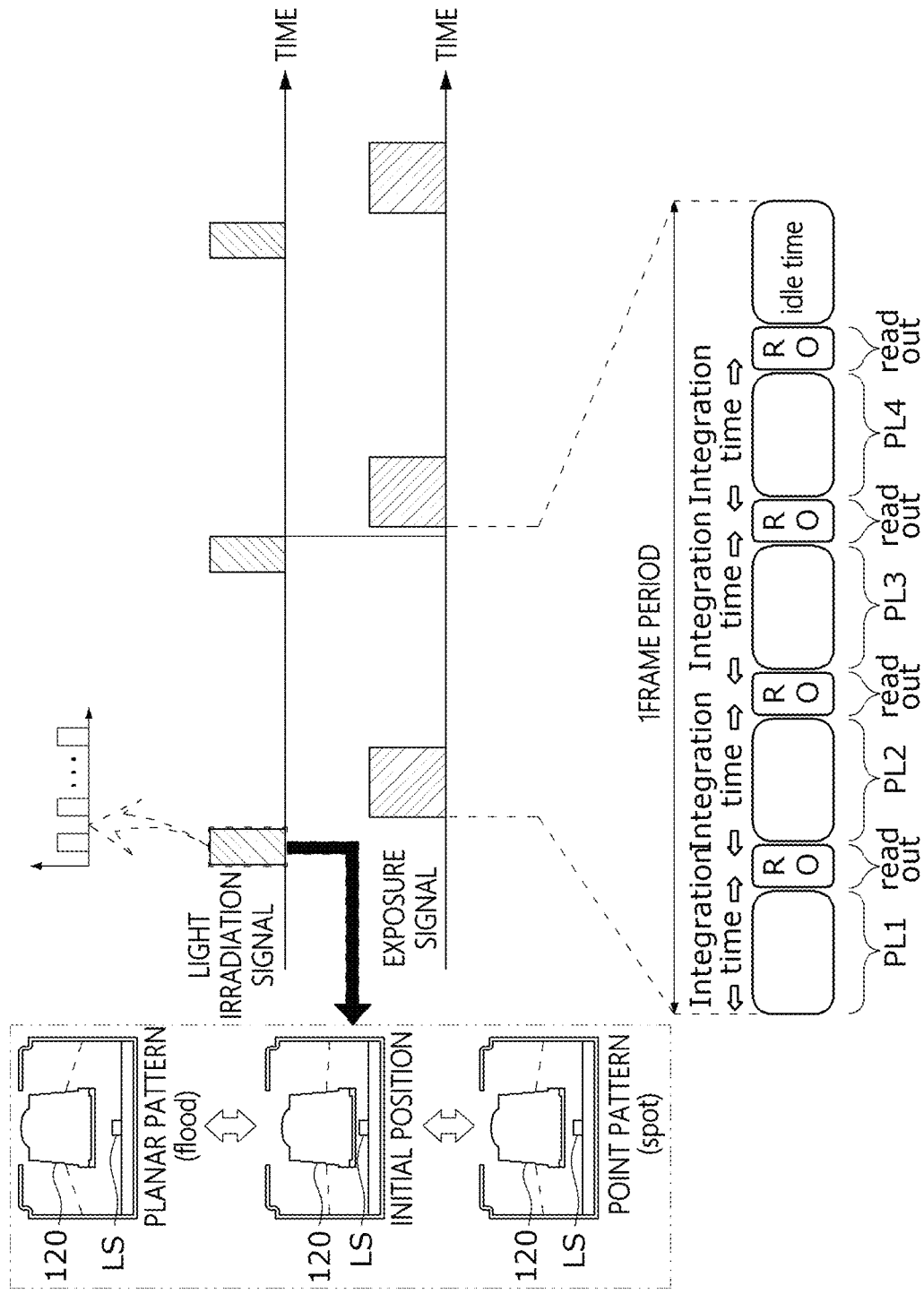

[FIG. 27B]
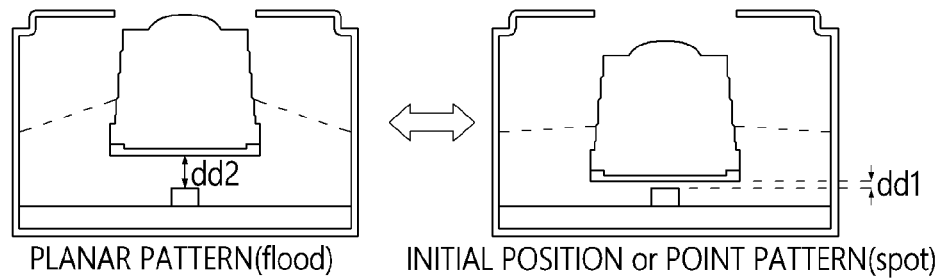
[FIG. 27C]
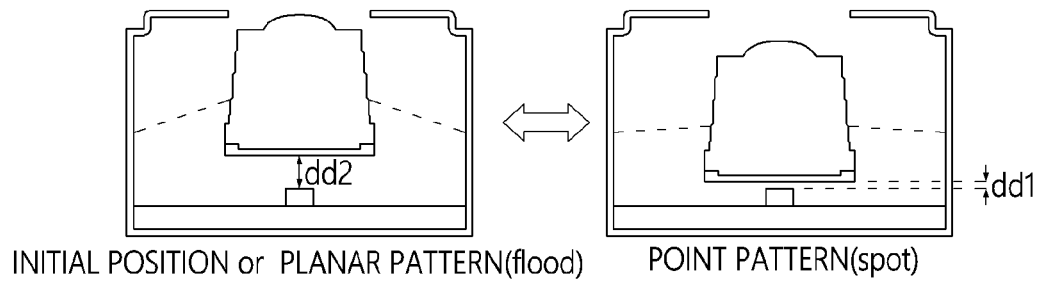

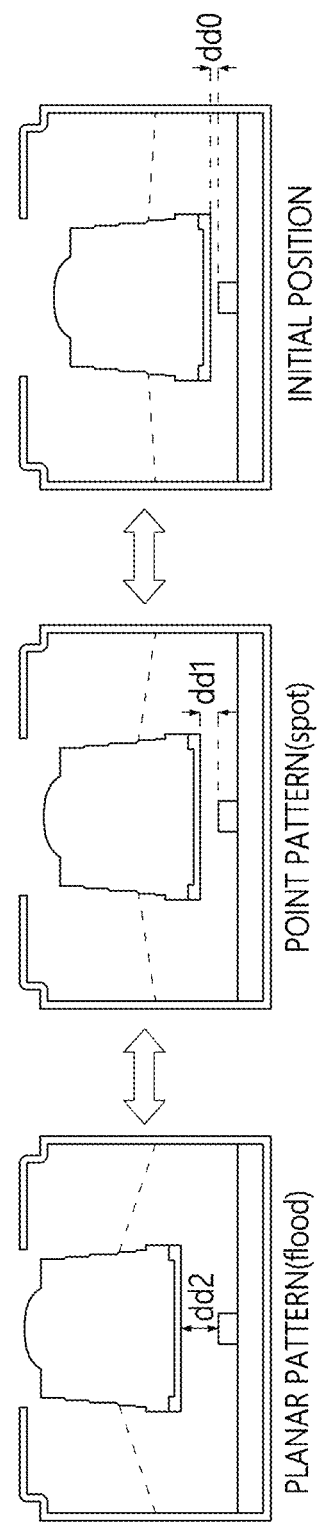

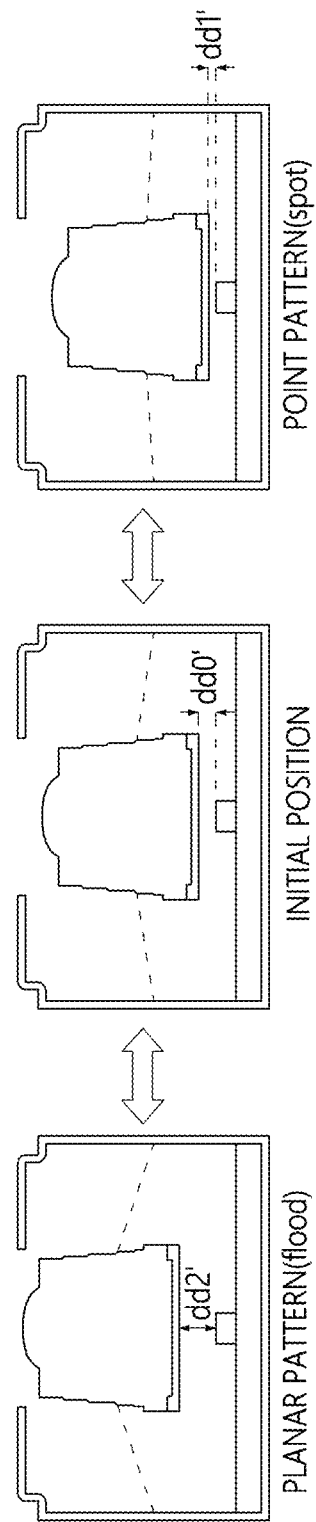

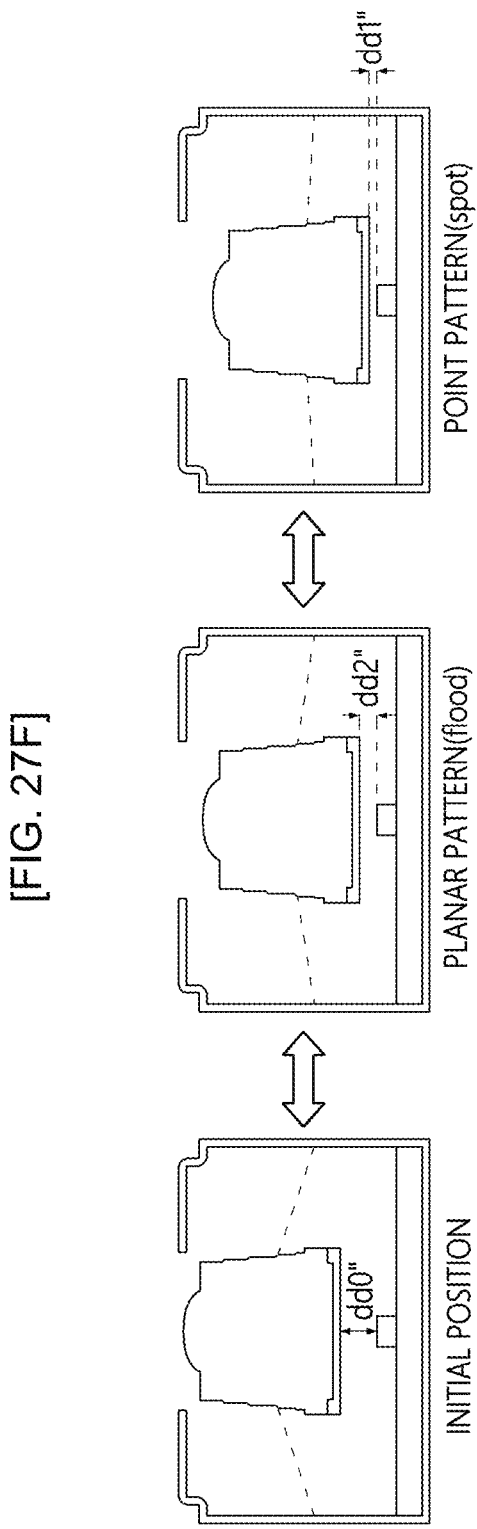

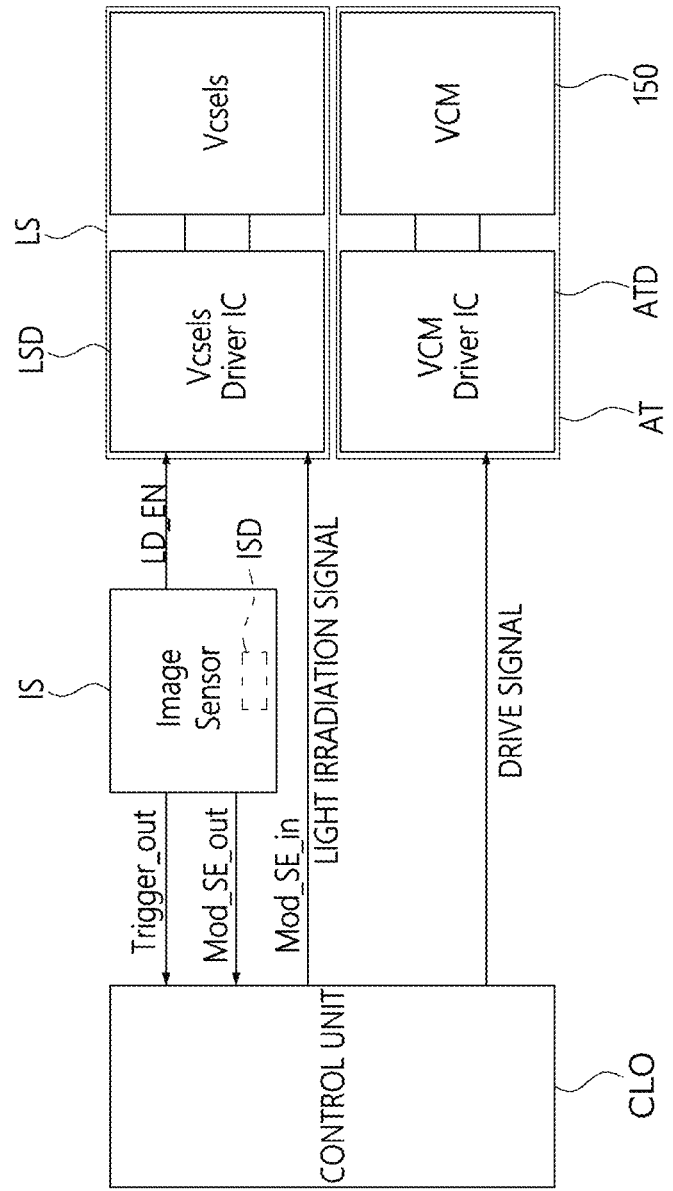

[FIG. 28]
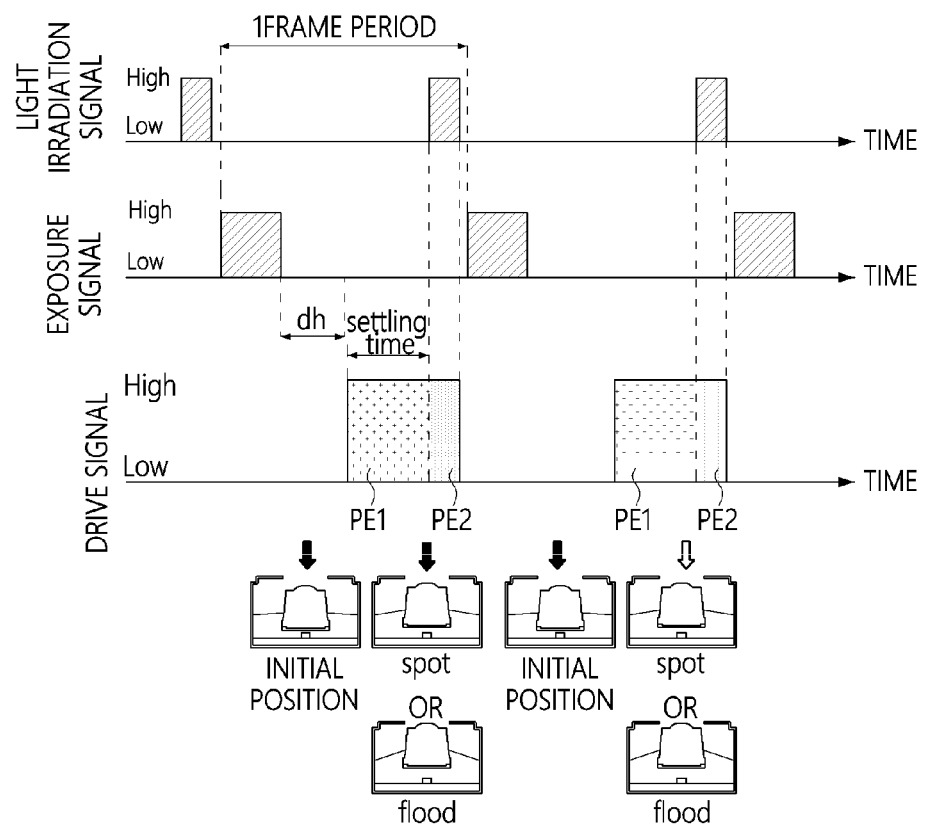

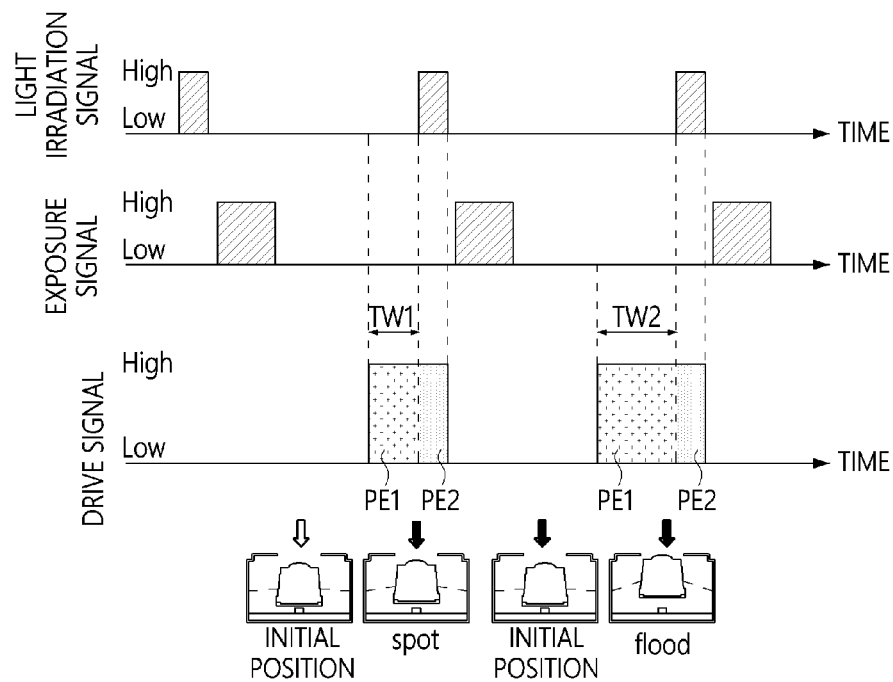
[FIG. 29]

[FIG. 30]
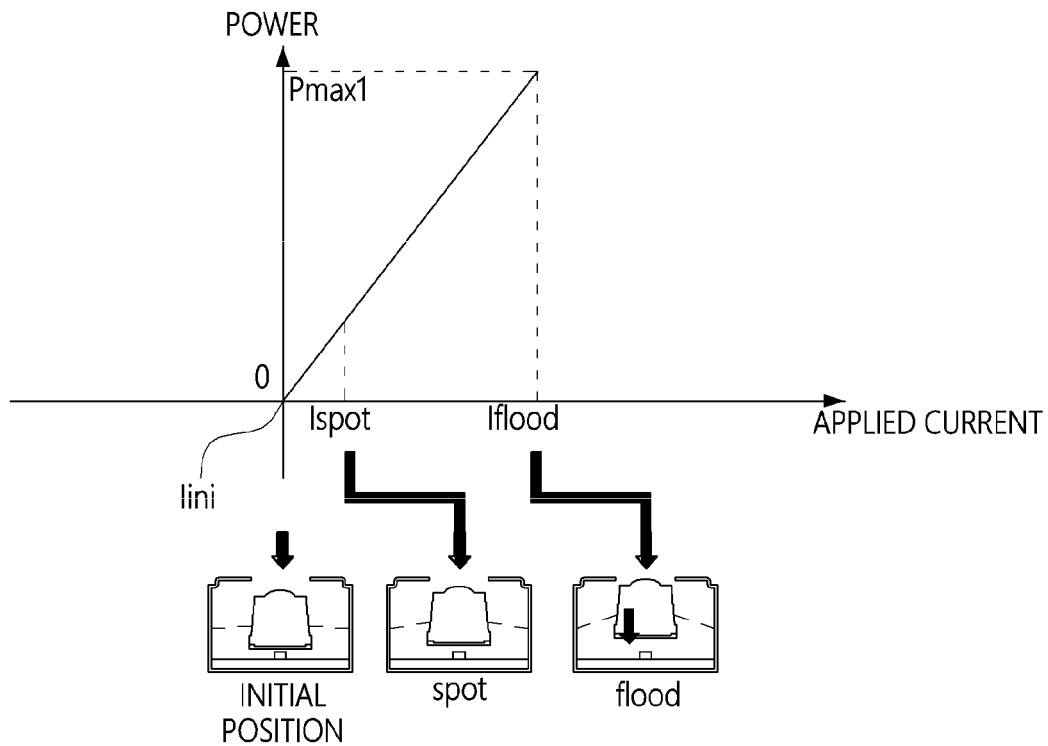
[FIG. 31]
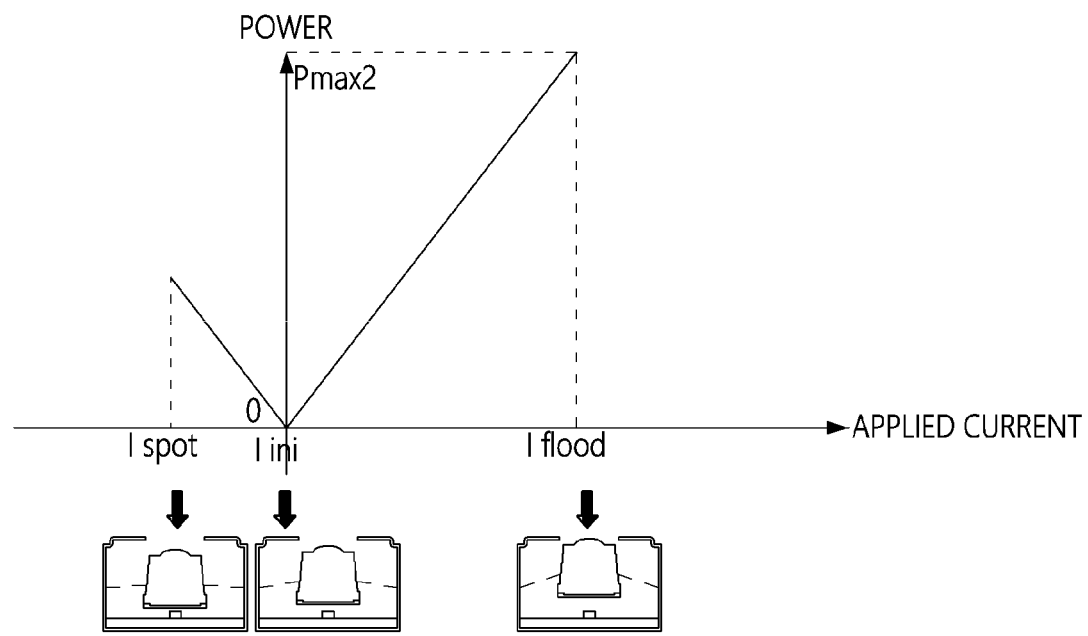

[FIG. 32]
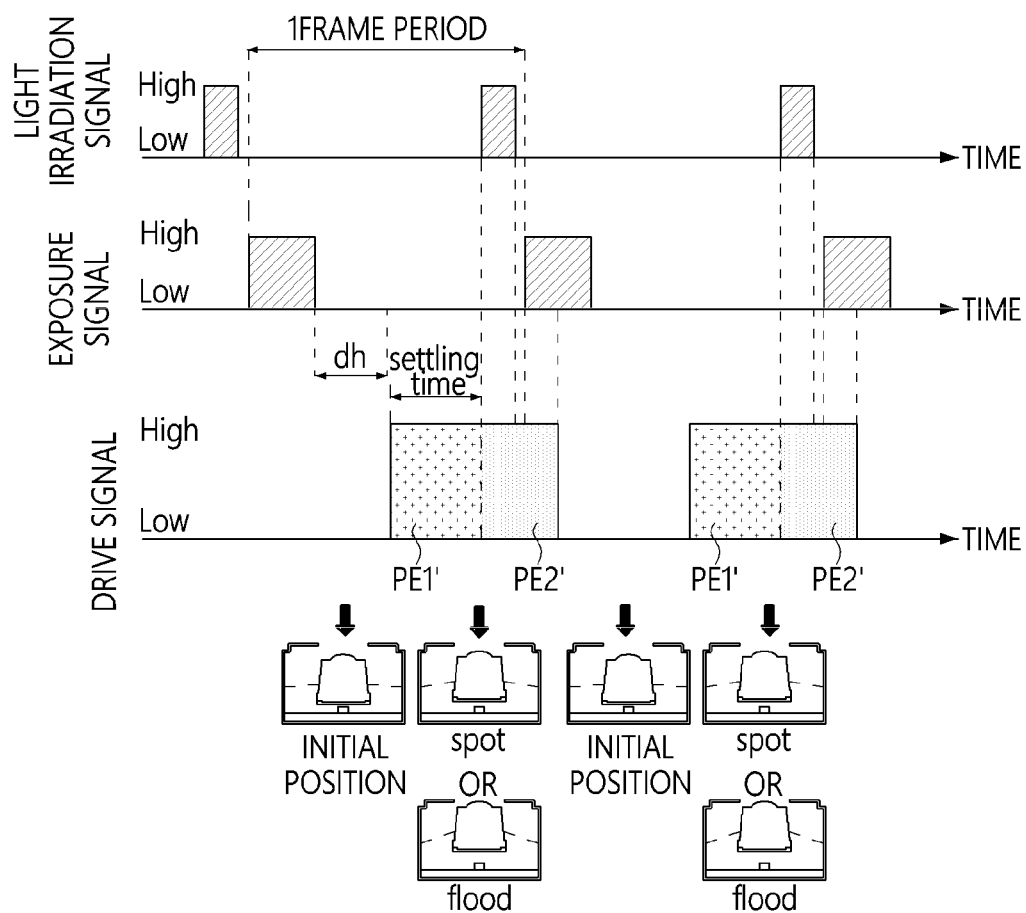

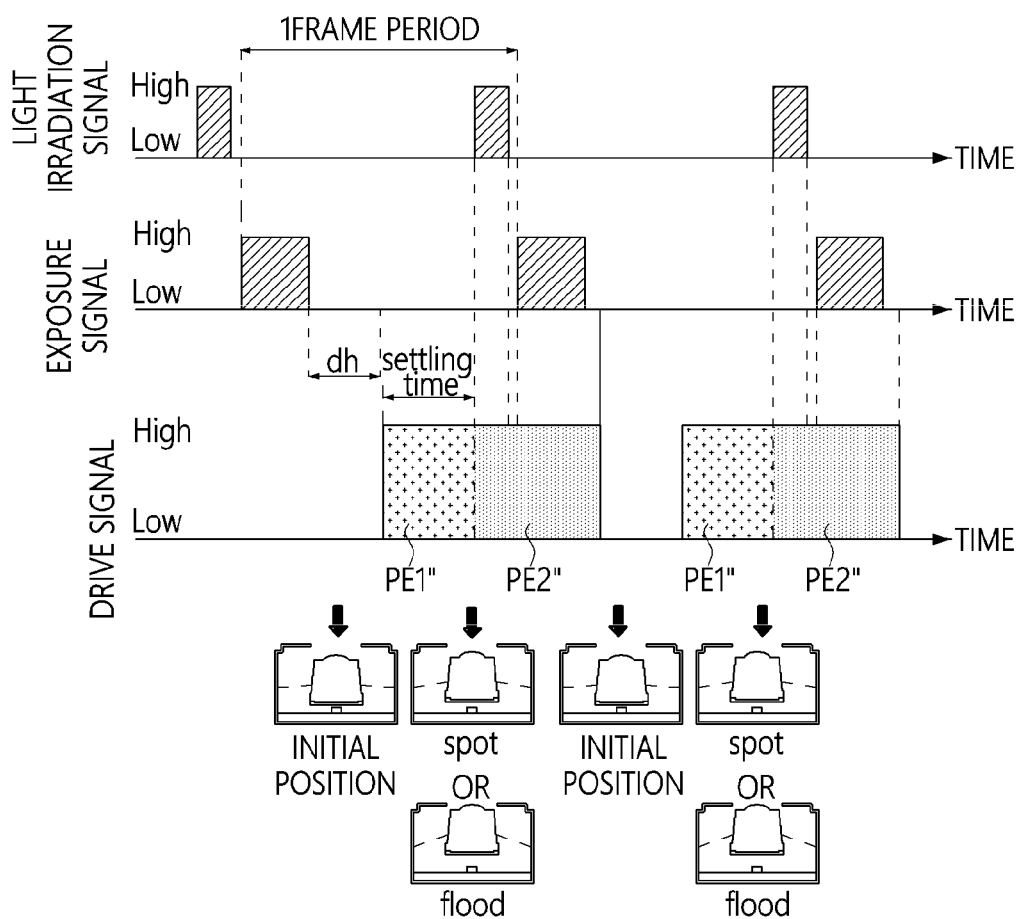
[FIG. 33]

[FIG. 34]
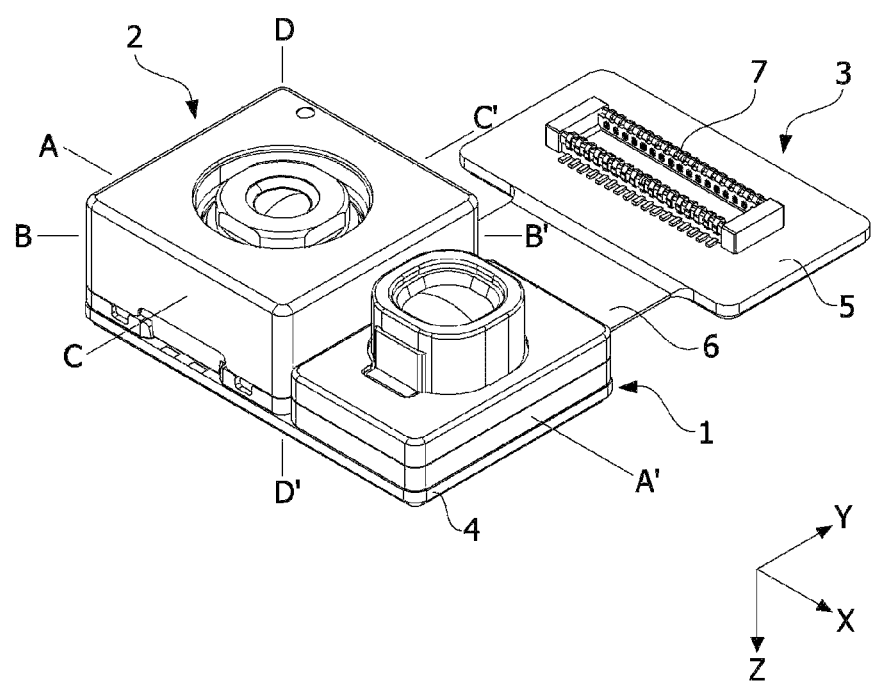

[FIG. 35]
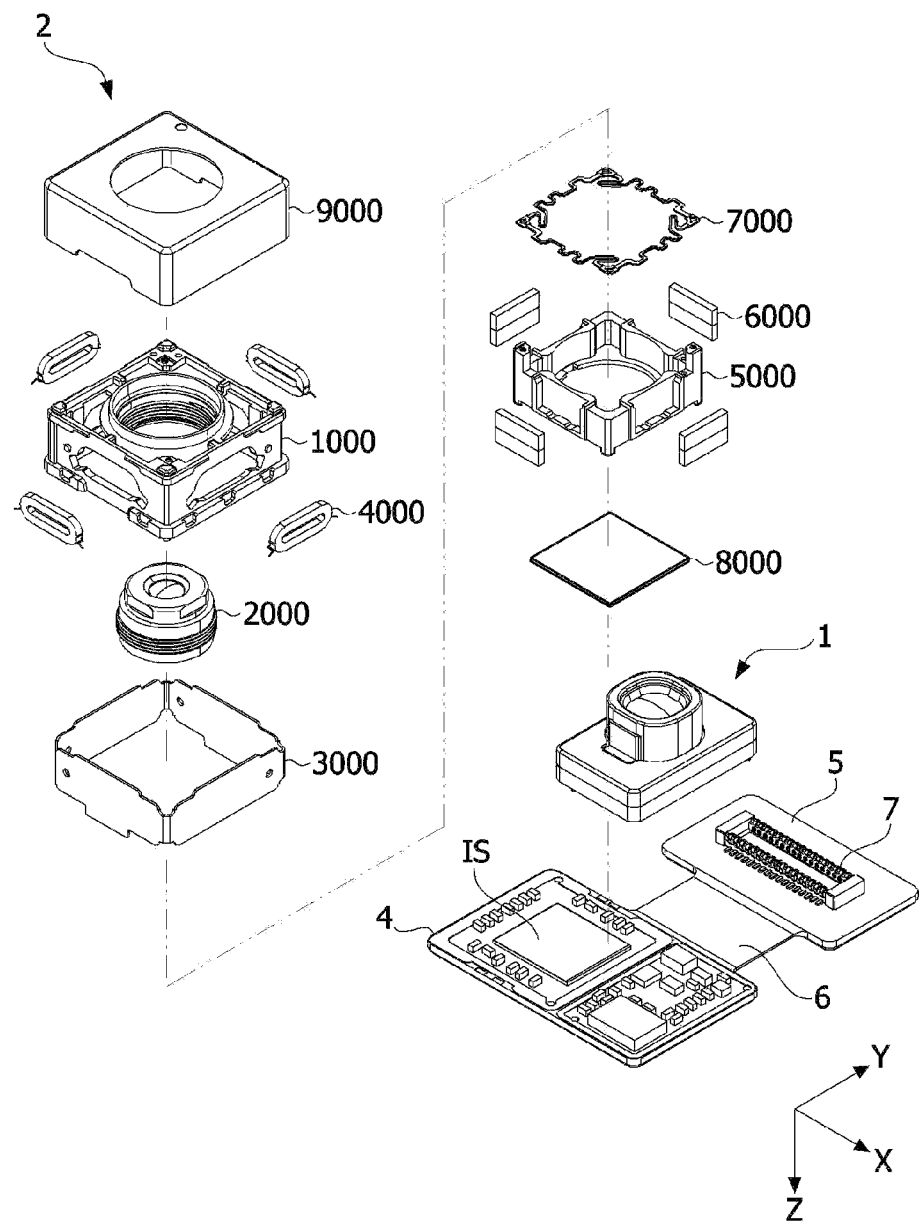

[FIG. 36A]
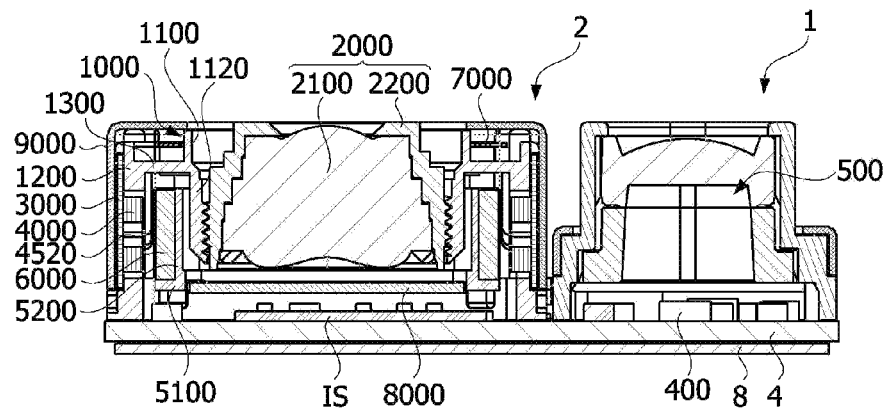
[FIG. 36B]
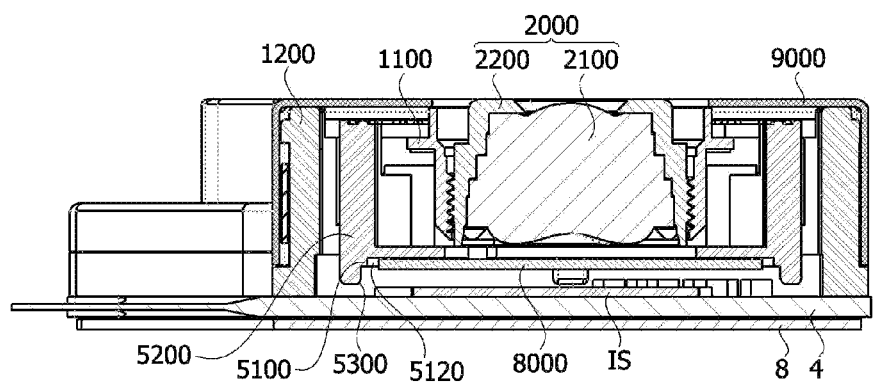
[FIG. 36C]
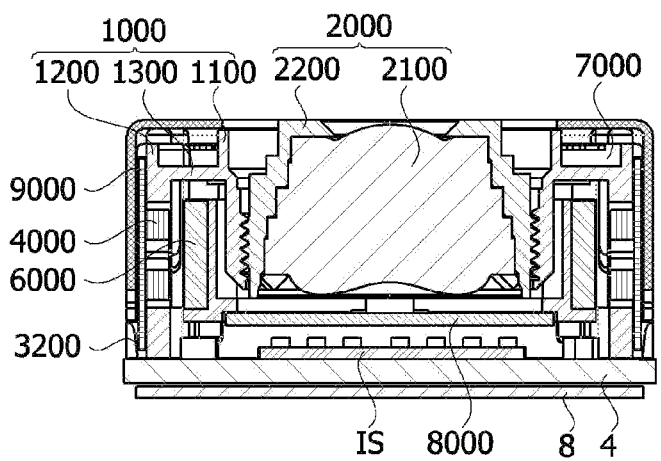

[FIG. 36D]
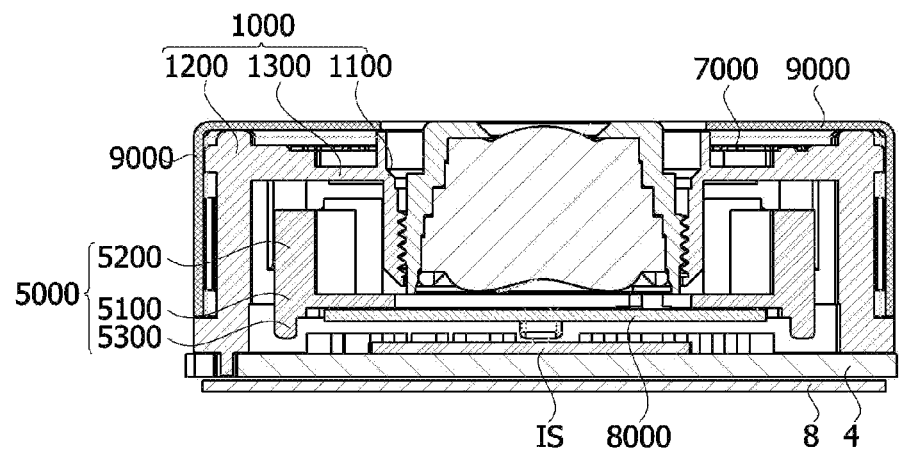
[FIG. 37]
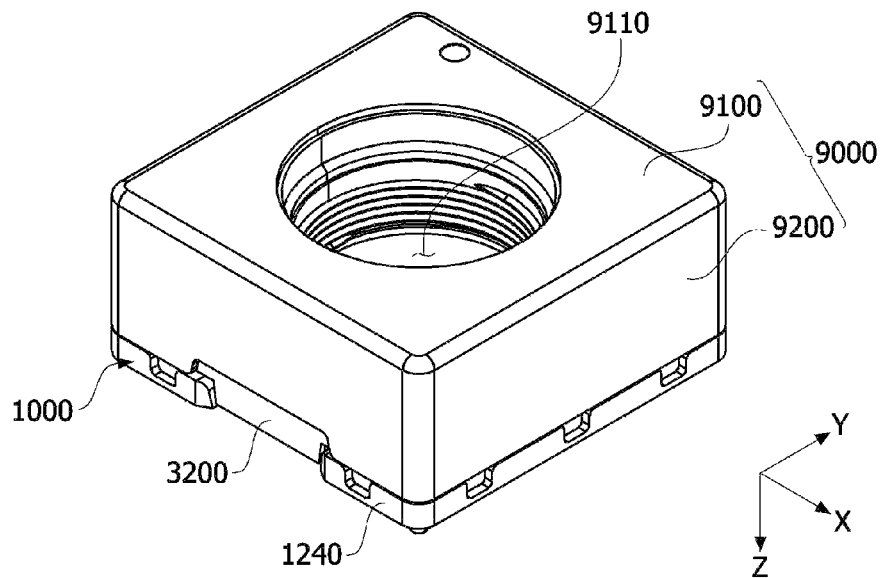

[FIG. 38]
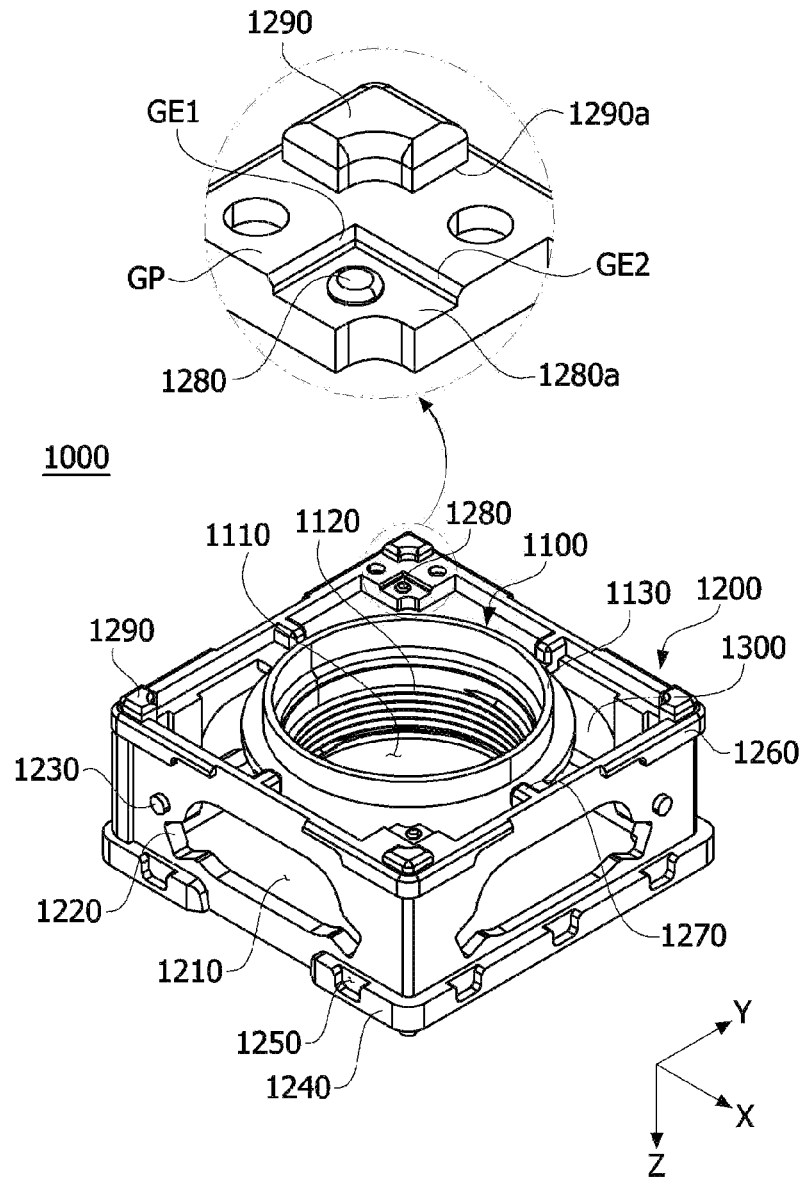

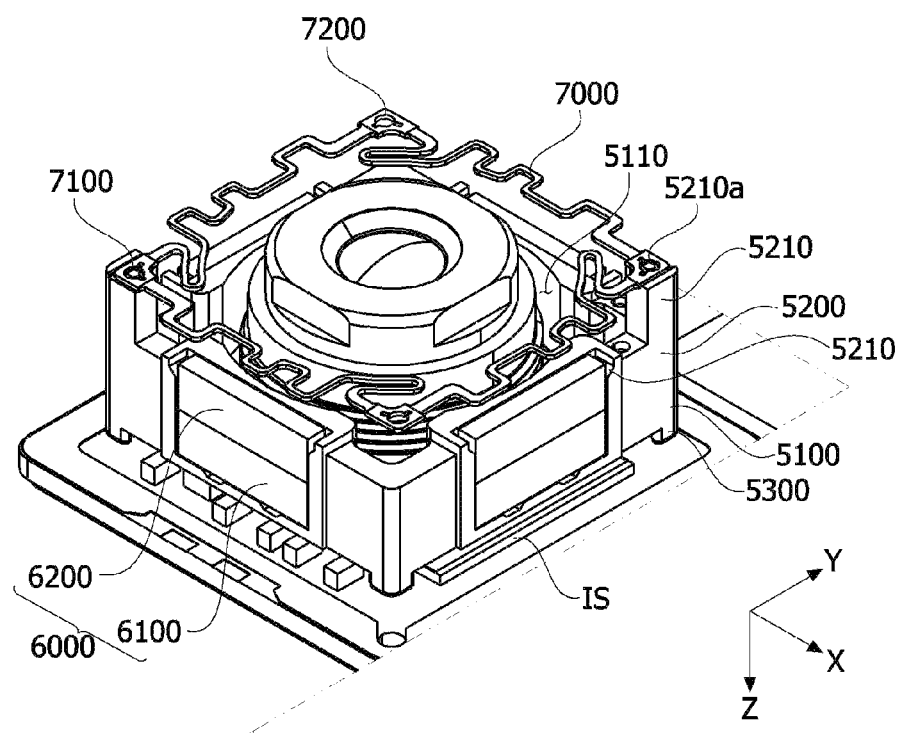
[FIG. 39]

[FIG. 40]
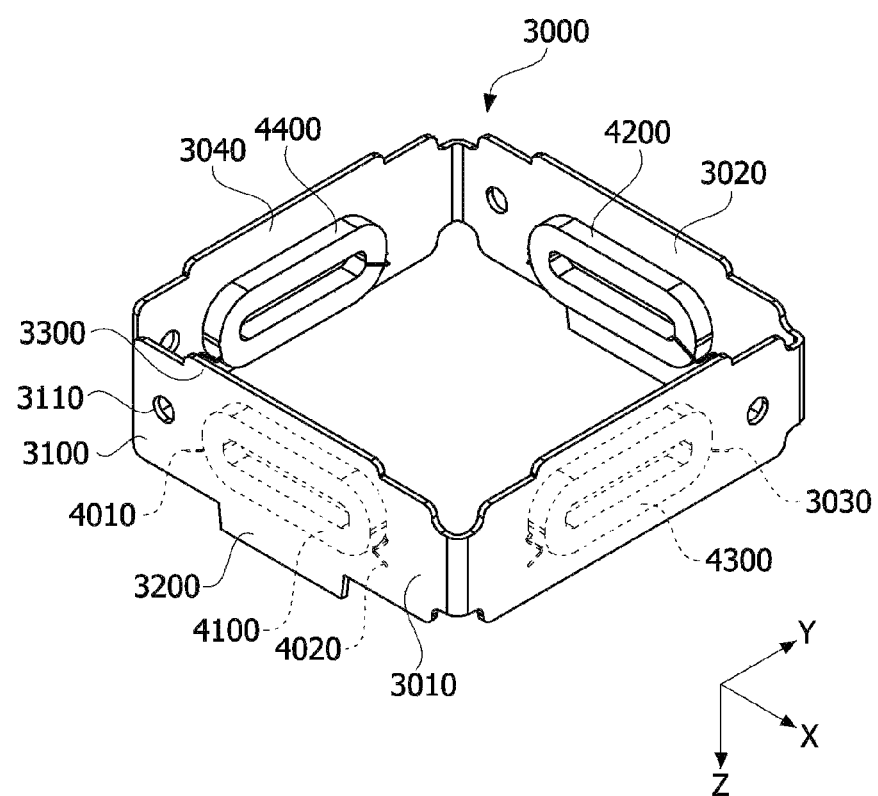

[FIG. 41]
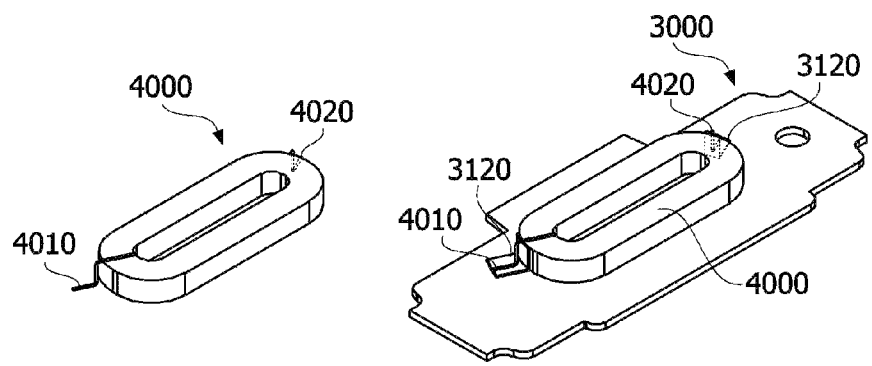
(a)
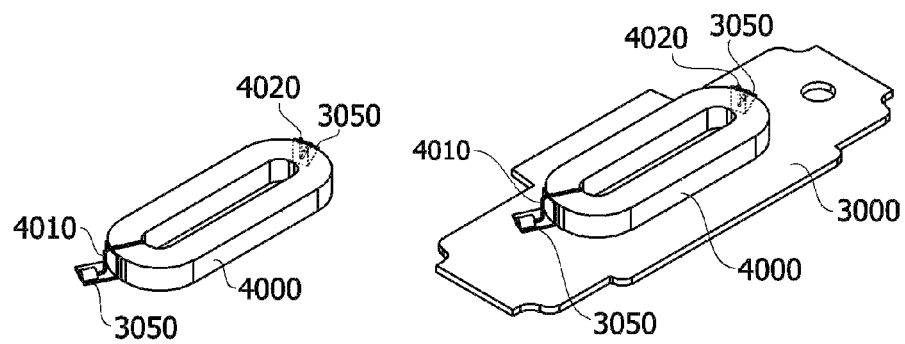
(b)

[FIG. 42]
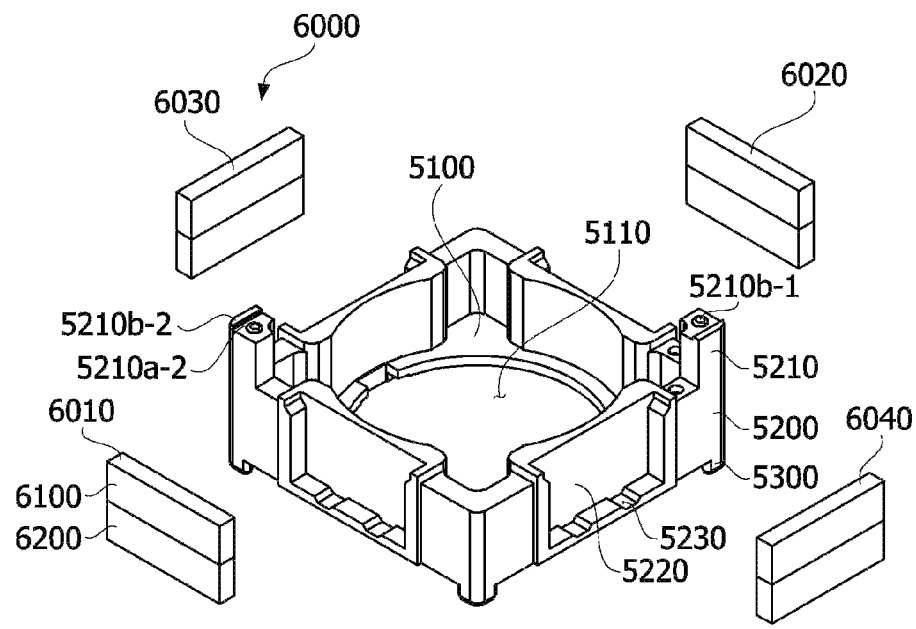
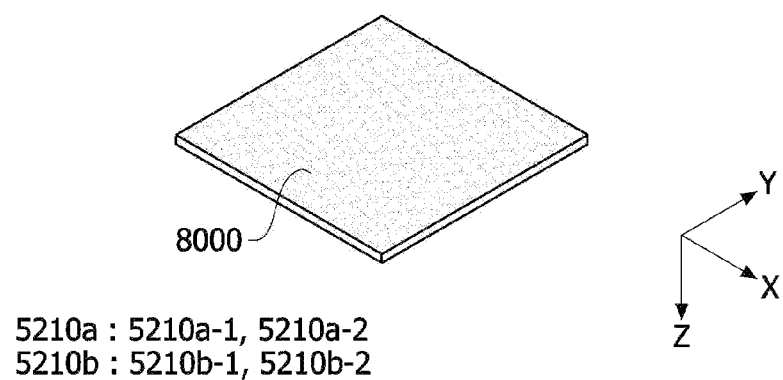
5210a : 5210a-1, 5210a-2
5210b : 5210b-1, 5210b-2

[FIG. 43]
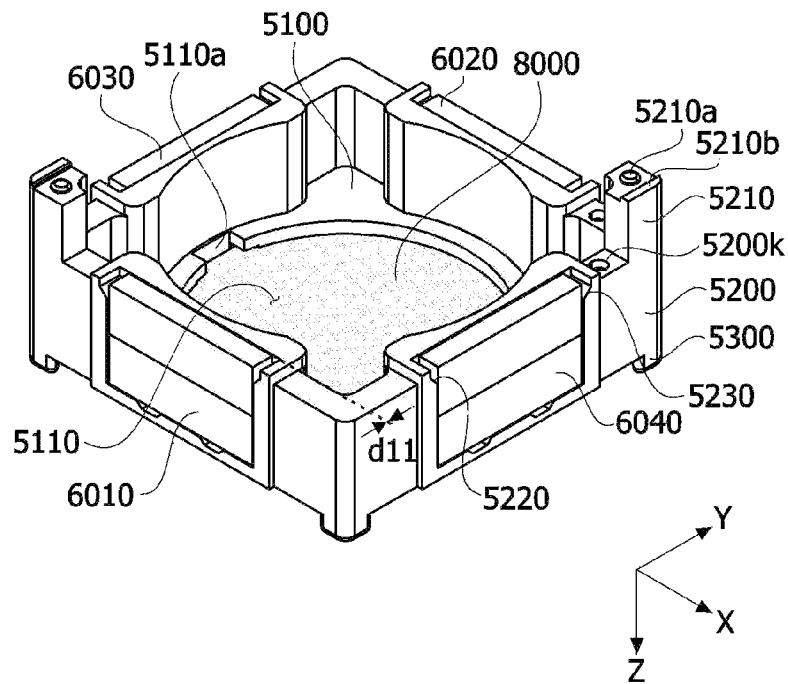
[FIG. 44]
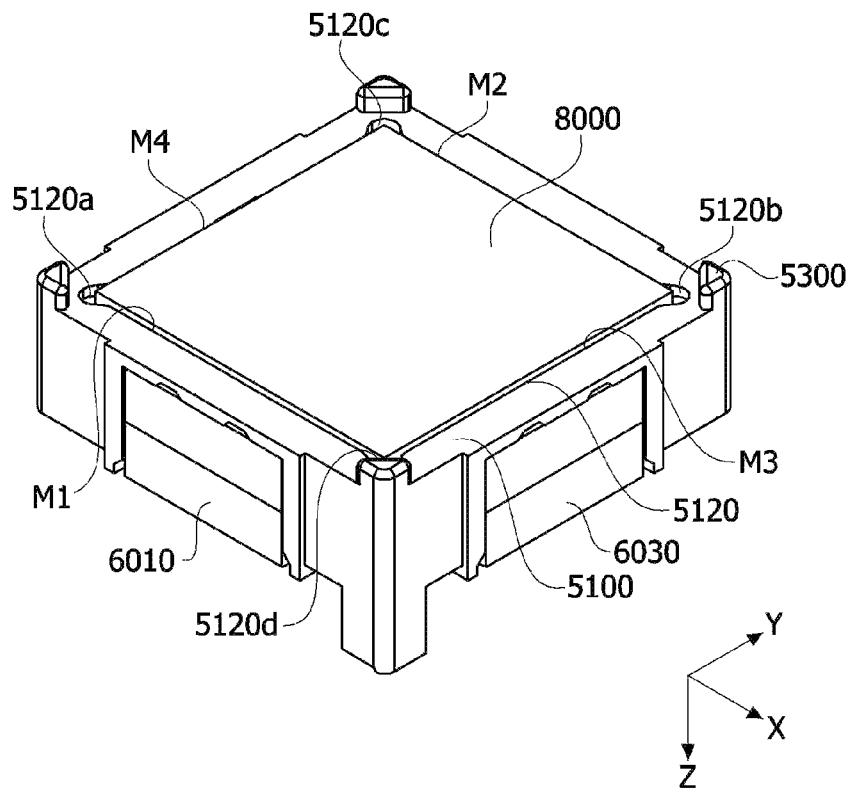

[FIG. 45]
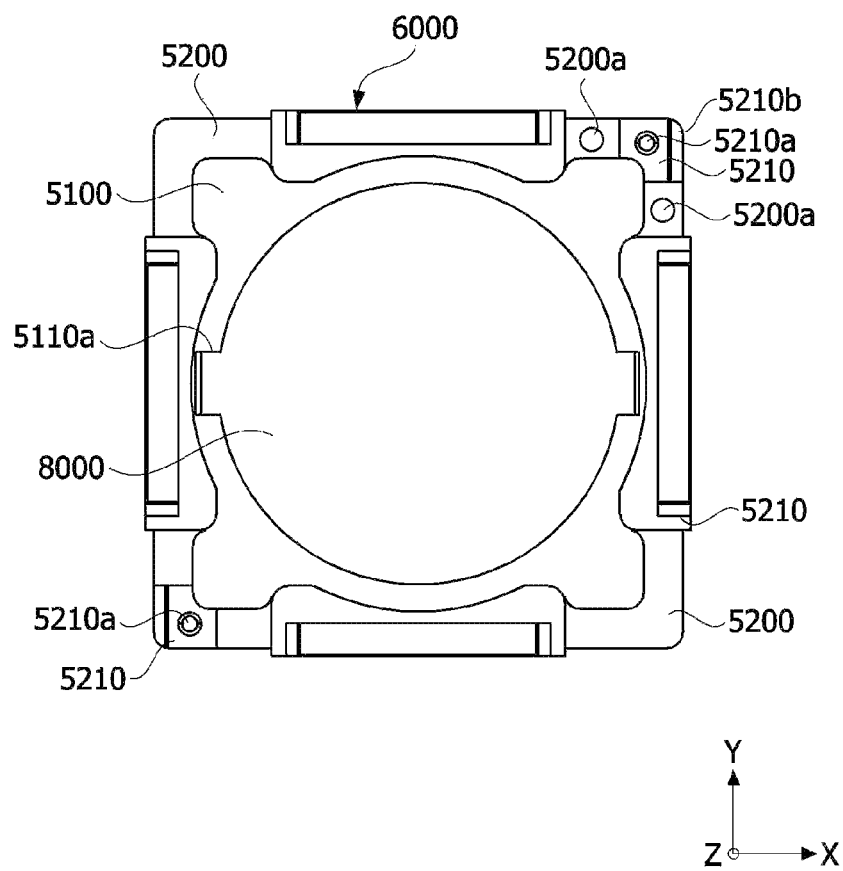

[FIG. 46]
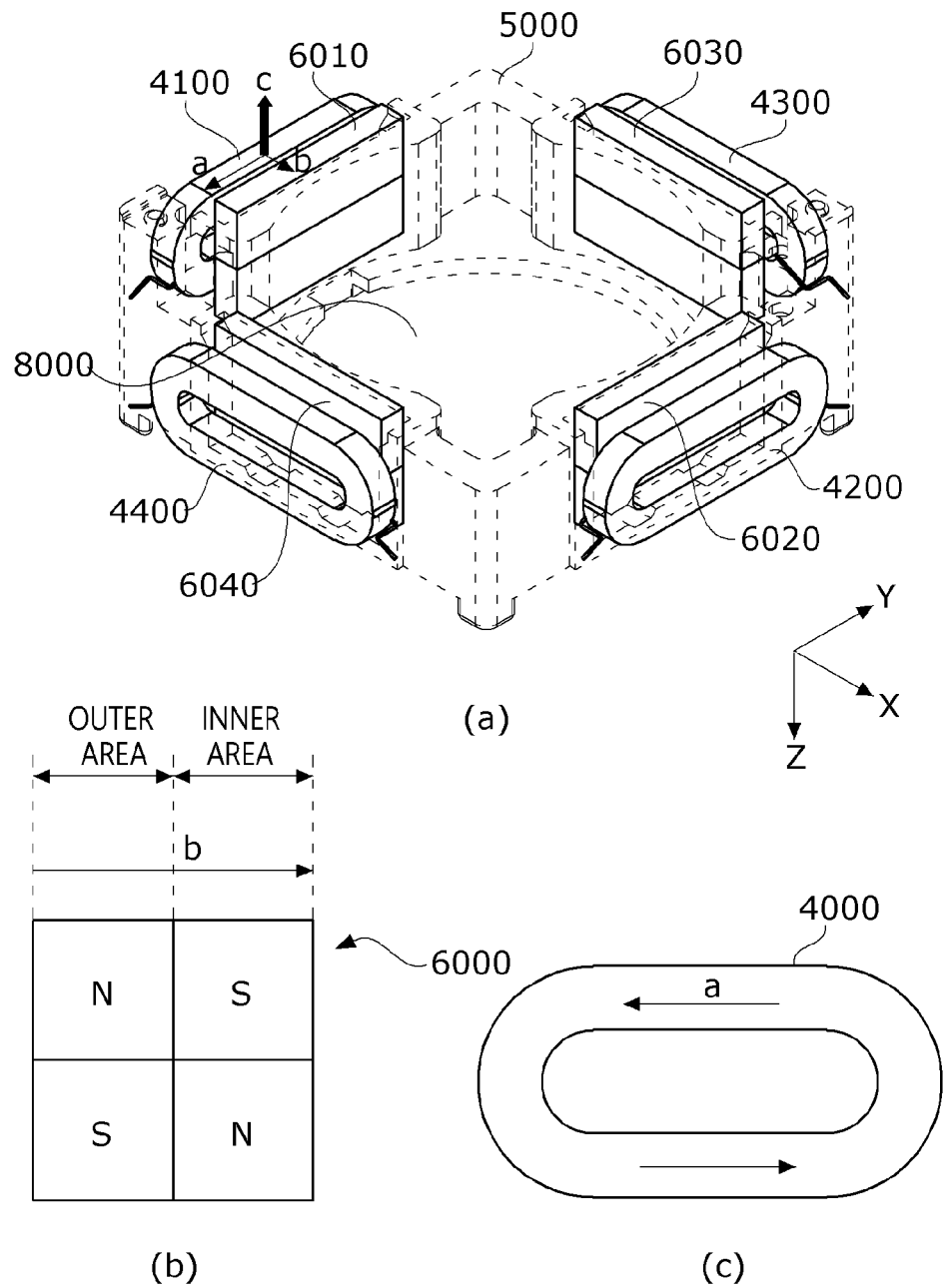

[FIG. 47]
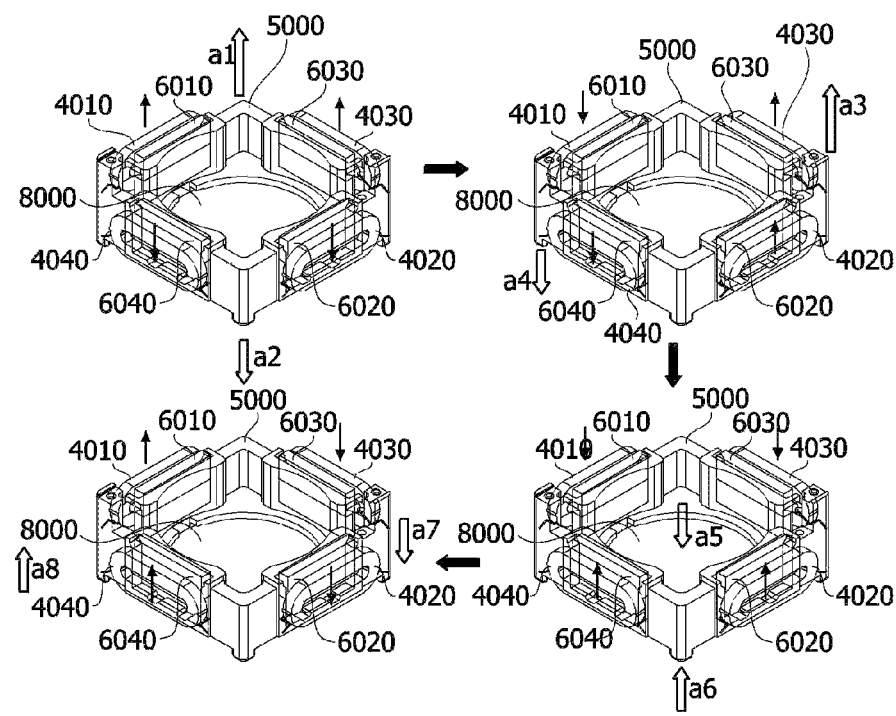

[FIG. 48]
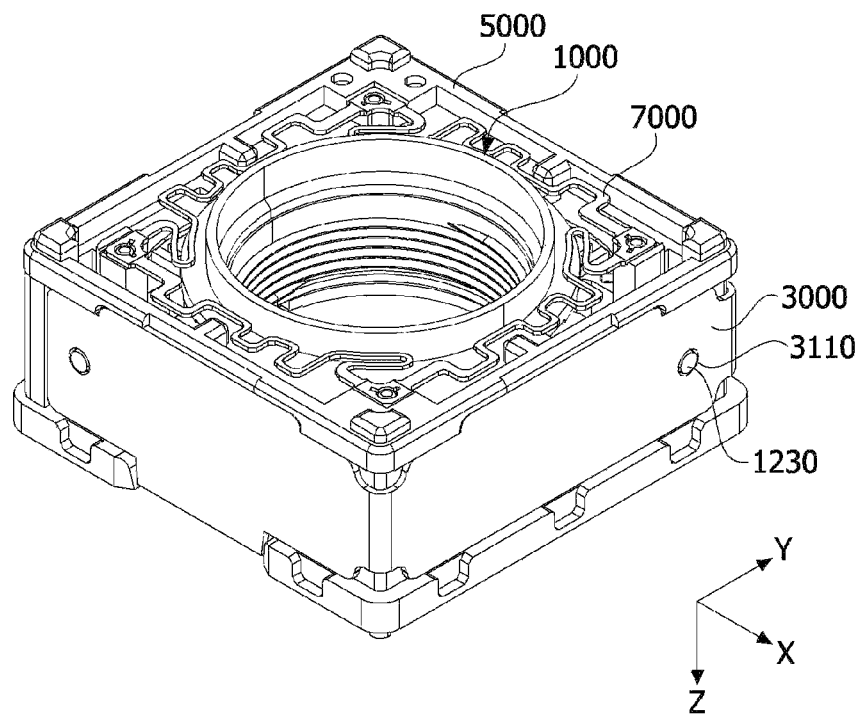

[FIG. 49]
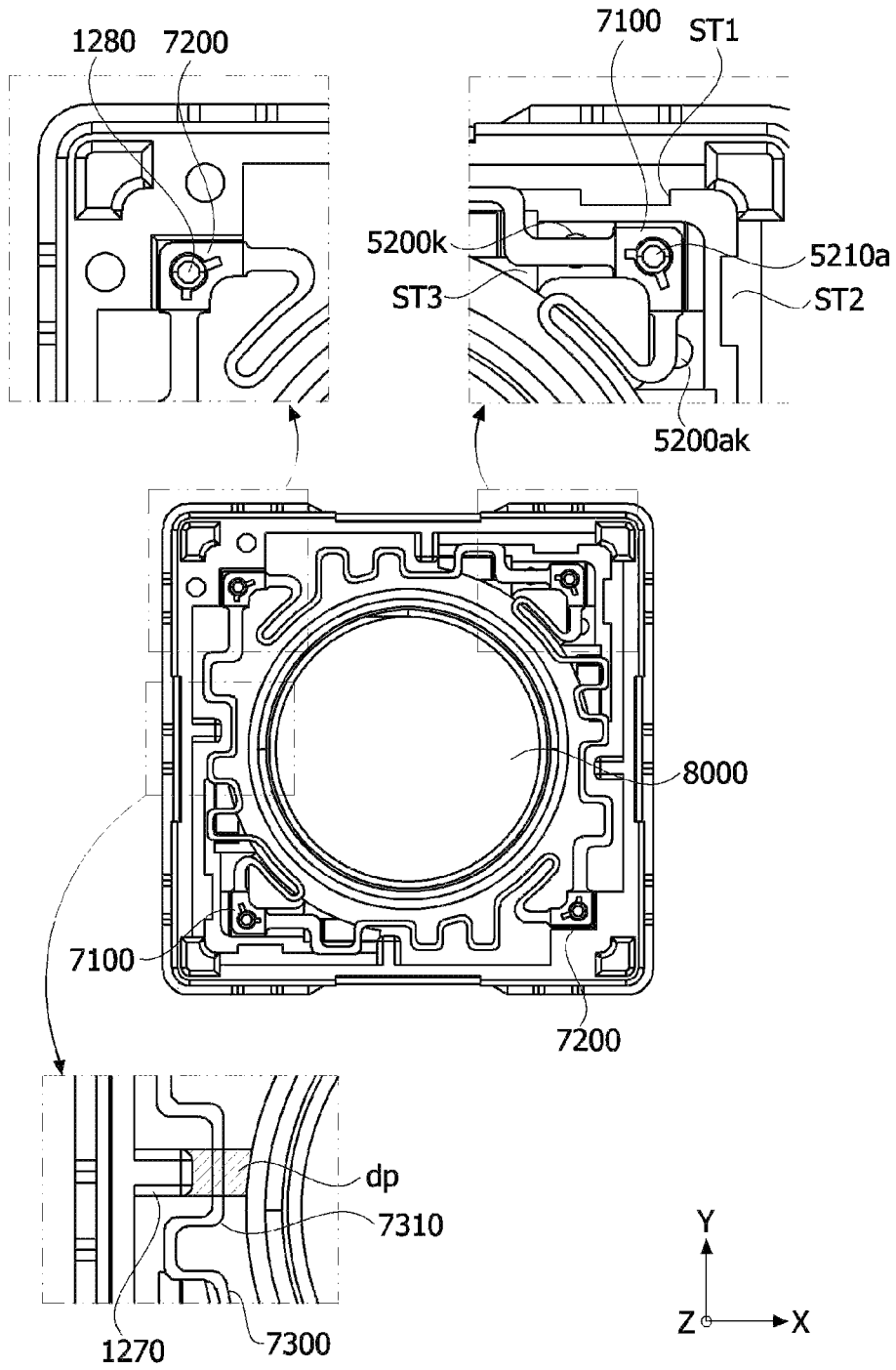

[FIG. 50]
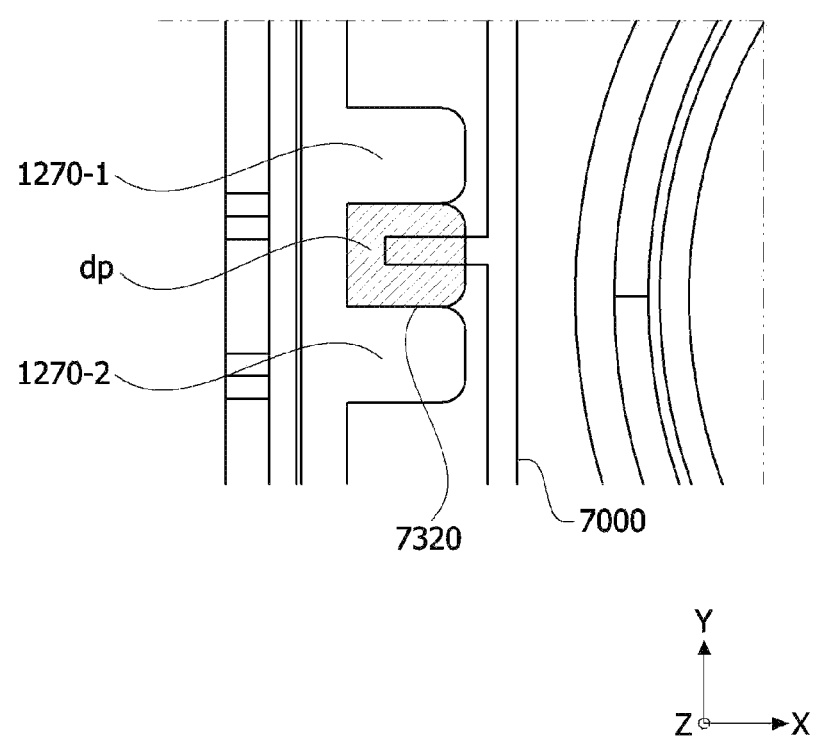

[FIG. 51]
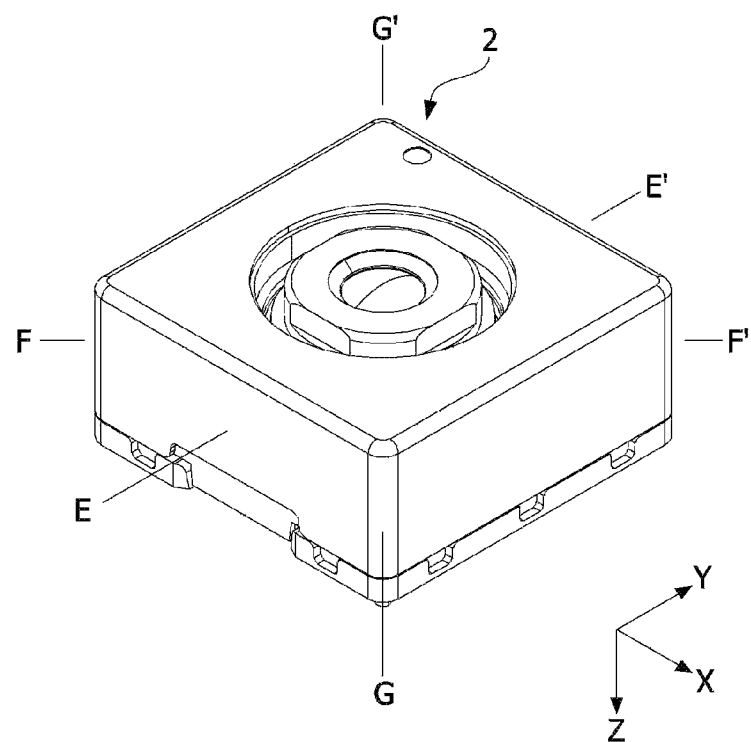

[FIG. 52]
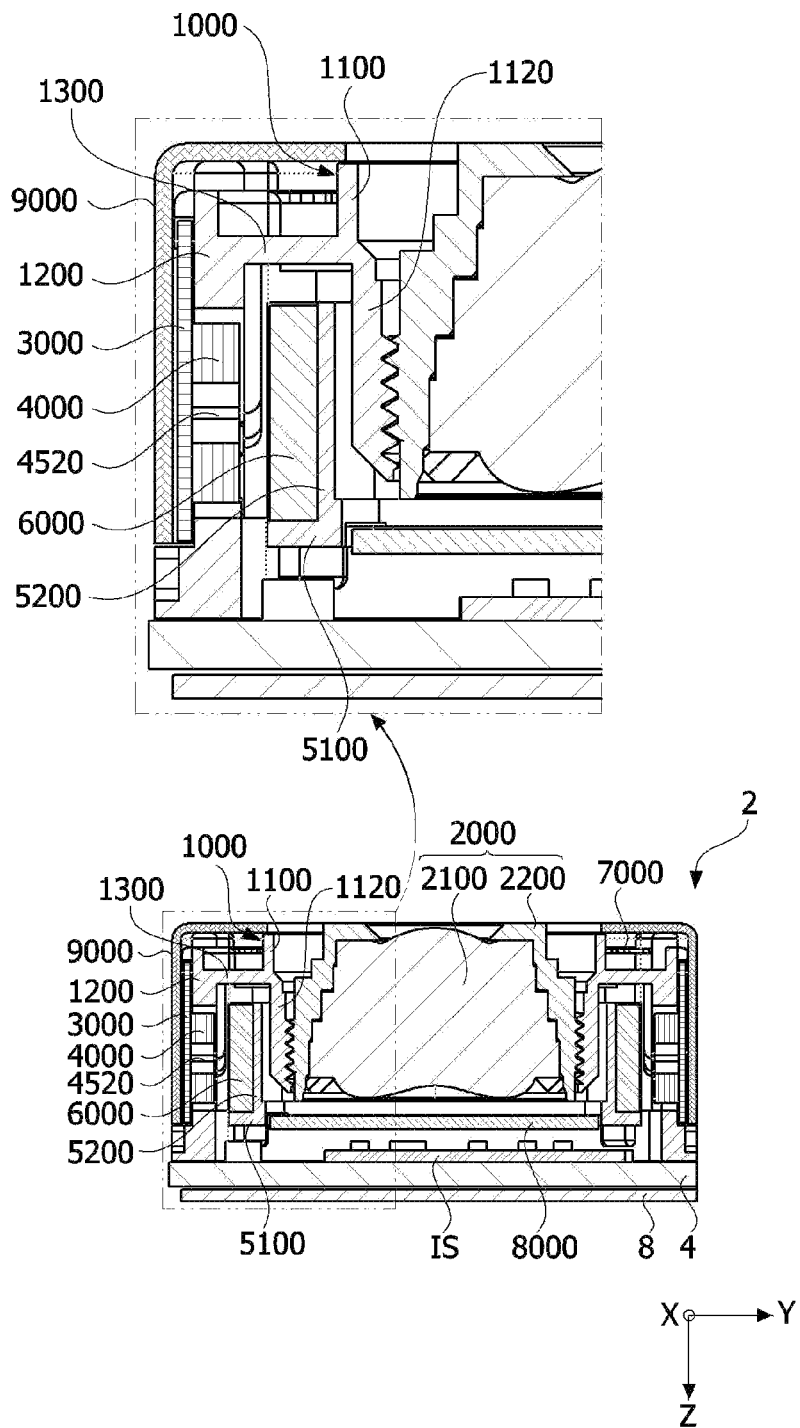

[FIG. 53]
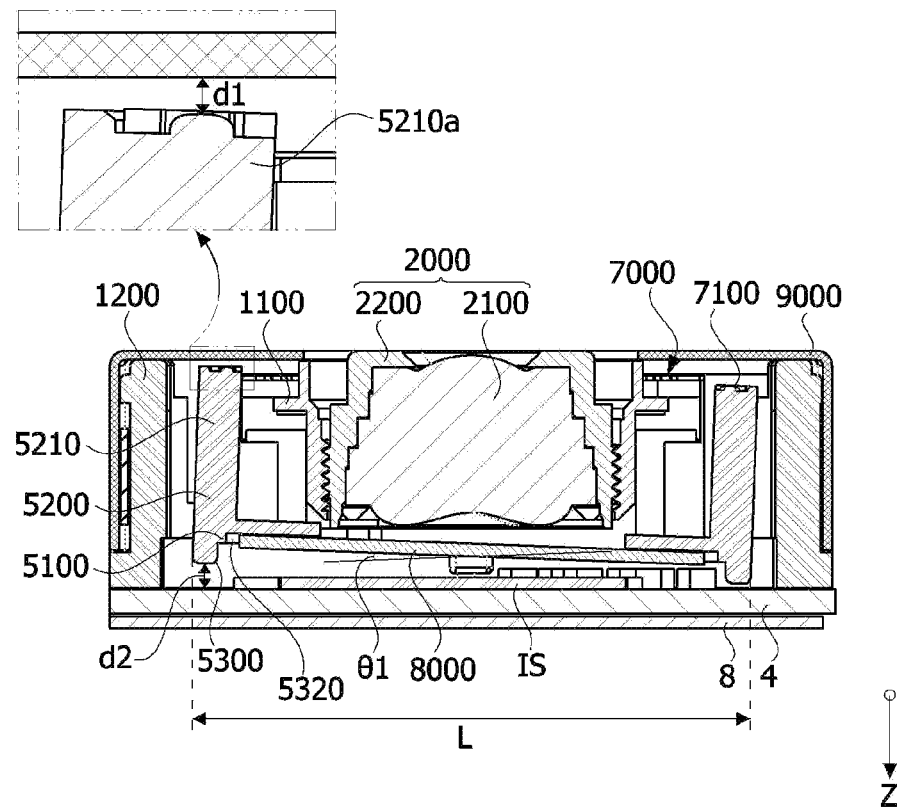
[FIG. 54]
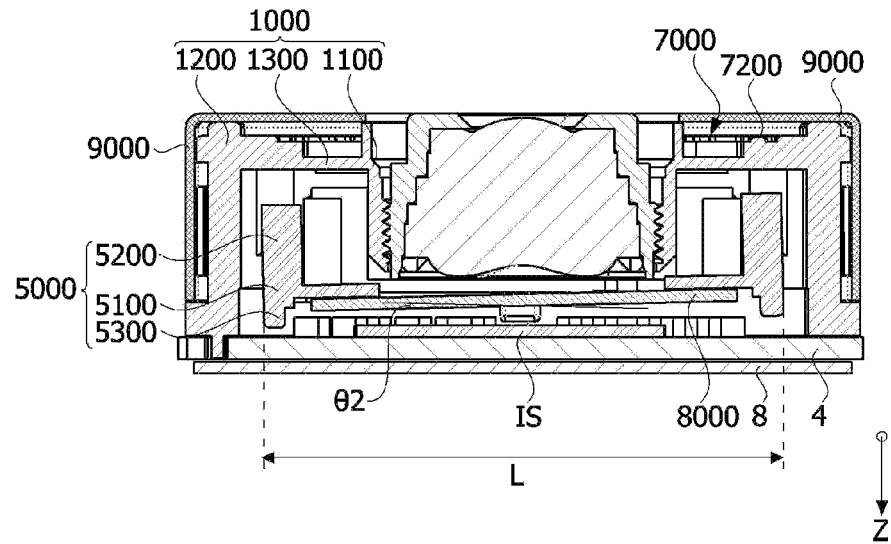

[FIG. 55]
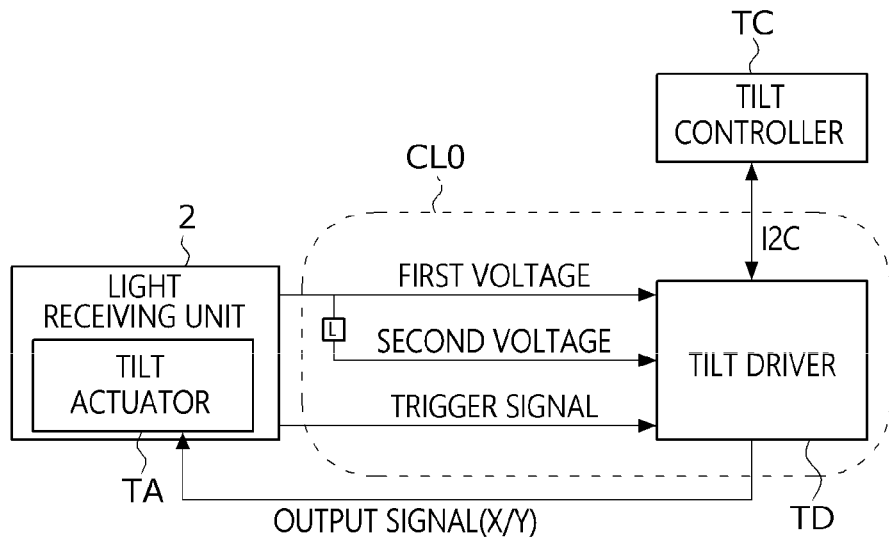
(a)
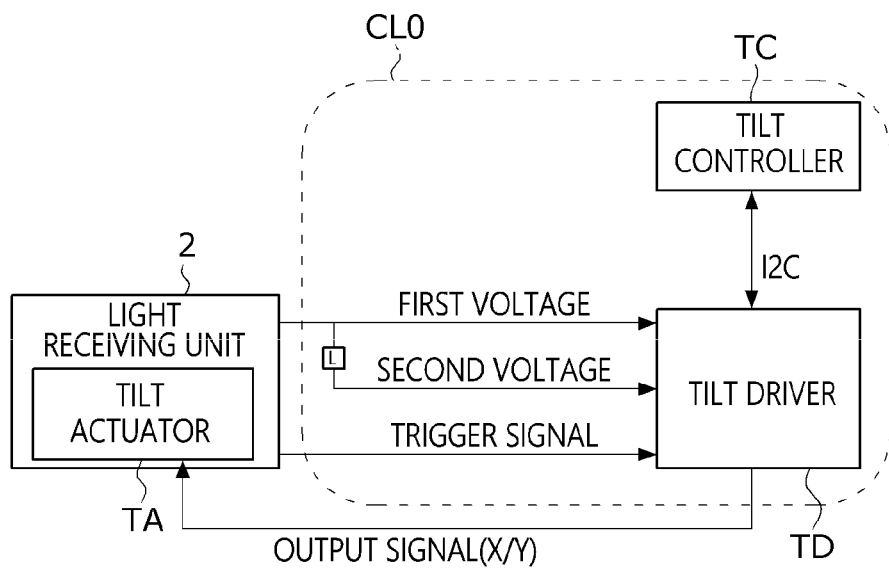
(b)

[FIG. 56]
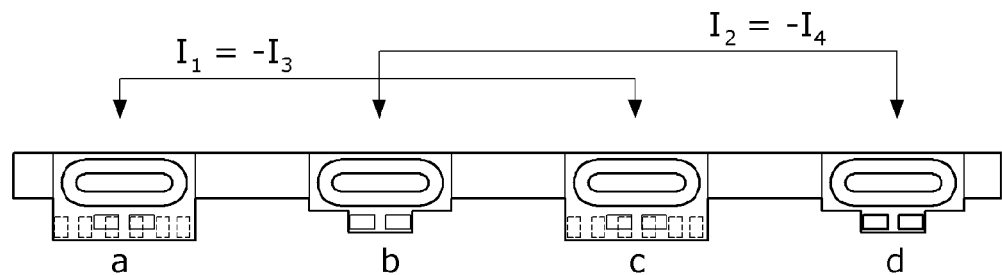
(a)
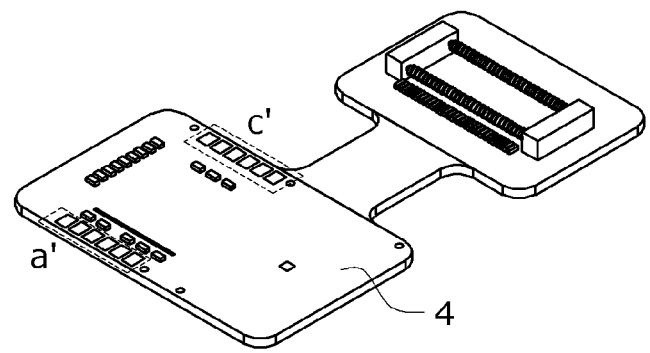
(b)
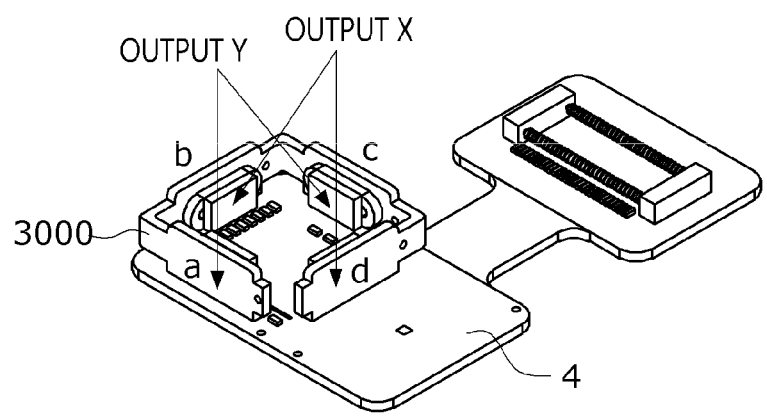
(c)

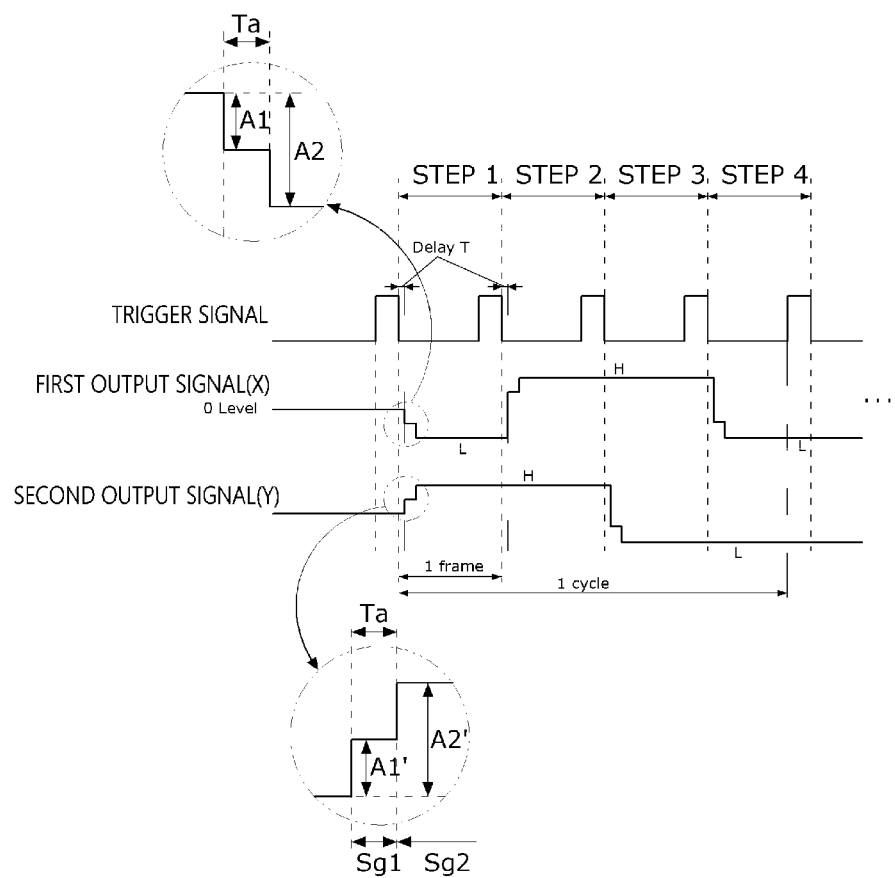
[FIG. 57A]

[FIG. 57B]
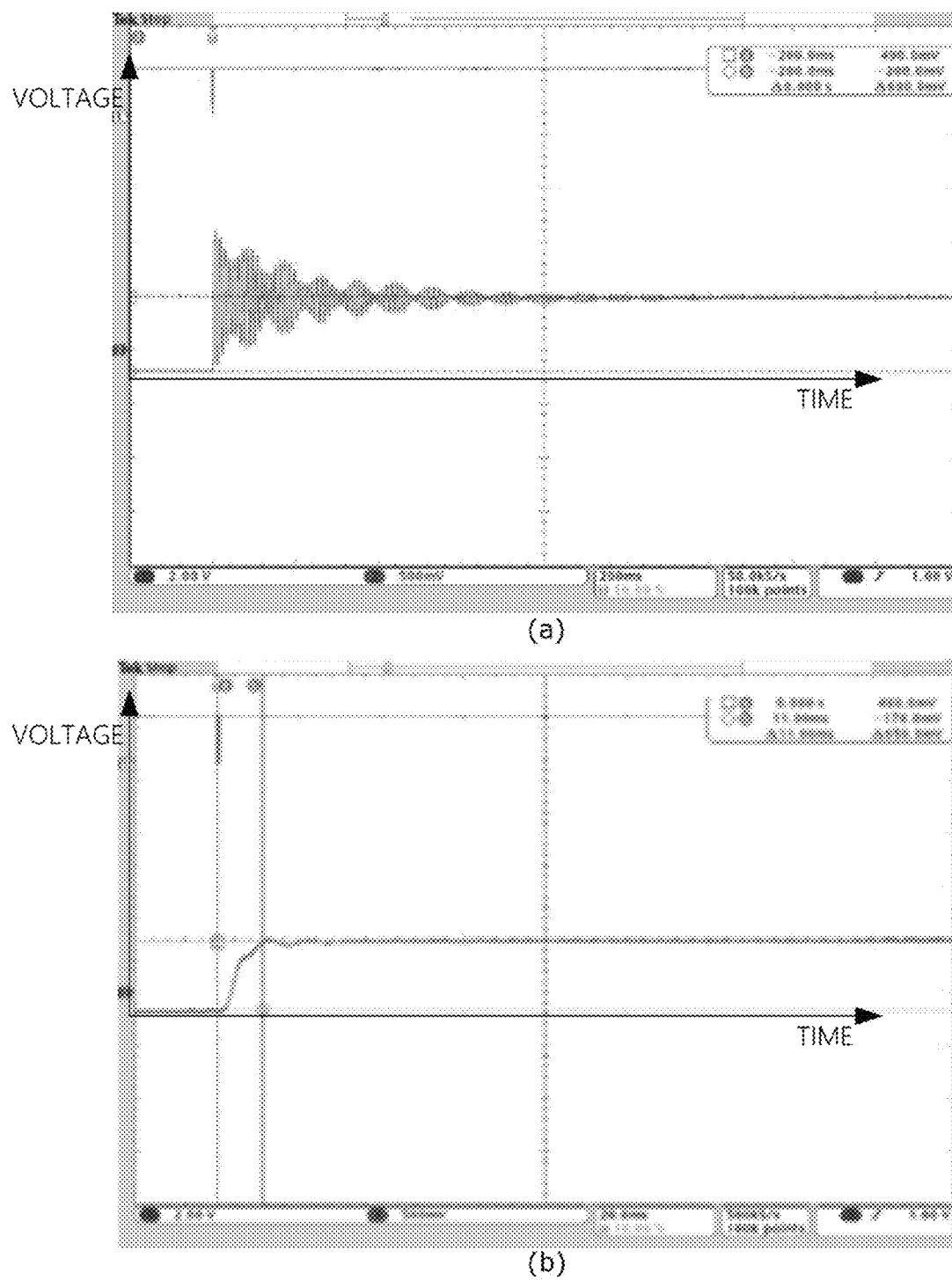

[FIG. 57C]
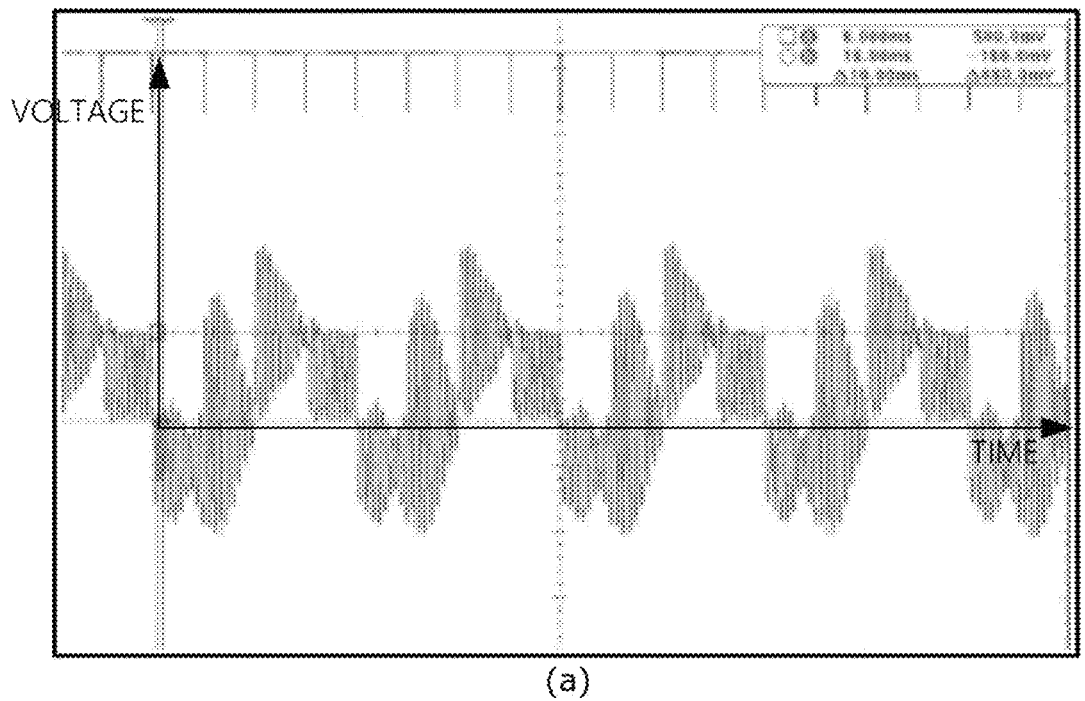
(a)
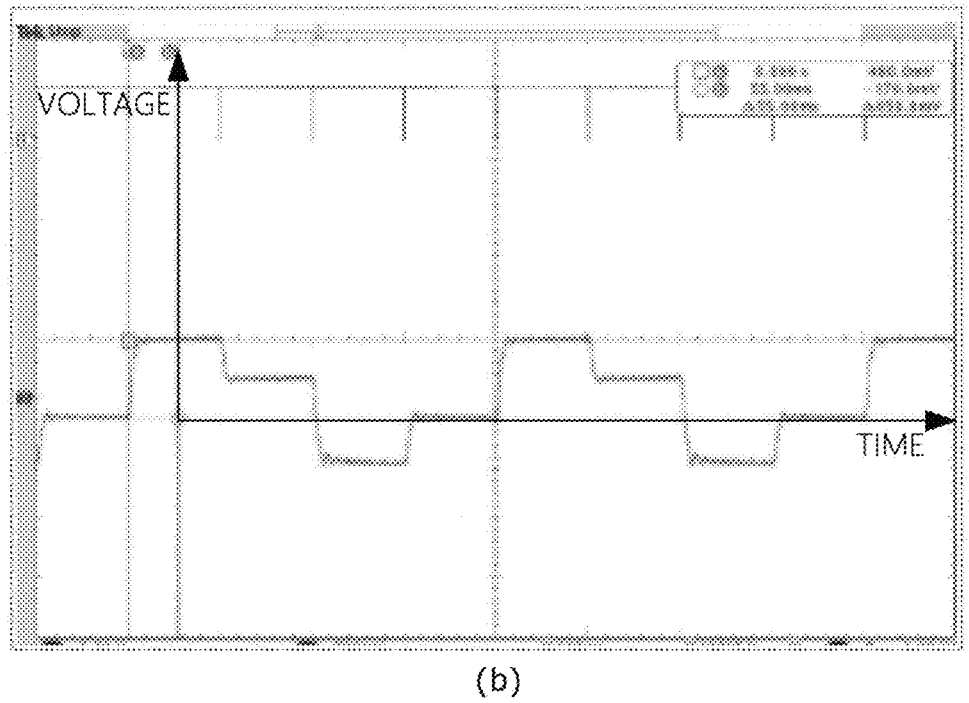
(b)

[FIG. 58]
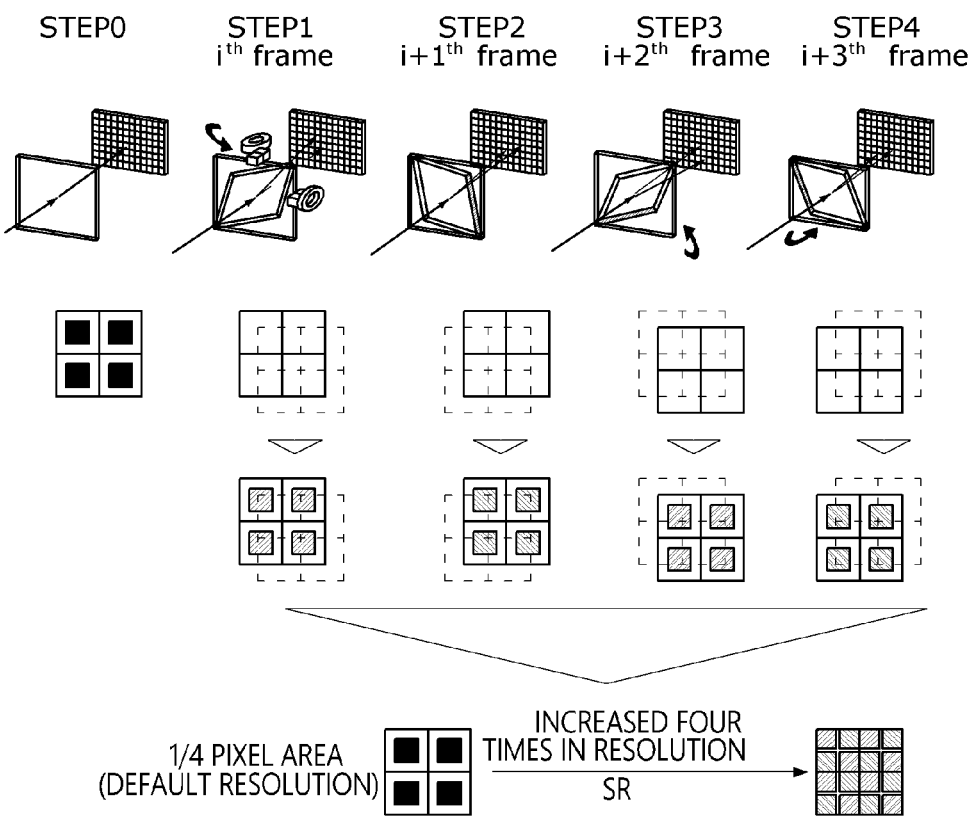

[FIG. 59]
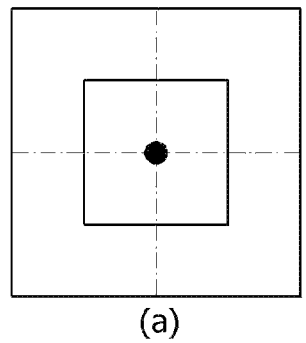
(a)
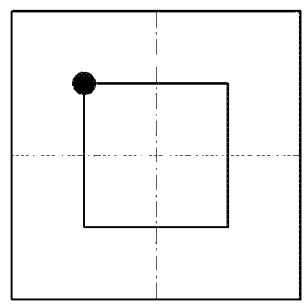
(b)
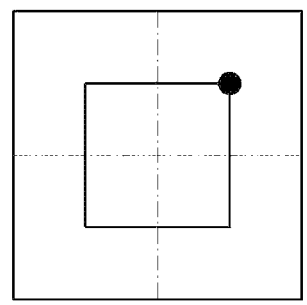
(c)
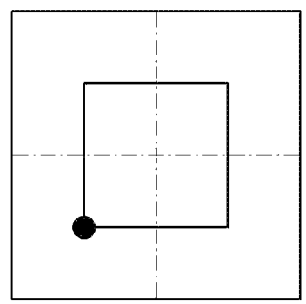
(e)
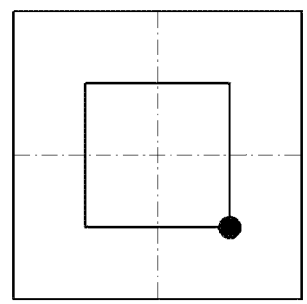
(d)

[FIG. 60]
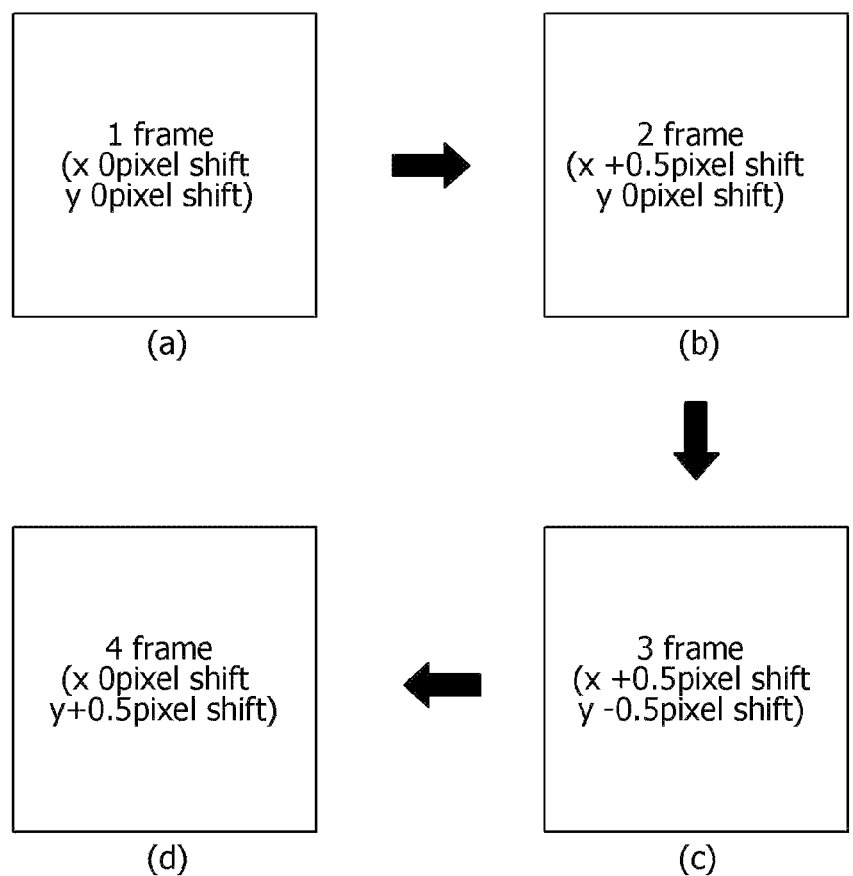

[FIG. 61]
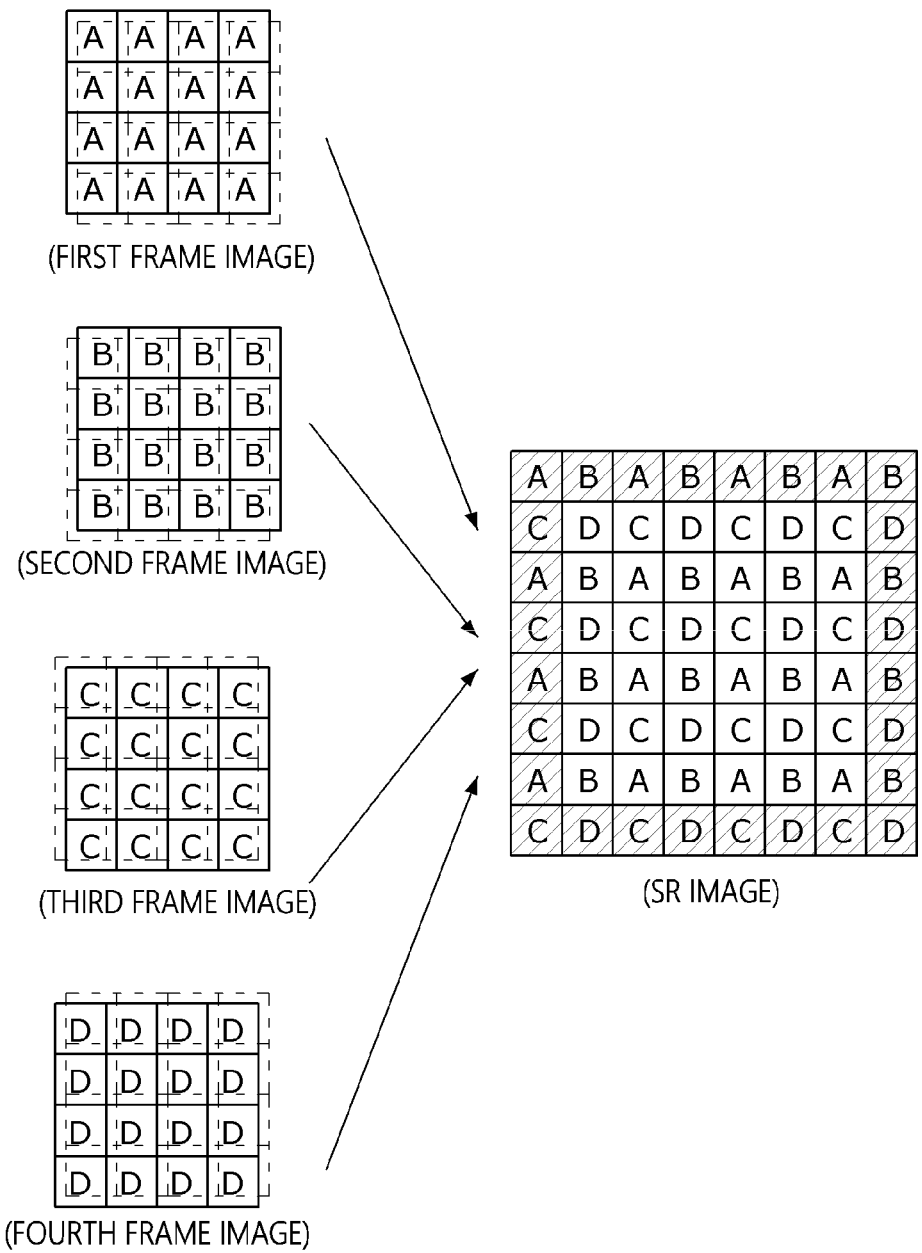

[FIG. 62]
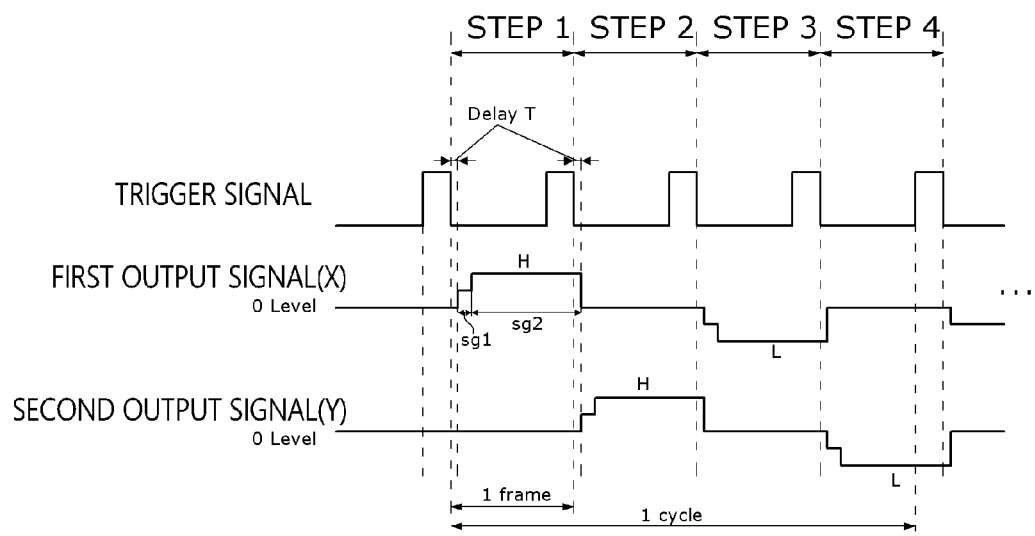

[FIG. 63]
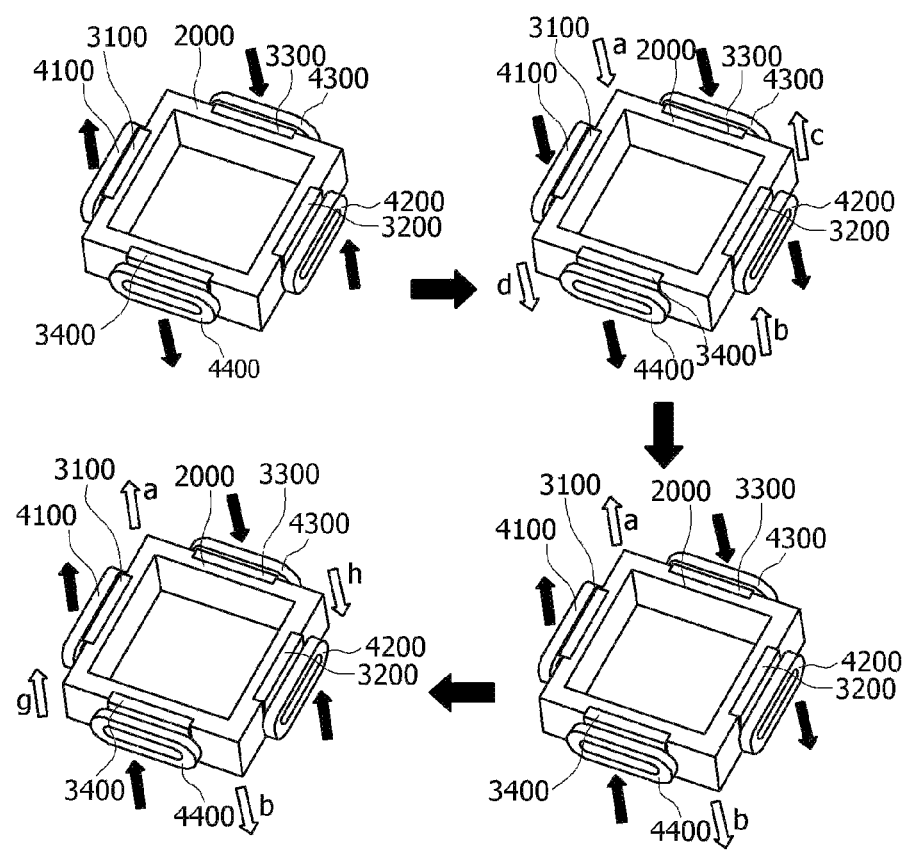

[FIG. 64]
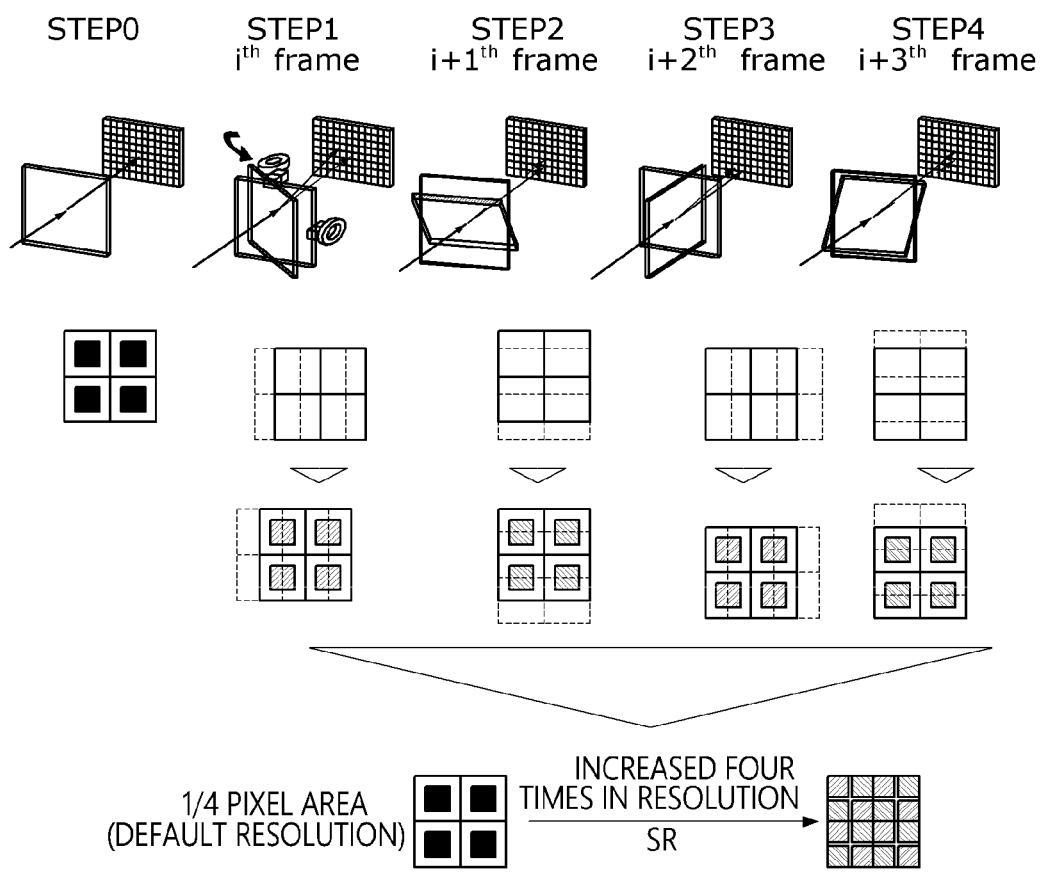

[FIG. 65]
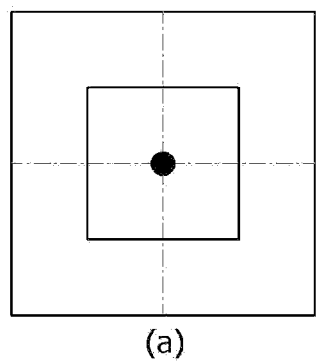
(a)
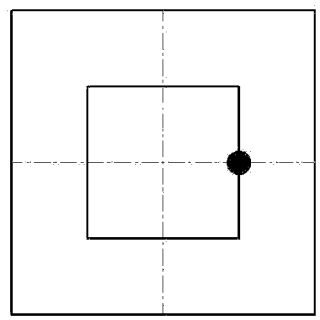
(b)
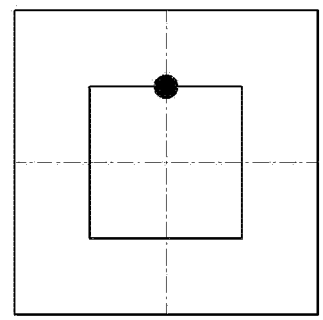
(c)
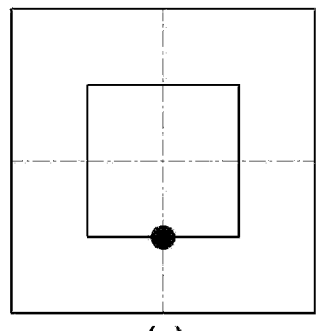
(e)
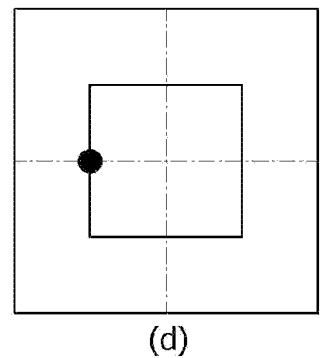
(d)

[FIG. 66]
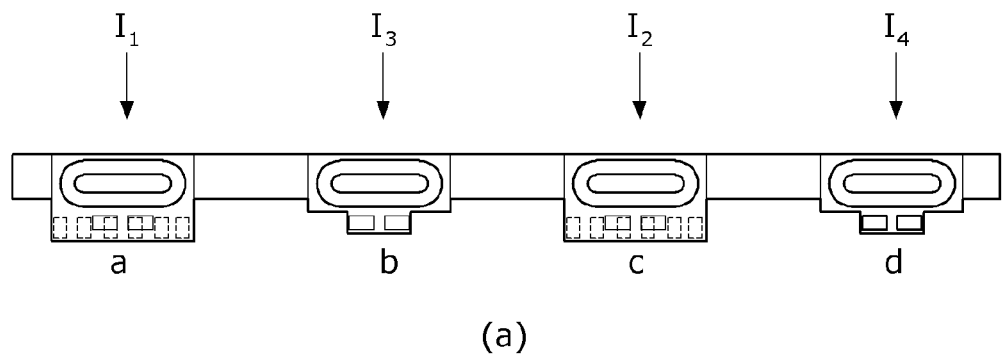
(a)
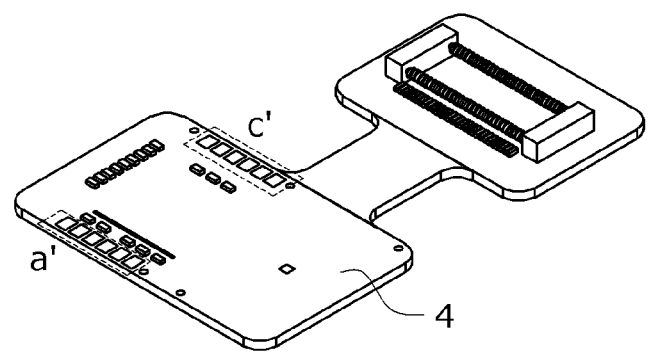
(b)
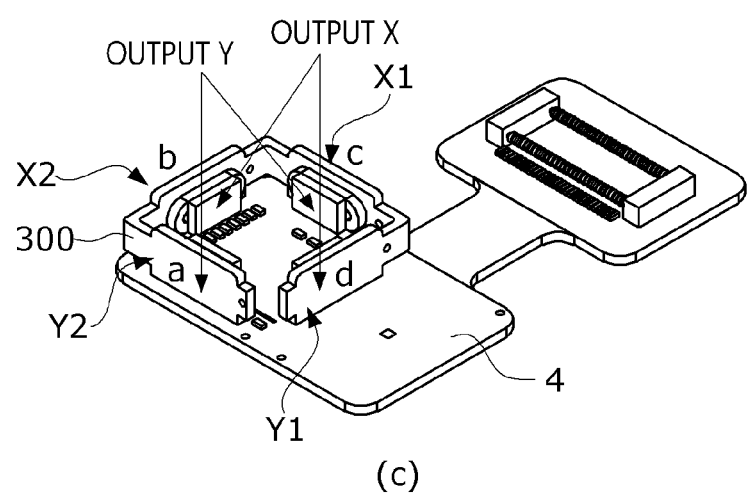
(c)

[FIG. 67]
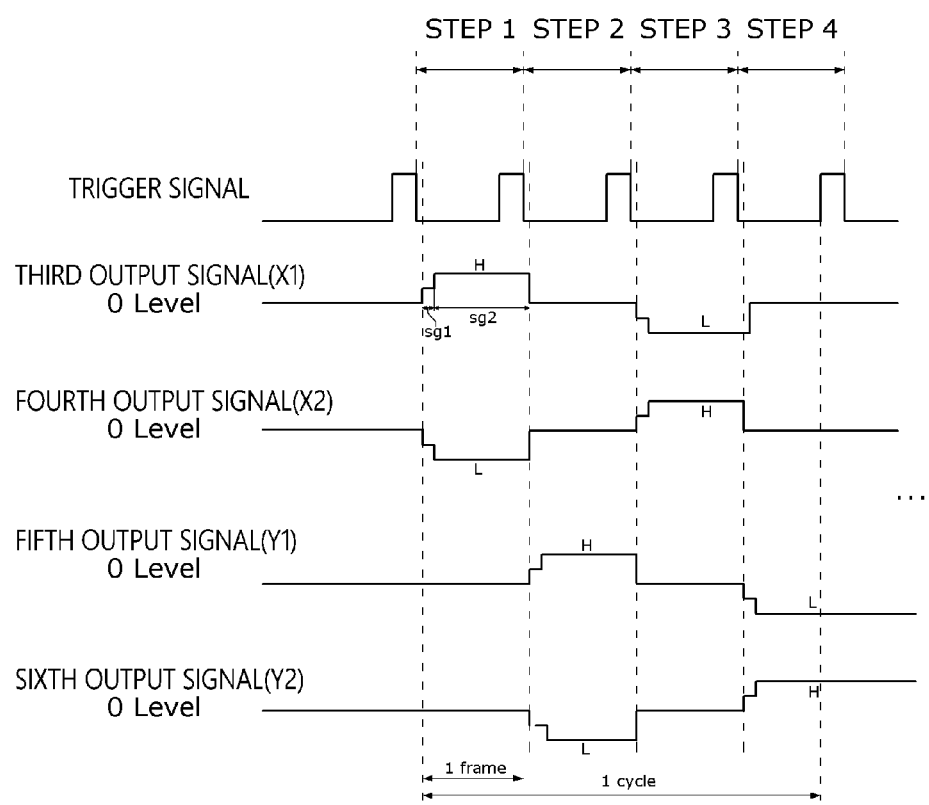

[FIG. 68]
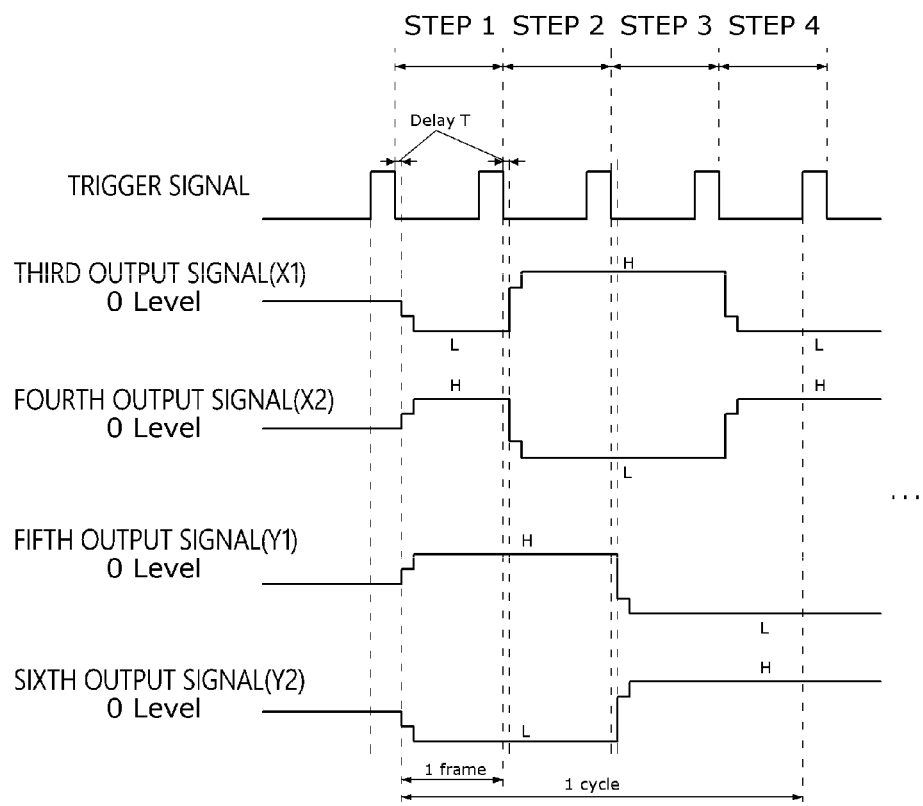

[FIG. 69]
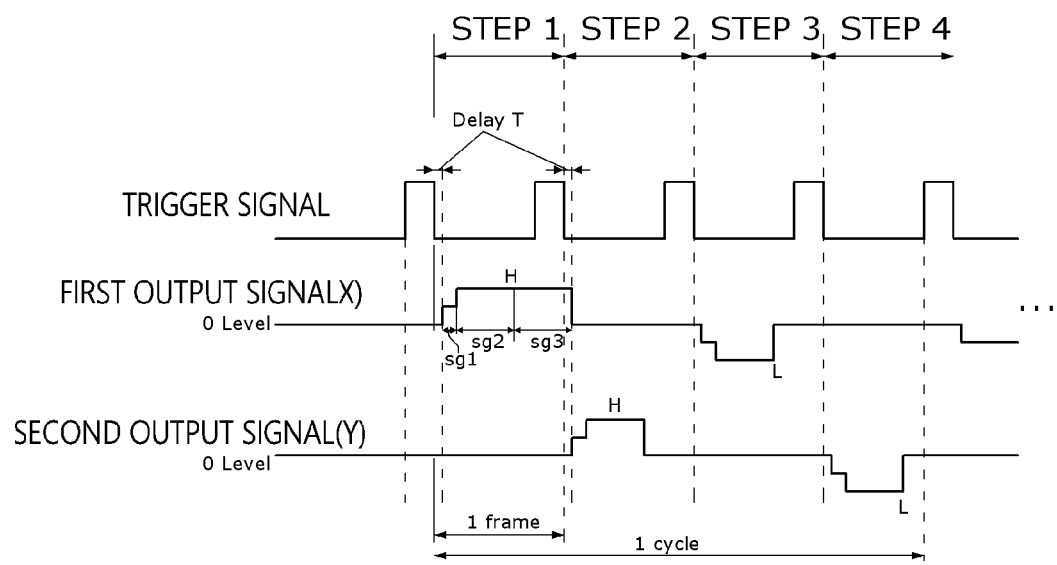

[FIG. 70]
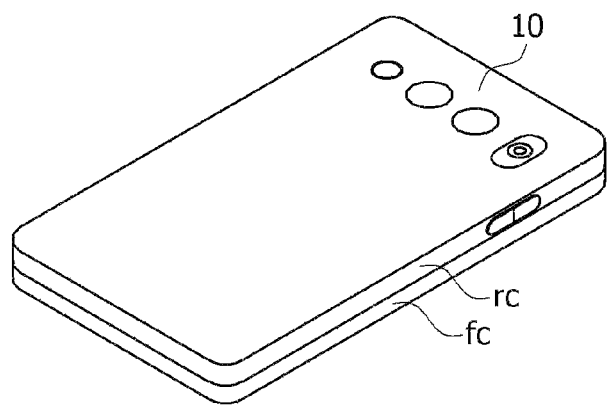

CAMERA MODULE

CROSS REFERENCE TO RELATED APPLICATIONS

This application is the National Phase of PCT International Application No. PCT/KR2021/001784, filed on Feb. 10, 2021, which claims priority under 35 U.S.C. § 119(a) to Patent Application No. 10-2020-0017599, filed in the Republic of Korea on Feb. 13, 2020 and Patent Application No. 10-2020-0078434, filed in the Republic of Korea on Jun. 26, 2020, all of which are hereby expressly incorporated by reference into the present application.

TECHNICAL FIELD

An embodiment relates to a camera module.

BACKGROUND ART

Three-dimensional content is being applied in many fields such as education, manufacturing, and autonomous driving as well as games and culture, and a depth map is required to acquire the three-dimensional content. The depth map refers to information representing a distance in space, and represents perspective information of another point with respect to one point of a two-dimensional image. As a method of acquiring the depth map, a method of projecting infrared (IR) structured light on an object, a method using a stereo camera, a time of flight (TOF) method, and the like are used.

The TOF method or the structured light method uses light in an infrared wavelength range, and recently, attempts have been made to be used for biometric authentication using the characteristics of the infrared wavelength range. For example, it is known that shapes of veins distributed on fingers and the like are not changed from fetus throughout life, and vary from person to person. Accordingly, vein patterns may be identified using a camera apparatus equipped with an infrared light source. To this end, after the fingers are captured, each finger may be detected by removing a background based on the colors and shapes of the fingers, and a vein pattern of each finger may be extracted from the detected color information of each finger. In other words, an average color of the fingers, colors of the veins distributed in the fingers, and colors of wrinkles on the fingers may be different from each other. For example, the colors of the veins distributed on the fingers may have a lighter red than the average color of the fingers, and the colors of the wrinkles on the fingers may be darker than the average color of the fingers. Using these features, a value approximating the vein for each pixel may be calculated, and a vein pattern may be extracted using the calculated result. In addition, an individual may be identified by comparing the extracted vein pattern of each finger with pre-registered data.

However, the current TOF method has a problem in that information that may be obtained per frame, that is, a resolution is low.

In order to increase the resolution, the number of pixels of a sensor may be increased, but in this case, there is a problem in that the volume and manufacturing cost of a camera module are greatly increased.

In addition, when a pattern of an output light signal is modified according to a distance, there is a problem of damaging a human eye or the like. In addition, there is a problem in that energy efficiency is degraded.

Technical Problem

This embodiment is directed to providing a camera module that is used in a time of flight (TOF) method to increase a resolution.

In addition, this embodiment is directed to providing a camera module, which may perform a super resolution (SR) technique.

In addition, this embodiment is directed to providing a camera module with reduced oscillation.

An embodiment is directed to providing a camera device including a drive unit configured to modify a shape of a light signal.

The embodiment is directed to providing a camera module, which prevents a human body or the like from being damaged by energy of a light signal by easily detecting abnormalities such as damage to a lens and a lens module.

Objects of the embodiment are not limited thereto, and objects or effects that may be confirmed from configurations or embodiments, which will be described below will also be included.

Technical Solution

A camera module according to an embodiment of the present invention includes: a light source; an optical unit configured to convert light output from the light source in a planar form or a multi-point form and output the converted light; and an image sensor, wherein the light source is periodically turned on/off, the optical unit moves to be positioned at a first position when the light source is turned on, and the optical unit moves to an initial position when the light source is turned off.

The optical unit may move from the initial position toward the first position before a predetermined time, before the light source is turned on.

When the optical unit is positioned at the initial position, the optical unit may output the light in any one of the planar form and the multi-point form, and when the optical unit is positioned at the first position, the optical unit may output the light in the other one of the planar form and the multi-point form.

When the optical unit is positioned at any one of the initial position and the first position, a distance between the optical unit and the light source may be equal to a back focal distance of the optical unit.

The first position may include a 1-A position and a 2-B position, when the optical unit is positioned at the 1-A position, the optical unit may output the light in the multi-point form, and when the optical unit is positioned at the 1-B position, the optical unit may output the light in the planar form.

A distance between the light source and the optical unit at the 1-A position may be smaller than a distance between the light source and the optical unit at the initial position, and a distance between the light source and the optical unit at the 1-B position may be greater than a distance between the light source and the optical unit at the initial position.

A distance between the initial position and the 1-A position may be smaller than a distance between the initial position and the 1-B position.

A distance between the light source and the optical unit at the 1-A position may be greater than a distance between the light source and the optical unit at the initial position, and a distance between the light source at the 1-B position and the optical unit may be greater than a distance between the light source at the 1-A position and the optical unit.

A distance between the 1-A position and the initial position may be smaller than a distance between the 1-B position and the initial position.

A distance between the light source and the optical unit at the initial position may be greater than a distance between the light source and the optical unit at the 1-B position, and a distance between the light source at the 1-B position and the optical unit may be greater than a distance between the light source at the 1-A position and the optical unit.

The camera module may further include: a drive unit configured to vertically move the optical unit; and a control unit configured to output a light irradiation signal for controlling the light source to output the light, and a drive signal output to the drive unit for the movement of the optical unit, wherein the drive signal may be output before the light irradiation signal is output and the optical unit may be moved to the first positioned before the light source is turned on.

After the light source is turned off, the optical unit may move to an initial state.

The light irradiation signal may have a frame period.

The image sensor may perform exposure according to an exposure signal.

The drive signal may at least partially overlap the exposure signal, and the drive signal may be turned on after a predetermined time after the exposure signal is turned off.

The drive signal may include a first section that is turned on before the light irradiation signal is turned on, and a second section that overlaps a section in which the light irradiation signal is turned on.

The first section may overlap an idle section.

A length of the first section may be adjusted to correspond to the planar form or the point form.

The drive signal may have a polarity corresponding to the planar form and a polarity corresponding to the point form that are opposite to each other.

A camera module according to an embodiment includes: a light source; an optical unit disposed on the light source; and an image sensor, wherein the light source is controlled by a light irradiation signal, and the optical unit moves to be positioned at a specific position when the light irradiation signal is turned on and moves to an initial position when the light irradiation signal is turned off.

The optical unit may be moved by a drive signal, the light irradiation signal may have a frame period, and the drive signal may include a first section that is turned on before the light irradiation signal is turned on, and a second section that overlaps a section in which the light irradiation signal is turned on.

A driving method according to an embodiment includes: transmitting a light irradiation signal for controlling on/off of a light source; and outputting a drive signal for moving an optical unit to a first position when the light source is turned on by the light irradiation signal and moving the optical unit to an initial position when the light source is turned off, wherein the optical unit converts light output from the light source in a planar form or a multi-point form and outputs the converted light.

A camera module according to an embodiment includes: a light source; a light control unit configured to control an output of the light source; an optical unit disposed on a path of light output from the light source; a drive control unit configured to control a position of the optical unit; an image sensor including a plurality of pixels; and a control unit, wherein the image sensor outputs a trigger signal corresponding to an integration time of the pixel, the control unit receives the trigger signal and outputs a drive signal to the drive control unit, the drive control unit moves the position of the optical unit to an initial position or a first position according to on or off of the drive signal, the drive signal is turned on after the trigger signal is turned off, the drive signal is maintained as an on state even after the trigger signal is turned on from an off state, and the drive signal is turned off when the trigger signal is changed from an on state into an off state or after the trigger signal is turned off.

A camera module according to an embodiment includes: a light emitting unit; a light receiving unit; and a control unit, wherein the light receiving unit includes a tilt actuator, and a coil unit and a magnet unit configured to drive the tilt actuator, the magnet unit includes a first magnet and a second magnet, the coil unit includes a first coil facing the first magnet and a second coil facing the second magnet, and the control unit outputs a first output signal input to the first coil and a second output signal input to the second coil, wherein the first output signal and the second output signal include a first signal having a first magnitude and a second signal having a magnitude greater than the first magnitude after the first signal for a shorter time than a natural oscillation period of the tilt actuator.

The control unit may receive a trigger signal from the light receiving unit, and the first output signal and the second output signal may be output from the control unit in response to the trigger signal.

A period of the first signal may be 0.6 times to 0.9 times the natural oscillation period of the tilt actuator in the first output signal and the second output signal.

The magnet unit may include a third magnet and a fourth magnet, wherein the third magnet may be disposed opposite the first magnet and the fourth magnet may be disposed opposite the second magnet, and the coil unit may include a third coil facing the third magnet and a fourth coil facing the fourth magnet.

A direction of a force generated by the interaction between the first magnet and the first coil may be an opposite direction to a direction of a force generated by the interaction between the second magnet and the second coil, and a direction of the force generated by the interaction between the third magnet and the third coil may be an opposite direction to a direction of a force generated by the interaction between the fourth magnet and the fourth coil.

Any one of a low-level current, a high-level current, and a reference level current may be applied to the first output signal and the second output signal, and the reference level current may be a level at which a current is not applied.

The first coil and the third coil may be disposed in an antiparallel structure in which directions of currents flowing through the coils are opposite to each other, and the second coil and the fourth coil may be disposed in an antiparallel structure in which directions of currents flowing through the coils are opposite to each other.

The first output signal may be input to the third coil, the second output signal may be input to the fourth coil, and the trigger signals may include a first trigger signal to a fourth trigger signal sequentially received with the same frame period.

The first output signal may include a 1-1 output signal corresponding to the first trigger signal and a 1-2 output signal corresponding to the third trigger signal, and the second output signal may include a 2-1 output signal corresponding to the second trigger signal and a 2-2 output signal corresponding to the fourth trigger signal, wherein the 2-1 output signal and the 2-2 output signal may have opposite directions.

The 2-1 output signal may be applied between the 1-1 output signal and the 1-2 output signal, and the 1-2 output signal may be applied between the 2-1 output signal and the 2-2 output signal, wherein the 1-1 output signal and the 1-2 output signal may have opposite directions, and the 2-1 output signal and the 2-2 output signal may have opposite directions.

At least one of the first output signal and the second output signal may be applied to the coil unit.

The output signal may have a predetermined delay compared to the trigger signal.

The light receiving unit may include: an optical member through which a reflected light signal reflected by an object passes; an elastic member connected to the optical member; and an image sensor configured to receive the reflected light signal and generate an electrical signal, wherein the tilt actuator may tilt the optical member to repeatedly move a path of the reflected light signal passing through the optical member according to a predetermined rule.

The tilt actuator may move repeatedly in first to fourth tilt sequences in which the reflected light signal passing through the optical member is disposed at different positions on the image sensor.

The optical member may move in different diagonal directions and horizontal directions in the first to fourth tilt sequences.

The camera module may further include an image synthesis part configured to generate a high-resolution image by synthesizing images corresponding to the first to fourth tilt sequences.

The optical member may move in any one of the diagonal direction and the horizontal direction of the image sensor with respect to the path of the reflected light signal in a state of being disposed parallel to the image sensor.

The tilt actuator may tilt the optical member so that any one of combinations in which the first to fourth tilt sequences are sequentially performed is repeated.

A camera module according to an embodiment includes: a light emitting unit; a light receiving unit; and a control unit, wherein the light receiving unit includes a tilt actuator, and a coil and a magnet configured to drive the tilt actuator, the magnet includes a first magnet and a second magnet, the coil includes a first coil facing the first magnet and a second coil facing the second magnet, and the control unit outputs a first output signal input to the first coil and a second output signal input to the second coil, wherein the first output signal and the second output signal include a first signal having a first magnitude and a second signal having a magnitude greater than the first magnitude after the first signal, and the first signal of the second output signal is output when the second signal of the first output signal is maintained or the second signal of the first output signal is turned off.

The first output signal and the second output signal may include a first signal having a first magnitude and a second signal having a magnitude greater than the first magnitude after the first signal for a shorter time than the natural oscillation period of the actuator.

Advantageous Effects

According to an embodiment, a camera module can be flexibly driven according to the demand of various applications by changing a light pattern of light or a light signal according to various variables such as a distance to an object and a resolution.

In addition, according to the embodiment, it is possible to prevent damage to a human body or the like by energy of a light signal by easily detecting abnormalities such as damage to a lens and a lens module.

According to the embodiment, it is possible to reduce power consumption.

Through this embodiment, a depth map can be acquired with high resolution even without significantly increasing the number of pixels of a sensor.

In addition, it is possible to acquire a high-resolution image from a plurality of low-resolution images obtained by the camera module according to this embodiment through a super resolution (SR) technique.

In addition, it is possible to manufacture the camera module that provides an image with improved accuracy by reducing an oscillation when the SR technique is performed.

Various and beneficial advantages and effects of the present invention are not limited to the above-described contents, and will be more easily understood in a course of describing specific embodiments of the present invention.

DESCRIPTION OF DRAWINGS

FIG. 1 is a perspective view of a camera module according to an embodiment.

FIG. 2 is a cross-sectional view taken along line I-I' in FIG. 1.

FIG. 3 is an exploded perspective view of the camera module according to the embodiment.

FIG. 4 is a view showing a housing of a light emitting unit according to the embodiment.

FIG. 5 is a view showing a first optical unit and a first lens barrel of the light emitting unit according to the embodiment.

FIG. 6 is a view showing a drive magnet part and a drive coil part of the light emitting unit according to the embodiment.

FIG. 7 is a view showing the coupling of an elastic part of the light emitting unit according to the embodiment.

FIG. 8 is a view showing a first elastic member of the light emitting unit according to the embodiment.

FIG. 9 is a view showing a second elastic member of the light emitting unit according to the embodiment.

FIG. 10 is a view showing one side of a side substrate of the light emitting unit according to the embodiment.

FIG. 11 is a view showing the other side of the side substrate of the light emitting unit according to the embodiment.

FIG. 12 is a view showing a base of the camera module according to the embodiment.

FIG. 13 is a view showing a second optical unit and a second lens barrel of a light receiving unit according to the embodiment.

FIG. 14 is a view showing a cover of the camera module according to the embodiment.

FIG. 15 is a view for describing movements of the first optical unit and the first lens module in the light emitting unit according to the embodiment.

FIG. 16 is a view for describing a form of a light signal according to the movements of the first optical unit and the first lens module.

FIG. 17 is a view showing an example of an image of the light receiving unit according to the movements of the first optical unit and the first lens module.

FIG. 18 is a view for describing a process of generating an electrical signal in a sensor according to the embodiment.

FIG. 19 is a view for describing the sensor according to the embodiment.

FIG. 20 is a timing diagram generating one frame in the sensor according to the embodiment.

FIG. 21 is a timing diagram of one frame period generating a depth image in a sensor according to another embodiment.

FIG. 22 is a timing diagram generating an electrical signal for each integration time within the frame period in FIG. 21.

FIG. 23 is a timing diagram in an integration time PL1 in FIG. 21.

FIG. 24 is a timing diagram in an integration time PL2 in FIG. 21.

FIG. 25 is a timing diagram in an integration time PL3 in FIG. 21.

FIG. 26 is a timing diagram in an integration time PL4 in FIG. 21.

FIG. 27A is a view for describing the driving of a control unit according to the embodiment.

FIG. 27B is a view for describing the movement of an optical unit according to a first embodiment.

FIG. 27C is a view for describing the movement of an optical unit according to a second embodiment.

FIG. 27D is a view for describing the movement of an optical unit according to a third embodiment.

FIG. 27E is a view for describing the movement of an optical unit according to a fourth embodiment.

FIG. 27F is a view for describing the movement of an optical unit according to a fifth embodiment.

FIG. 27G is a block diagram of the camera module according to the embodiment.

FIG. 28 is a view for describing the driving of a control unit according to a first embodiment.

FIG. 29 is a view for describing the adjustment of a drive signal for providing a planar form or a point form.

FIG. 30 is a view for describing a first example of the drive signal for providing the planar form or the point form.

FIG. 31 is a view for describing a second example of the drive signal for providing the planar form or the point form.

FIG. 32 is a view for describing the driving of a control unit according to a second embodiment.

FIG. 33 is a view for describing the driving of a control unit according to a third embodiment.

FIG. 34 is a perspective view of a camera module according to another embodiment.

FIG. 35 is an exploded perspective view of the camera module according to another embodiment.

FIG. 36A is a cross-sectional view taken along line A-A' in FIG. 34.

FIG. 36B is a cross-sectional view taken along line B-B' in FIG. 34.

FIG. 36C is a cross-sectional view taken along line C-C' in FIG. 34.

FIG. 36D is a cross-sectional view taken along line D-D' in FIG. 34.

FIG. 37 is a perspective view of a partial configuration of the light receiving unit of the camera module according to another embodiment.

FIG. 38 is a perspective view of a housing of the camera module according to another embodiment.

FIG. 39 is a perspective view of a partial configuration of the camera module according to another embodiment.

FIG. 40 is a perspective view of a substrate and a coil of the camera module according to another embodiment.

FIG. 41 is a view showing the coupling between coils and substrates of camera modules according to various other embodiments.

FIG. 42 is an exploded perspective view showing a holder, a magnet, and an optical member of the camera module according to another embodiment.

FIG. 43 is an exploded perspective view showing the holder, the magnet, and the optical member of the camera module according to another embodiment.

FIG. 44 is a perspective view from another angle in FIG. 43.

FIG. 45 is a top view of the holder, the magnet, and the optical member of the camera module according to another embodiment.

FIG. 46 is a view for describing a Lorentz force between the magnet and the coil in the embodiment.

FIG. 47 is a view for describing a diagonal tilting control of the optical member in the embodiment.

FIG. 48 is a perspective view of a part of the camera module including an elastic member according to another embodiment.

FIG. 49 is a top view of a part of the camera module including the elastic member according to another embodiment.

FIG. 50 is a view of a part of the camera module including the elastic member according to another embodiment according to a modified example.

FIG. 51 is a perspective view of the camera module according to another embodiment.

FIG. 52 is a cross-sectional view taken along line E-E' in FIG. 51.

FIG. 53 is a cross-sectional view taken along line F-F' in FIG. 51.

FIG. 54 is a cross-sectional view taken along line G-G' in FIG. 51.

FIG. 55 is a view for describing a tilt unit according to another embodiment.

FIG. 56 is a view for specifically describing a tilt actuator.

FIG. 57A is a view for describing a drive sequence of a tilt unit according to a first another embodiment.

FIG. 57B is a view for describing an output of the drive unit in FIG. 57A in STEP 1.

FIG. 57C is a view for describing the output of the drive unit in FIG. 57A per frame period.

FIG. 58 is a view showing a light path movement process according to the first another embodiment.

FIG. 59 is a conceptual diagram conceptually showing sequentially a plurality of images acquired for a super resolution (SR) technique from a camera module according to the first another embodiment.

FIG. 60 is a view sequentially showing images of first to fourth frames acquired for the SR technique from the camera module according to the first another embodiment.

FIG. 61 is a view for describing SR images.

FIG. 62 is a view for describing a drive sequence of a tilt unit according to a second another embodiment.

FIG. 63 is a view for describing a tilting control of a filter by driving the tilt unit according to the second another embodiment.

FIG. 64 is a view showing a light path movement process according to the second another embodiment.

FIG. 65 is a conceptual diagram conceptually showing sequentially a plurality of images acquired for the super resolution (SR) technique from the camera module according to the second another embodiment.

FIG. 66 is a view for describing a tilt actuator according to still another embodiment.

FIG. 67 is a view for describing a drive sequence of a tilt unit according to a third another embodiment.

FIG. 68 is a view for describing a drive sequence of a tilt unit according to a fourth another embodiment.

FIG. 69 is a view for describing a drive sequence of a tilt unit according to a modified example.

FIG. 70 is a view showing an optical device including the camera module according to the embodiment.

MODES OF THE INVENTION

Hereinafter, exemplary embodiments of the present invention will be described in detail with reference to the accompanying drawings.

However, the technical spirit of the present invention is not limited to some embodiments described but may be implemented in various different forms, and one or more of the components may be used by being selectively coupled or substituted between the embodiments without departing from the technical spirit scope of the present invention.

In addition, terms (including technical and scientific terms) used in the embodiments of the present invention may be construed as the meaning that may be generally understood by those skilled in the art to which the present invention pertains, unless specifically defined and described explicitly, and the meaning of generally used terms such as terms defined in the dictionary may be construed in consideration of the contextual meaning of the related art.

In addition, the terms used in the embodiments of the present invention are intended to describe the embodiments and are not intended to limit the present invention.

In this specification, the singular form may also include the plural form unless otherwise specified in the phrase, and when it is described as "at least one (or one or more) of A and B, C," it may include one or more of all possible combinations of A, B, and C.

In addition, in describing the components of the embodiment of the present invention, terms such as first, second, A, B, (a), and (b) may be used.

These terms are only intended to distinguish the component from other components, and the essence, sequence, or order of the corresponding components is not limited by the terms.

In addition, when it is described that a component is "connected," "coupled," or "connected" to another component, this may include a case in which the component is not only directly connected, coupled, or connected to another component, but also a case in which the component is "connected," "coupled," or "connected" to another component through other components interposed therebetween.

In addition, when it is described as being formed or disposed on "top (above) or bottom (below)" of each component, the top (above) or bottom (below) includes not only a case in which two components come into direct contact with each other but also a case in which one or more other components are formed or disposed between the two components. In addition, when expressed as "top (above) or bottom (below)," this may also include the meaning of not only an upward direction but also a downward direction with respect to one component.

Hereinafter, an optical device according to this embodiment will be described.

The optical device may include any one of a cell phone, a mobile phone, a smart phone, a portable smart device, a digital camera, a laptop computer, a digital broadcasting terminal, a personal digital assistant (PDA), a portable multimedia player (PMP), and a navigation system. However, the type of the optical device is not limited thereto, and any device for capturing images or photos may be included in the optical device.

The optical device may include a main body. The main body may be in the form of a bar. Alternatively, the main body may have various structures such as a slide type, a folder type, a swing type, and a swivel type in which two or more sub-bodies are coupled to be relatively movable. The main body may include a case (casing, housing, or cover) forming an exterior. For example, the main body may include a front case and a rear case. Various electronic components of the optical device may be embedded in a space formed between the front case and the rear case.

The optical device may include a display. The display may be disposed on one surface of the main body of the optical device. The display may output an image. The display may output an image captured by a camera.

The optical device may include the camera. The camera may include a time of flight (TOF) camera apparatus. The TOF camera apparatus may be disposed on a front surface of the main body of the optical device. In this case, the TOF camera apparatus may be used for various types of biometric recognition such as user's face recognition and iris recognition for security authentication of the optical device.

Hereinafter, a configuration of the TOF camera apparatus according to this embodiment will be described with reference to the drawings.

FIG. 1 is a perspective view of a camera module according to an embodiment, FIG. 2 is a cross-sectional view taken along line I-I' in FIG. 1, and FIG. 3 is an exploded perspective view of the camera module according to the embodiment.

Referring to FIGS. 1 to 3, a camera module 10 according to an embodiment may include a light emitting unit 1, a light receiving unit 2, a connect unit 3, a main substrate 4, an extension substrate 5, a connection substrate 6, and a connector 7. In addition, the camera module 10 according to the embodiment may include a control unit CT. The control unit CT may be positioned on any one of the light emitting unit 1, the light receiving unit 2, the connect unit 3, and the main substrate 4. In addition, the control unit CT may be a concept corresponding to a control unit to be described below or may be a concept included in the control unit to be described below. In addition, in this specification, the camera module may be a concept having only one of the light emitting unit 1 and the light receiving unit 2. Alternatively, the camera module may be a concept including a substrate (e.g., the main substrate 4) electrically connected to any one of the light emitting unit 1 and the light receiving unit 2.

First, the light emitting unit 1 may be a light emitting module, a light emitting unit, a light emitting assembly, or a light emitting device. The light emitting unit 1 may generate light or a light signal and then irradiate an object with the light or light signal. Hereinafter, the light or the light signal is used interchangeably. At this time, the light emitting unit 1 may generate and output the light signal in the form of a pulse wave or in the form of a continuous wave. The continuous wave may be in the form of a sinusoid wave or a squared wave.

In addition, by generating the light signal in the form of the pulse wave or the continuous wave, for example, the TOF camera apparatus may detect a phase difference between the light signal output from the light emitting unit 1 and the input light input to the light receiving unit 2 of the TOF camera apparatus after the light signal is reflected from an object O. In this specification, the output light may refer to the light signal output from the light emitting unit 1 and incident on the object O, and the input light or the reflected light may refer to the light signal output from the light emitting unit 1 to reach the object O and reflected from the object O and then input to the TOF camera apparatus. In addition, from the viewpoint of the object O, the output light may be incident light, and the input light may be reflected light.

The light emitting unit 1 irradiates the generated light signal to the object O for a predetermined integration time. Here, the integration time refers to one frame period. When a plurality of frames are generated, a set integration time may be repeated. For example, when the TOF camera apparatus captures the object at 20 FPS, the integration time is ½₀ [sec.]. In addition, when 100 frames are generated, the integration time may be repeated 100 times. Correspondingly, a light source may also emit light in a frame period.

In addition, the light emitting unit 1 may generate a plurality of light signals having different frequencies. The light emitting unit 1 may sequentially generate repeatedly the plurality of light signals having different frequencies. Alternatively, the light emitting unit 1 may also generate the plurality of light signals having different frequencies at the same time.

The light emitting unit 1 may include a light source LS. The light source LS may generate, output, or irradiate light. Light generated by the light source LS may be infrared rays having a wavelength of 770 nm to 3000 nm. Alternatively, light generated by the light source LS may be visible rays having a wavelength of 380 nm to 770 nm. The light source LS may include all of various elements configured to generate and output light. For example, the light source LS may include a light emitting diode (LED) and a vertical cavity surface emitting laser (VCSEL). For example, when the light source LS is the vertical cavity surface emitting laser, a plurality of emitters may be formed in the form disposed horizontally or vertically on a plane perpendicular to an optical axis. Furthermore, when light is output in a point form, the point form may correspond to the form in which the emitters are arranged. For example, when the emitter is 3×3 (width×length), light in the point form may also be 3×3.

In addition, the light source LS may include a plurality of light emitting diodes having a form arranged according to a regular pattern. In addition, the light source LS may include an organic light emitting diode (OLED) or a laser diode (LD).

The light emitting unit 1 may include a light modulation part configured to modulate light. The light source LS may generate a light signal in the form of the pulse wave or the continuous wave by repeating blinking (on/off) at a certain time interval. The certain time interval may correspond to a frequency of the light signal. In addition, the blinking of the light source LS may be controlled by the light modulation part.

The light modulation part may control the blinking of the light source LS to control the light source LS to generate the light signal in the form of the continuous wave or the pulse wave. The light modulation part may control the light source LS to generate the light signal in the form of the continuous wave or the pulse wave through frequency modulation, pulse modulation, or the like. The light modulation part may be positioned in the control unit. Accordingly, it should be understood that the control unit may block (off or turn off) or provide (on) the output of the light signal by the light source by controlling the light modulation part as will be described below.

The light emitting unit 1 may include a diffuser (not shown). The diffuser (not shown) may be a diffuser lens. The diffuser (not shown) may be disposed in front of the light source LS. The light emitted from the light source LS may pass through the diffuser (not shown) to be incident on the object O. The diffuser (not shown) may change a path of light emitted from the light source LS. The diffuser (not shown) may diffuse light emitted from the light source LS. The diffuser (not shown) may also be positioned in a first optical unit to be described below.

Specifically, the light emitting unit 1 may include the above-described light source LS, a housing 110, a first optical unit 120, a first lens barrel 130, a drive unit including a drive magnet part 140 and a drive coil part 150, an elastic part 160, a side substrate 170, and a position sensor 180.

First, the housing 110 may be positioned inside a cover 400 to be described below. The housing 110 may be coupled to the first lens barrel 130, the side substrate 170, the drive coil part 150, and the elastic part 160, which will be described below.

The housing 110 may include an open barrel accommodation part therein. The above-described first lens barrel 130 and drive coil part 150 may be positioned in the barrel accommodation part.

The first optical unit 120 may be positioned in the housing 110. The first optical unit 120 may be held by the first lens barrel 130 to be described below, and may be coupled to the housing 110 through the first lens barrel 130.

The first optical unit 120 may be composed of a plurality of optical elements or lenses. For example, the first optical unit 120 may be composed of a plurality of lenses.

In addition, the first optical unit 120 may include a collimator lens. For example, the collimator lens may be composed of a plurality of lenses, and may have an angle of view (FoI) of 60 degrees to 120 degrees. The collimator lens may decrease a divergence angle of light output from the light source. When a laser divergence angle of each aperture of a vertical cavity surface emitting laser (VCESL), which is the light source, is 20 to 25 degrees, the divergence angle of light passing through the collimator lens may be 1 degree or less.

In addition, the first optical unit 120 may duplicate the light signal output from the light source LS according to a preset duplication pattern. Accordingly, the first optical unit 120 may include a diffractive optical element (DOE) or a diffuser lens. For example, the first optical unit 120 may include an optical device, an optical member, or an optical element having a micro-scale or nano-scale structure.

The light signal (output light) emitted from the light source LS toward the object may pass through the first lens barrel 130. An optical axis of the first lens barrel 130 and an optical axis of the light source LS may be aligned. In addition, the first lens barrel 130 may be coupled to the housing 110. In addition, the first lens barrel 130 may be fixed to the housing 110. The first lens barrel 130 may hold the first optical unit 120 composed of a plurality of optical elements.

The first lens barrel 130 may include a lens accommodation part 131 on which the first optical unit 120 is seated. The first lens barrel 130 may be moved vertically by a voice coil motor or the like as will be described below. In other words, the first lens barrel 130 may vertically move in an optical axis direction by an actuator such as a voice coil motor. Accordingly, as will be described below, the light generated from the light source may be changed into a planar form or a point form as it passes through the first lens barrel 130. In addition, the first lens barrel 130 may include a magnet seating groove 132 in which the drive magnet part is seated.

In addition, a screw thread structure may be formed on a side surface of the lens accommodation part 131 for coupling with the first optical unit 120. Accordingly, the first optical unit 120 may vertically move in the housing 110 together with the first lens barrel 130 by the drive unit to be described below. However, the first optical unit 120 is not limited to the coupling structure.

In addition, the side substrate 170 may be coupled to the housing 110. The side substrate 170 may be positioned in a substrate groove 112 positioned on the side surface of the housing 110. In addition, the side substrate 170 may be electrically connected to the main substrate 4.

In addition, the drive unit may include the drive magnet part 140 and the drive coil part 150.

The drive magnet part 140 may include a plurality of magnets. The plurality of magnets may be positioned in the magnet seating groove 132 positioned on the side surface of the first lens barrel 130.

The drive magnet part 140 may vertically move the first lens barrel 130 and the first optical unit 120 with respect to the housing 110 by electromagnetic interaction with the drive coil part 150 to be described below. Accordingly, a separation distance from the light source LS thereunder to the first optical unit 120 and the first lens barrel 130 may be increased or decreased. In addition, according to the above-described separation distance, the output light may have the form of a light source having a planar form (or a surface light source) or a point form (or a point light source) with respect to the object.

The drive coil part 150 may include a plurality of coils, and may be positioned on the side surface of the housing 110. The drive coil part 150 may be positioned to face the drive magnet part 140. Accordingly, when a current is applied to the drive coil part 150, the first lens barrel 130 may be moved by the electromagnetic interaction (e.g., Lorentz force) between the drive coil part 150 and the drive magnet part 140.

The drive coil part 150 may be positioned in each coil seating part 114 formed on the side surface of the housing 110. The drive coil part 150 may be electrically connected to the side substrate 170. For example, the drive coil part 150 may be electrically connected to the side substrate 170 through a wire or the like. In addition, since the side substrate 170 is coupled to the housing 110 as described above, the drive coil part 150 may also be seated in the coil seating part 114 formed on the side surface of the housing 110 and may be coupled to the housing. A detailed description thereof will be given below.

The elastic part 160 may be disposed on the housing 110. The elastic part 160 may be coupled to the first lens barrel 130 and the housing 110. The housing 110 may be coupled and fixed to the main substrate 4 or a base 200 to be described below. Alternatively, the first lens barrel 130 may vertically move with respect to the housing 110 by the above-described Lorentz force. The elastic part 160 may provide a preload for the vertical movement of the first lens barrel 130 or the first optical unit 120. Accordingly, when the Lorentz force by the drive unit is not generated, the first lens barrel 130 may maintain a predetermined position with respect to the housing 110. In addition, even when the Lorentz force by the drive unit is generated, a positional relationship between the first lens barrel 130 and the housing 110 is maintained within a certain range, so that it is possible to improve the reliability of the camera module.

The position sensor 180 may be electrically connected to the side substrate 170. In addition, the position sensor 180 may be positioned on the side substrate 170. In addition, the position sensor 180 may be disposed to be spaced apart from the above-described drive magnet part 140 by a predetermined distance.

The position sensor 180 may include a Hall sensor or a Hall integrated circuit (IC). The position sensor 180 may detect a magnetic force of the drive magnet part 140.

The position sensor 180 according to the embodiment may detect an intensity of a magnetic field from the drive magnet part and output position information of the first lens barrel 130 or the first optical unit 120 with respect to the light source LS. Accordingly, the control unit may determine a defect of the first optical unit 120 or the first lens barrel 130 based on the position information of the position sensor 180 and control (turn on/off) the output of the light source LS in response to the determination result.

In the embodiment, the position sensor 180 may include a plurality of position sensors. The position sensor 180 may include two sensors. The position sensor 180 may detect the movements of the first lens barrel 130 and the first optical unit 120 in the optical axis direction. In this specification, a Z-axis direction is an optical axis direction or a vertical direction as a third direction. In addition, an X-axis direction is a direction perpendicular to the Z-axis direction, and in the embodiment, is a first direction as a direction from the light emitting unit toward the light receiving unit. In addition, a Y-axis direction is a direction perpendicular to the X-axis direction and the Z-axis direction, and is a second direction. A description based on this will be made below.

The light receiving unit 2 may be a light receiving module, a light receiving unit, a light receiving assembly, or a light receiving device, and may be one component of the camera module. The light receiving unit 2 may receive light (reflected light) emitted from the light emitting unit 1 and reflected from the object, and may convert the received light into an electrical signal.

The light receiving unit 2 may generate input light corresponding to the light signal output from the light emitting unit 1. The light receiving unit 2 may be disposed side by side with the light emitting unit 1. The light receiving unit 2 may be disposed next to the light emitting unit 1. The light receiving unit 2 may be disposed in the same direction as the light emitting unit 1. With this configuration, reception efficiency of the input light can be improved in the light receiving unit 2.

The light receiving unit 2 may receive the reflected light for an integration period and generate an electric signal therefor. In the embodiment, the camera module may perform direct distance measurement or indirect distance measurement through the light receiving unit 2.

First, in the case of the direct distance measurement, the camera module may measure a distance to the object through a time difference between a reception time point of the reflected light and an output time point of the output light.

In addition, in the case of the indirect distance measurement, the camera module may measure the distance to the object through synthesis between a reference signal, synchronized with the output light and having a different phase, and the reflected light.

The direct distance measurement may be easier to measure a long distance than the indirect distance measurement, may have a relatively high measurement speed because a switching speed is nanoseconds, and may be strong against multiple echoes. In contrast, there are advantages in that the indirect distance measurement has a lower switching speed than that of the direct distance measurement but is easy to measure a short range, may be applied to multiple pixels, and has a small data volume for distance measurement.

The camera module according to the embodiment may perform the above-described direct-TOF (or corresponding to the direct distance measurement) or an indirect-TOF (or corresponding to the indirect distance measurement).

The light receiving unit 2 may include a second lens barrel 320, a second optical unit 310, and an image sensor IS.

The second lens barrel 320 may be coupled to the base 200 to be described below. The second lens barrel 320 may be screw-coupled to the base to be described below. Accordingly, the second lens barrel 320 may include a screw thread positioned on a side surface thereof. The second lens barrel 320 may also be formed integrally with the second optical unit 310. However, the present invention is not limited thereto.

The second optical unit 310 may be coupled to the second lens barrel 320. The second optical unit 310 may be coupled to the base 200 through the second lens barrel 320. The second optical unit 310 may be coupled to the second lens barrel 320 through various coupling methods. The second optical unit 310 may be formed through screw-coupling with the second lens barrel 320 as described above.

The second optical unit 310 may include a plurality of lenses. In addition, the second optical unit 310 may be aligned with the image sensor IS thereunder. Accordingly, the reflected light passing through the second optical unit 310 may be received by the image sensor IS.

The image sensor IS may detect the reflected light. In addition, the image sensor IS may detect the reflected light and output the detected reflected light as an electrical signal. In the embodiment, the image sensor IS may detect light having a wavelength corresponding to a wavelength of light output from the light source LS. For example, the image sensor IS may detect infrared rays. Alternatively, the image sensor IS may detect visible rays. The image sensor IS may include various image sensors configured to sense light.

In the embodiment, the image sensor IS may include a pixel array configured to receive light passing through the second lens barrel 320 and the second optical unit 310 and convert the received light into an electrical signal corresponding to light, a drive circuit configured to drive a plurality of pixels included in the pixel array, and a read out circuit configured to read an analog pixel signal of each pixel. The read out circuit may generate a digital pixel signal (or an image signal) through analog-to-digital conversion by comparing the analog pixel signal with a reference signal. Here, the digital pixel signal of each pixel included in the pixel array may constitute an image signal, and may be defined as an image frame as the image signal is transmitted in a frame unit. In other words, the image sensor may output a plurality of image frames.

Furthermore, the light receiving unit 2 may further include an image synthesis part. The image synthesis part may include an image processor configured to receive an image signal from the image sensor IS, and process (e.g., interpolation and frame synthesis) the image signal. In particular, the image synthesis part may use and synthesize image signals (low resolution) of a plurality of frames into an image signal (high resolution) of one frame. In other words, the image synthesis part may synthesize a plurality of image frames included in the image signal received from the image sensor IS, and generate the synthesized result as a synthesized image. The synthesized image generated by the image synthesis part may have a higher resolution than those of a plurality of image frames output from the image sensor IS. In other words, the image synthesis part may generate a high-resolution image through a super resolution (SR) technique. The plurality of image frames may include image frames generated by being changed into different light paths by the movements of filters F and F'. The image synthesis part may be positioned inside or outside the light receiving unit 2. The above-described super resolution may be implemented through an optical member tilted in the light receiving unit 2. Accordingly, in this specification, the camera module may have or may not have a device configured to tilt the optical member in the light receiving unit 2. A detailed description of the configuration of tilting the optical member in the light receiving unit 2 for super resolution will be described below.

The filters F and F' may be coupled to the base 200. The filters F and F' may be disposed between the first lens barrel 130 and the light source LS or between the second lens barrel 320 and the image sensor IS. Accordingly, the filters F and F' may be disposed on a light path between the object and the image sensor IS or a light path between the object and the light source LS. The filters F and F' may filter light having a predetermined wavelength range.

The filters F and F' may pass light having a specific wavelength. In other words, the filters F and F' may block light by reflecting or absorbing light other than the specific wavelength. For example, the filters F and F' may pass infrared rays and block light having wavelengths other than the infrared rays. Alternatively, the filters F and F' may pass visible rays and block light having wavelengths other than the visible rays. The filters F and F' may be an infrared ray band pass filter. Accordingly, the filters F and F' may pass only infrared rays. However, the present invention is not limited to these functions. Alternatively, the optical member may be a separate focus fixed lens or variable focus lens (e.g., liquid lens) separated from the lens module.

In addition, the filters F and F' are movable. In the embodiment, the filters F and F' may be tilted. When the filters F and F' are tilted, the light path may be adjusted. When the filters F and F' are tilted, a path of light incident on the image sensor IS may be changed. For example, the filter F' in the light receiving unit 2 may change an angle of a field of view (FOV) or a direction of the FOV of the incident light. In addition, in the embodiment, the filters F and F' may enable the high-resolution time of flight (TOF) by changing a path through which light enters as the filters F and F' are tilted.

The cover 400 may be a bracket. The cover 400 may include a "cover can." The cover 400 may be disposed to surround the light emitting unit 1 and the light receiving unit 2. The cover 400 may be coupled to the housing 110 and the base 200. The cover 400 may accommodate the light emitting unit 1 and the light receiving unit 2. Accordingly, the cover 400 may be positioned at an outermost side of the camera module.

In addition, the cover 400 may be a non-magnetic substance. In addition, the cover 400 may be made of a metal. In addition, the cover 400 may be made of a metal plate.

The cover 400 may be connected to a ground portion of the main substrate 4. Accordingly, the cover 400 may be grounded. In addition, the cover 400 may block electromagnetic interference (EMI). At this time, the cover 400 may be referred to as an "EMI shield can." The cover 400 may protect a product from an external impact as a finally assembled component. The cover 400 may be made of a material having a small thickness and a high strength.

In addition, in the camera module 10 according to the embodiment, the light emitting unit 1 and the light receiving unit 2 may be disposed on the main substrate 4 (printed circuit board (PCB)). The main substrate 4 may be electrically connected to the light emitting unit 1 and the light receiving unit 2.

In addition, in the camera module 10, the connect part 3 may be electrically connected to the main substrate 4. The connect part 3 may be connected to the configuration of the optical device. The connect part 3 may include the connector 7 connected to the configuration of the optical device. The connect part 3 may include the extension substrate 5 on which the connector 7 is disposed and connected to the connection substrate 6. The extension substrate 5 may be a PCB, but is not limited thereto.

In addition, in the camera module, the connection substrate 6 may connect the main substrate 4 and the extension substrate 5 of the connect part 3. The connection substrate 6 may have flexibility. The connection substrate 6 may be a flexible printed circuit board (flexible PCB (FPCB)).

In addition, the main substrate 4, the connection substrate 6, and the extension substrate 5 may be formed integrally or separately.

The camera module may include a reinforcement plate 8. The reinforcement plate 8 may include a stiffener. The reinforcement plate 8 may be disposed on a lower surface of the main substrate 4. The reinforcement plate 8 may be made of a stainless steel.

Furthermore, the light receiving unit 2 may include a lens drive device. In other words, the light receiving unit 2 may include a voice coil motor (VCM). In addition, the light receiving unit 2 may include a lens drive motor. In addition, the light receiving unit 2 may include a lens drive actuator. With this configuration, as described above, the light receiving unit 2 according to the embodiment may tilt the filter F'. In addition, as the filter F' is tilted, a light path of the input light passing through the filters F and F' may move repeatedly according to a predetermined rule. Accordingly, the light receiving unit 2 may output high-resolution image information using a plurality of image information converted by the image sensor according to the tilting of the filter F', and provide the output image information to an external optical device.

FIG. 4 is a view showing a housing of a light emitting unit according to the embodiment, FIG. 5 is a view showing a first optical unit and a first lens barrel of the light emitting unit according to the embodiment, FIG. 6 is a view showing a drive magnet part and a drive coil part of the light emitting unit according to the embodiment, FIG. 7 is a view showing the coupling of an elastic part of the light emitting unit according to the embodiment, FIG. 8 is a view showing a first elastic member of the light emitting unit according to the embodiment, FIG. 9 is a view showing a second elastic member of the light emitting unit according to the embodiment, FIG. 10 is a view showing one side of a side substrate of the light emitting unit according to the embodiment, FIG. 11 is a view showing the other side of the side substrate of the light emitting unit according to the embodiment, FIG. 12 is a view showing a base of the camera module according to the embodiment, FIG. 13 is a view showing a second optical unit and a second lens barrel of a light receiving unit according to the embodiment, and FIG. 14 is a view showing a cover of the camera module according to the embodiment.

Referring to FIG. 4, the housing 110 of the light emitting unit according to the embodiment may include a housing hole 111, the substrate groove 112, a sensor hole 113, and the coil seating part 114.

The housing hole 111 may be positioned at a center of the housing 110. The first optical unit, the first lens barrel, and the drive unit may be seated in the housing hole 111.

The substrate groove 112 may be positioned on an outer surface of the housing 110. The housing 110 may have a rectangular shape in a plan view. However, the housing 110 is not limited thereto, and may be formed in various shapes.

In addition, a coupling protrusion for coupling with the side substrate may be positioned in the substrate groove 112. The coupling protrusion may extend outward from the side surface of the housing 110. In addition, a coupling hole may be provided in the side substrate, and the coupling protrusion may be inserted into the coupling hole so that the side substrate and the housing 110 may be coupled to each other.

The sensor hole 113 may overlap the substrate groove 112 in the first direction (X-axis direction) and the second direction (Y-axis direction). A position sensor may be seated in the sensor hole 113. Accordingly, the position sensor may be easily electrically connected to the side substrate. In addition, the position sensor has a fixed coupling position with the housing 110 to accurately measure a position of the drive magnet part.

The coil seating part 114 may be positioned on an inner surface of the housing 110. For example, the coil seating part 114 may be configured as a ledge extending toward the inside from the inner surface of the housing 110. In this specification, the inside may be a direction from the housing toward the first optical unit, and the outside may be a direction from the first optical unit toward the housing as a direction opposite to the inside.

The drive coil part may be seated on the coil seating part 114. The drive seating part 114 may have a shape corresponding to the drive coil part having various structures. For example, the coil drive part may have a closed loop type as will be described below. Accordingly, the coil seating part 114 may also have a closed loop shape corresponding to the shape of the drive coil part.

Referring to FIG. 5, the first optical unit 120 of the light emitting unit may be inserted into the lens accommodation part 131 of the first lens barrel 130. As described above, the first optical unit 120 may be composed of a plurality of lenses. In addition, the first optical unit 120 may include a screw thread positioned on an outer surface thereof. The first lens barrel 130 may also have a groove corresponding to the screw thread of the first optical unit 120 on an inner surface. Accordingly, the first optical unit 120 and the first lens barrel 130 may be screw-coupled to each other.

In addition, the first lens barrel 130 may include the magnet seating groove 132 as well as the above-described lens accommodation part 131. A plurality of magnet seating grooves 132 may be provided. In the embodiment, four magnet seating grooves 132 may be positioned on a first outer surface 132a and a second outer surface 132b facing each other of the first lens barrel 130 and a third outer surface 132c and a fourth outer surface 132d facing each other and positioned between the first outer surface 132a and the second outer surface 132b.

In other words, the magnet seating groove 132 may be positioned on each of the first outer surface 132a to the fourth outer surface 132d so that a first magnet to a fourth magnet to be described below may be seated in the magnet seating groove 132 of the first outer surface 132a to the fourth outer surface 132d. A bonding member may be applied to the magnet seating groove 132. Accordingly, a coupling force between the first magnet to the fourth magnet and the first lens barrel 130 can be improved.

Referring to FIG. 6, the drive unit may include the drive magnet part 140 and the drive coil part 150. The drive magnet part 140 may include a plurality of magnets.

In the embodiment, the drive magnet part 140 may include a first magnet 141 to a fourth magnet 144. The first magnet 141 and the second magnet 142 may be positioned to face each other. For example, the first magnet 141 and the second magnet 142 may be symmetrically disposed with respect to the second direction.

The third magnet 143 and the fourth magnet 144 may be positioned to face each other, and may be positioned between the first magnet 141 and the second magnet 142. For example, the third magnet 143 and the fourth magnet 144 may be symmetrically disposed with respect to the first direction.

The first magnet 141 to the fourth magnet 144 may be positioned in the above-described magnet seating grooves.

The drive coil part 150 may have a closed loop shape on a plane (XY) as described above. The drive coil part 150 may be seated on the coil seating part. In addition, the drive coil part 150 and the drive magnet part 140 may at least partially overlap in the first direction or the second direction.

In addition, the drive coil part 150 may be disposed to surround the drive magnet part 140. In other words, the drive magnet part 140 may be positioned on the closed loop of the drive coil part 150.

In addition, the drive coil part 150 may be disposed to be spaced apart from the drive magnet part 140 by a predetermined distance.

In addition, the drive coil part 150 may include a first wire W1 and a second wire W2 configured to be electrically connected to the side substrate at one end thereof. The first wire W1 and the second wire W2 may be disposed at positions corresponding to the side substrate to minimize an electrical resistance. Accordingly, a decrease in accuracy due to the resistance can be prevented and power efficiency can be improved.

The first wire W1 and the second wire W2 may be connected to one end and the other end of the drive coil part 150 composed of a coil, respectively.

Referring to FIGS. 7 to 9, the elastic part 160 may include a first elastic member 161 and a second elastic member 162. The elastic parts 160 may be positioned above or below the first lens barrel 130 and may be coupled to the housing 110 and the first lens barrel 130. Accordingly, even when the first lens barrel 130 is vertically moved by the drive unit, a preload may be applied to the vertical movement of the first lens barrel 130 through the elastic part 160 coupled to the housing 110. Accordingly, when no current is applied to the drive coil part, the first lens barrel 130 may be present at the same position in the housing 110 by a restoring force of the elastic part 160.

The first elastic member 161 may be positioned above the first lens barrel 130. The second elastic member 162 may be positioned below the first lens barrel 130.

The first elastic member 161 may include a first elastic coupling part P1 and a second elastic coupling part P2. The first elastic coupling part P1 may be positioned outside the second elastic coupling part P2. In addition, the first elastic coupling part P1 may be coupled to the protrusion of the housing 110. In addition, the second elastic coupling part P2 may be coupled to the first lens barrel 130. At this time, the bonding member may be applied to the first elastic coupling part P1 and the second elastic coupling part P2 for the above-described coupling. For example, the bonding member may include a damper liquid. In addition, the damper liquid may include, for example, epoxy or the like.

Similarly, the second elastic member 162 may include a third elastic coupling part P3 and a fourth elastic coupling part P4. The third elastic coupling part P3 may be positioned outside the fourth elastic coupling part P4.

In addition, the third elastic coupling part P3 may be coupled to the protrusion of the housing 110. In addition, the fourth elastic coupling part P4 may be coupled to the first lens barrel 130. At this time, the bonding member may be applied to the third elastic coupling part P3 and the fourth elastic coupling part P4 to implement the above-described coupling.

In addition, first pattern parts PT having various curvatures may be positioned between the first elastic coupling part P1 and the second elastic coupling part P2. In other words, the first elastic coupling part P1 and the second elastic coupling part P2 may be coupled to each other with the first pattern parts PT interposed therebetween. The first pattern parts PT may be symmetrically positioned in the first direction (X-axis direction) and the second direction (Y-axis direction).

Likewise, second pattern parts PT' having various curvatures may be positioned between the third elastic coupling part P3 and the fourth elastic coupling part P4. In other words, the third elastic coupling part P3 and the fourth elastic coupling part P4 may be coupled to each other with the second pattern parts PT' interposed therebetween. The second pattern parts PT' may be symmetrically positioned in the first direction (X-axis direction) and the second direction (Y-axis direction).

Referring to FIGS. 10 and 11, the side substrate 170 may have one side surface, and the other side surface facing the one side surface and coming into contact with the housing.

The side substrate 170 may include first and second conductive parts EC1 and EC2 connected to the first and second wires of the drive coil part on the one side surface. In addition, the side substrate 170 may include a coupling hole 170a on the other side surface. The coupling hole 170a may be coupled to the coupling protrusion of the housing as described above. Accordingly, the side substrate 170 may be coupled to the side surface of the housing.

In addition, the position sensor 180 may be positioned on the other side surface of the side substrate 170. The position sensor 180 may be seated on the other side surface of the side substrate 170 and inserted into the sensor hole.

Referring to FIG. 12, the base 200 may be positioned on the main substrate 4 and may come into contact with the main substrate 4. In addition, the above-described first lens barrel, first optical unit, second lens barrel, second optical unit, and housing may be seated on the base 200.

The base 200 may include a first base part 210 and a second base part 220 disposed to be spaced apart from each other. Components of the light emitting unit, such as the first optical unit, the first lens barrel, and the housing, may be seated on the first base part 210. In addition, the second base part 220 may have the second optical unit and the second lens barrel seated thereon.

The first base part 210 and the second base part 220 may include base holes 210a and 220a, respectively. The light signal from the light source may be output toward the object, and the light signal (reflected light) reflected from the object may be provided to the image sensor through the base holes 210a and 220a.

In addition, the above-described filters may be seated on the first base part 210 and the second base part 220, respectively. Furthermore, the first base part 210 and the second base part 220 are shown as one body, but may be separated. In addition, the second base part 220 may be tilted as described above, and the filter attached to the second base part 220 may also be tilted, so that the camera module according to the embodiment may perform the above-described super resolution technique.

Referring to FIG. 13, the second optical unit 310 may be coupled to the second lens barrel 320. The second optical unit 310 may be inserted into a hole positioned in a center of the second lens barrel 320. In addition, the second lens barrel 320 may be screw-coupled to the second base part 220 of the base 200 by having a screw thread on an outer surface.

The second optical unit 310 may also be composed of a plurality of lenses.

Referring to FIG. 14, the cover 400 may include a first cover part 410 and a second cover part 420 in addition to the above-described contents. The first cover part 410 may include a first cover hole 410*a* positioned on the first base part and overlapping the first optical unit. The light signal (output light) passing through the first optical unit may be irradiated to the object through the first cover hole 410*a*.

The second cover part 420 may include a second cover hole 420*a* positioned on the second base part and overlapping the second optical unit. The light signal (reflected light) passing through the second optical unit may be irradiated to the image sensor through the second cover hole 420*a*.

FIG. 15 is a view for describing movements of the first optical unit and the first lens module in the light emitting unit according to the embodiment, FIG. 16 is a view for describing a form of a light signal according to the movements of the first optical unit and the first lens module, and FIG. 17 is a view showing an example of an image of the light receiving unit according to the movements of the first optical unit and the first lens module.

Referring to FIGS. 15 to 17, the first optical unit and the first lens module according to the embodiment vertically move so that the light signal (output light) may be converted into a planar light source or a point light source.

In other words, the output light may be output in the form or pattern of the planar light source or the point light source according to an interval between the light source and the first lens module (or the first optical unit/second optical unit (hereinafter, interchangeably used with the optical unit)).

In the embodiment, the first optical unit and the first lens module may be moved in the optical axis direction (Z axis direction) by the drive unit. In addition, as described above, the amounts of movements at which the first optical unit and the first lens module move up may be adjusted according to the amount of current flowing through the drive coil part.

For example, in the camera module according to the embodiment, the first optical unit and the first lens module may be moved so that the distance from the light source has a maximum (see FIG. 15A) to a minimum (see FIG. 15B). Specifically, the above-described distance between the light source and the optical unit (the first optical unit) may be a distance between an uppermost surface of the aperture of the light source and a lowermost surface of the optical unit. In addition, when the distance between the uppermost surface of the aperture of the light source and the lowermost surface of the optical unit is smaller than or equal to a predetermined distance (e.g., 80 µm), light is output in the point form. In addition, when the distance between the uppermost surface of the aperture of the light source and the lowermost surface of the optical unit is greater than or equal to a predetermined distance (e.g., 530 µm), the light source may be output in the planar form. However, the present invention is not limited to the above-described distance.

In other words, the control unit may finally control the form of the output light (a planar light source or a point light source) by controlling the amount of current supplied to the drive coil part to adjust the distance between the first lens module (or the first optical unit) and the light source. For example, the control unit may change the amount of movement of the first lens module by the actuator when the amount of current provided to the drive coil part is changed (e.g., increase/decrease in the current value).

In the embodiment, when the interval between the light source and the first lens module (or the first optical unit) is greater than or equal to a certain distance, the light signal (output light) may be output in the planar light source or planar form as shown in FIGS. 16A and 17A. In other words, when the distance between the light source and the first lens module (or the first optical unit) is between a preset distance (or a certain distance) and a maximum distance, the light signal (output light) may be output in the planar light source or planar form. Here, the maximum distance may be a distance when the distance between the light source and the movable first lens module is the maximum, and a distance between a position of the first lens module and the light source when the actuator is driven to the maximum (e.g., maximum current).

On the other hand, when the interval between the light source and the first lens module (or the first optical unit) is smaller than or equal to a certain distance, the light signal may be output in the point light source or point form as shown in FIGS. 16B and 17B. In other words, when the distance between the light source and the first lens module (or the first optical unit) is between a preset distance (or a certain distance) and a minimum distance, the light signal may be output in the point light source or point form. Here, the minimum distance may be a distance when the interval between the light source and the movable first lens module (or the first optical unit) is the minimum, and a distance between a position (initial position) of the first lens module and the light source when the actuator is not driven. However, various embodiments of the position will be described below.

In addition, in a range of a predetermined distance or less, the light signal (output light) from the light source may be output in the point form as described above, and higher energy may be applied to the object.

The camera module 10 according to the embodiment of the present invention provides an advantage that the camera module 10 flexibly responds to the requirements of various applications because the light pattern of the output light may be changed from the planar light source to the point light source or the resolution of the point light source may be changed according to the resolution of the output light, the distance to the object, the degree of power consumption, and the like.

FIG. 18 is a view for describing a process of generating an electrical signal in a sensor according to the embodiment.

Referring to FIG. 18, as described above, a phase of the reflected light (input light) LS2 may be retarded by a distance at which the incident light (output light) LS1 is incident on the object, then reflected, and returned.

In addition, as described above, a plurality of reference signals may be provided, and in the embodiment, as shown in FIG. 18, four reference signals C1 to C4 may be provided. In addition, each of the reference signals C1 to C4 may have the same frequency as the optical signal, but may have a phase difference of 90 degrees from each other. One (e.g., C1) of the four reference signals may have the same phase as the optical signal. In addition, the reference signals C1 to C4 may be applied to the sensor, and the sensor may generate an electrical signal from the reflected light LS2 according to the reference signal. In the embodiment, the sensor may include a switching element and a charging element configured to generate an electrical signal, and the switching element may perform an On/Off operation according to the reference signal. In other words, the sensor may expose an effective area of the sensor in response to each reference signal, and receive the light signal for an exposed time (exposure time). In other words, when the reference signal is on (positive), the sensor may generate an electric signal by charging an electric charge from the reflected light LS2. Accordingly, the sensor may generate an electrical signal corresponding to a shaded portion in FIG. 18.

In addition, at this time, the charging element may include a capacitor and the like, the switching element may include various switching elements such as a field effect transistor, and the charging element and the switching element are not limited to the above-described types.

In addition, in the present invention, the sensor refers to an image sensor, and the control unit may be positioned in the camera module or in the image sensor. In addition, as will be described below, the control unit may output a control signal (irradiated light signal to be described below) for controlling the output of the incident light provided from the light source. In addition, the control unit may output an exposure signal in synchronization with the output control signal. The exposure signal may correspond to the above-described reference signal. In addition, the reference signal or the exposure signal may have a predetermined delay for the output of the incident light and the transmission of the control signal (hereinafter see FIG. 28 or higher). However, for theoretical description, the reference signal or the exposure signal will be described with the same time point in FIGS. 18 to 26.

In addition, in another embodiment, the light signal may be generated at a plurality of frequencies for the exposure time. At this time, the sensor absorbs an input light signal according to the plurality of frequencies. For example, it is assumed that light signals are generated at frequencies f1 and f2, and the plurality of reference signals have a phase difference of 90 degrees from each other. Then, since an incident light signal also has the frequencies f1 and f2, four electrical signals may be generated through the input light signal having the frequency f1 and four reference signals corresponding thereto. In addition, four electrical signals may be generated through an input light signal having the frequency f2 and four reference signals corresponding thereto. Accordingly, a total of eight electrical signals may be generated. Hereinafter, a case in which the light signal is generated with one frequency (four electrical signals are generated) will be described, but as described above, the light signal may be generated with a plurality of frequencies.

FIG. 19 is a view for describing a sensor according to the embodiment, and FIG. 20 is a timing diagram generating one frame in the sensor according to the embodiment.

First, referring to FIG. 19, the image sensor IS may be formed in an array structure having a plurality of pixels as described above. At this time, the image sensor IS is an active pixel sensor (APS) and may be a complementary metal oxide semiconductor (CMOS) sensor. In addition, the image sensor IS may also be a charge coupled device (CCD) sensor. The image sensor IS may include a TOF sensor configured to receive light (e.g., infrared rays) reflected from a subject and measure a distance using a time or a phase difference.

For example, in the image sensor IS, the plurality of pixels may be arranged side by side in the first direction and the second direction. For example, the plurality of pixels may be in the form of a matrix. In addition, in the embodiment, the plurality of pixels may include a first pixel and a second pixel. The first pixel and the second pixel may be alternately disposed in the first direction and the second direction. In other words, around one first pixel, a plurality of second pixels may be disposed adjacent to the first pixel in the first direction and the second direction. For example, in the image sensor IS, the first pixel and the second pixel may be disposed in a checkerboard pattern. In other words, as shown in FIG. 19, in an image sensor IS having a resolution of 320×240, 76,800 pixels may be arranged in a grid form.

In addition, the first pixel and the second pixel may be pixels configured to receive light having different wavelength bands as peak wavelengths. For example, the first pixel may receive light having an infrared band as a peak wavelength. In addition, the second pixel may receive light having a wavelength other than the infrared band as a peak wavelength. In addition, any one of the first pixel and the second pixel may not receive light.

In addition, in the embodiment, the plurality of pixels may include an effective area in which a light receiving element is disposed and an ineffective area that is an area other than the effective area. The effective area may be an area in which a predetermined electrical signal may be generated by receiving light, and the ineffective area may be an area in which an electrical signal is not generated by receiving light or light is not received. In other words, the ineffective area may refer to including a case in which an electrical signal by light may not be generated even when the light receiving element is positioned therein.

In addition, the first pixel may include the effective area, but the second pixel may be composed of only the ineffective area in which the effective area is not present. For example, the light receiving element such as a photodiode may be positioned only in the first pixel, and not in the second pixel. In addition, for example, the image sensor IS may include a plurality of row areas including the effective areas and the ineffective areas alternately disposed in a row direction. In addition, in the embodiment, the image sensor IS may include a plurality of column areas including the effective areas and the ineffective areas alternately disposed in a column direction.

In addition, the plurality of pixels may be formed in various shapes such as a rectangle, a triangle, a polygon, and a circle. Furthermore, the effective area within the pixel may also have various shapes such as a rectangle, a triangle, a polygon, and a circle.

In other words, the plurality of pixels may be disposed to be spaced apart from each other at regular intervals. The separation distance may be very small compared to a size of the pixel, and a wire or the like may be disposed in the separation distance. Hereinafter, in this specification, a description will be made by ignoring the separation distance.

In addition, in the embodiment, each pixel DX (e.g., the first pixel) may include a first pixel DX-1 including a first photodiode and a first transistor, and a second pixel DX-2 including a second photodiode and a second transistor.

The first pixel DX-1 receives the input light signal at the same phase as a waveform of the output light. In other words, when the light source is turned on, the first photodiode is turned on to absorb the input light signal. In addition, when the light source is turned off, the first photodiode is turned off to stop absorbing the input light. The first photodiode converts the absorbed input light signal into a current and transmits the current to the first transistor. The first transistor converts the received current into an electric signal and outputs the electrical signal.

The second pixel DX-2 receives the input light signal at a phase (e.g., 180 degrees) opposite to the waveform of the output light. In other words, when the light source is turned on, the second photodiode is turned off to absorb the input light signal. In addition, when the light source is turned off, the second photodiode is turned on to stop absorbing the input light. The second photodiode converts the absorbed input light signal into a current and transmits the current to the second transistor. The second transistor converts the received current into an electrical signal.

Accordingly, the first pixel DX-1 may be referred to as an in-phase reception unit, and the second pixel DX-2 may be referred to as an out-phase reception unit. As described above, when the first pixel DX-1 and the second pixel DX-2 are activated with a time difference, a difference in the amount of received light occurs according to a distance to the object. For example, when the object is right in front of the camera module (i.e., when the distance=0), a time it takes for light to be output from the light source and then reflected from the object is zero, so that a blinking period of the light source becomes a reception period of light as it is. Accordingly, only the first pixel DX-1 receives light, and the second pixel DX-2 does not receive light. As another example, when the object is positioned to be away from the camera module by a predetermined distance, it takes time for light to be output from the light source and then reflected from the object, so that the blinking period of the light source is different from the reception period of light. Accordingly, a difference occurs in the amounts of light received by the first pixel DX-1 and the second pixel DX-2. In other words, a distance of the object may be calculated using a difference in the amounts of light input to the first pixel DX-1 and the second pixel DX-2. In other words, the control unit calculates the phase difference between the output light and the input light using the electrical signal received from the image sensor IS, and calculates the distance between the object and the camera module using the phase difference.

More specifically, during a first integration time PL1, a first reference signal C1 may be provided to the first pixel DX-1 and a second reference signal C2 may be provided to the second pixel DX-2. In addition, during a second integration time PL2, a third reference signal C3 may be provided to the first pixel DX-1 and a fourth reference signal C4 may be provided to the second pixel DX-2. The first integration time PL1 and the second integration time PL2 may form one frame period, and a read out may be present between the first integration time PL1 and the second integration time PL2. At this time, the read out is a section in which the amount of electric charge charged in each light receiving unit in the pixel is discharged. At this time, the first reference signal C1 to the fourth reference signal C4 are signals for adjusting the charging of the charging element in the pixel and may be a gate signal in the switching element, which may be applied in the same manner as described with reference to FIG. 18. Through this method, the image sensor IS may output an electrical signal corresponding to the reference signal from each of the plurality of pixels. In addition, the phase difference between the incident light and the reflected light may be calculated through the reference signal. As described above, four electrical signals may be generated every one frame period with respect to the light signal. Accordingly, the control unit may calculate a phase difference td between the light signal and the input light signal using Equation 1 below.

$$t_d = \arctan\left(\frac{Q_3 - Q_4}{Q_1 - Q_2}\right) \quad \text{[Equation 1]}$$

where Q1 to Q4 are electric charge charging amounts (hereinafter referred to as electric charge amounts) of each of the four electric signals. Q1 refers to an electric charge amount of the electrical signal corresponding to the reference signal having the same phase as the light signal. Q2 refers to an electric charge amount of the electrical signal corresponding to the reference signal whose phase is 180 degrees slower than the light signal. Q3 refers to an electric charge amount of the electrical signal corresponding to the reference signal whose phase is 90 degrees slower than the light signal. Q4 refers to an electric charge amount of the electrical signal corresponding to the reference signal whose phase is 270 degrees slower than the light signal.

However, the integration time required to calculate the phase difference td between the light signal and the input light signal in one frame period may be variously changed depending on the number of charging elements, the number of switching elements, and the number of light receiving units in the image sensor IS. For example, two charging elements may also be connected to each light receiving unit (i.e., two light receiving units have a total of four charging elements). At this time, two reference signals may be provided to each light receiving unit in one integration time. For example, in the first integration time, the first reference signal and the second reference signal may be provided to a first light receiving unit, and the third reference signal and the fourth reference signal may be provided to a second light receiving unit. Accordingly, the electrical signal corresponding to each reference signal may be generated, and as described above, the control unit may calculate the phase difference td between the light signal and the input light signal using the total electric charge amount of the respective electrical signals.

In addition, in another embodiment, four integration times are present in one frame period, and four reference signals having a phase difference of 90 degrees for each integration time may be provided to the light receiving unit. In addition, the control unit may calculate the phase difference td between the above-described light signal and input light signal using the electric charge amount of the electrical signal generated for each integration time.

In addition, referring to FIG. 20, one frame period may sequentially include a first integration time and a second integration time. The image sensor IS may provide the first reference signal C1 and the second reference signal C2 to the first pixel DX-1 and the second pixel DX-2, respectively, for the first integration time. In addition, the image sensor IS may provide the third reference signal C3 and the fourth reference signal C4 to the first pixel DX-1 and the second pixel DX-2, respectively, for the second integration time. Accordingly, the electric charge amounts Q1 and Q2 may be generated in the first integration time, and the electric charge amounts Q3 and Q4 may be generated in the second integration time. Accordingly, the control unit may generate all of the electric charge amounts Q1 to Q4 in one frame, and calculate the phase difference td between the light signal and the input light signal using the electric charge amounts of the four generated electrical signals.

In addition, the control unit may calculate the distance between the object and the camera module using the phase difference td between the light signal and the input light signal. At this time, the control unit may calculate a distance d (see Equation 2) between the object and the camera module using Equation 2 below.

$$d = \frac{c}{2f} \frac{t_d}{2\pi}$$ [Equation 2]

where c refers to a speed of light, and f refers to a frequency of the output light.

According to the embodiment, a TOF IR image and a depth image may be obtained from the camera module. Accordingly, the camera module according to the embodiment of the present invention may be referred to as a TOF camera module or a TOF camera module.

Furthermore, in one frame, the first reference signal to the fourth reference signal may also be applied in the same integration time, and may also be applied in some or each different integration time as described above.

In this regard, more specifically, as shown in FIG. 21, the camera module according to the embodiment may generate raw images for four phases. Here, the four phases may be 0°, 90°, 180°, and 270°, and the raw image for each phase may be an image composed of digitized pixel values or analog pixel values for each phase, and interchangeably used with a phase image, a phase IR image, and the like.

FIG. 21 is a timing diagram of one frame period generating a depth image in a sensor according to another embodiment, FIG. 22 is a timing diagram generating an electrical signal for each integration time within the frame period in FIG. 21, FIG. 23 is a timing diagram in an integration time PL1 in FIG. 21, FIG. 24 is a timing diagram in an integration time PL2 in FIG. 21, FIG. 25 is a timing diagram in an integration time PL3 in FIG. 21, and FIG. 26 is a timing diagram in an integration time PL4 in FIG. 21.

Referring to FIG. 21, four integration times and four read outs for one frame period for which the depth image may be extracted from a sensor according to another embodiment may be present. However, as described above, the number of integration times and the number of read outs may be variously changed depending on the number of light receiving units, the number of charging elements, and the number of switchings. In addition, in FIGS. 21 to 26, a duty ratio of the incident light LS1 will be described by being set to 25%. However, in the present invention, the duty ratio of the incident light is not limited thereto and may be variously changed.

One frame period may include the first integration time PL1, the second integration time PL2, the third integration time PL3, and the fourth integration time PL4, which are sequentially performed. In addition, a read out may be performed between the respective integration times. Accordingly, one frame period may include the first integration time to the fourth integration time PL1 to PL4 and the read outs (e.g., four). A description thereof may be applied in the same manner as the above-described contents. In addition, each integration time may be the same as the period of the incident light LS1.

Referring to FIG. 22, each pixel may generate electrical signals for different phases for each integration time. In other words, different reference signals may be applied. Specifically, it will be described below that one pixel is composed of the first pixel DX-1 and the second pixel DX-2. In the first integration time PL1, the first reference signal (corresponding to C1 described above) having the same phase as the incident light LS1 may be applied to the first pixel DX-1, and the second reference signal (corresponding to C2 described above) whose phase is 180 degrees slower than that of the first reference signal may be applied to the second pixel DX-2. In addition, in the second integration time PL2, the third reference signal (corresponding to C3 described above) whose phase is 90 degrees slower than that of the first reference signal C1 may be applied to the first pixel DX-1, and the fourth reference signal (corresponding to C4 described above) whose phase is 180 degrees slower than that of the third reference signal may be applied to the second pixel DX-2. In addition, in the third integration time PL3, the second reference signal C2 may be applied to the first pixel DX-1 and the first reference signal C1 may be applied to the second pixel DX-2. In addition, in the fourth integration time PL4, the fourth reference signal C4 may be applied to the first pixel DX-1 and the third reference signal C3 may be applied to the second pixel DX-2.

Accordingly, in the first integration time PL1, the first pixel DX-1 may generate an electric charge amount Q0° corresponding to the above-described electric charge amount Q1, and the second pixel DX-2 may generate an electric charge amount Q180° corresponding to the above-described electric charge amount Q2. In addition, in the second integration time PL2, the first pixel DX-1 may generate an electric charge amount Q90° corresponding to the above-described electric charge amount Q3, and the second pixel DX-2 may generate an electric charge amount Q270° corresponding to the above-described electric charge amount Q4. In addition, in the third integration time PL3, the first pixel DX-1 may generate the electric charge amount Q180° and the second pixel DX-2 may generate the electric charge amount Q0°, and in the fourth integration time PL4, the first pixel DX-1 may generate the electric charge amount Q270° and the second pixel DX-2 may generate the electric charge amount Q90°.

In addition, according to the embodiment, the pixel may output a difference between the electric signals generated by the first light receiving unit and the second light receiving unit in each integration time. In other words, the pixel may output a difference (Q0°−Q180° between the electric charge amount Q0° and the electric charge amount Q180° in the first integration time, and output a difference (Q90°-Q270°) between the electric charge amount Q90° and the electric charge amount Q270° in the second integration time.

Referring to FIGS. 22 to 26, each of the plurality of integration times P1 to P4 may be composed of a plurality of sub-integration times. For example, the first integration time PL1 may include a plurality of sub-integration times PL11 to PL13, the second integration time PL2 may include a plurality of sub-integration times PL21 to PL23, the third integration time PL3 may include a plurality of sub-integration times PL31 to PL33, and the fourth integration time PL4 may include a plurality of sub-integration times PL41 to PL43. In this case, each sub-integration time may be the same as the period of the incident light LS1. In addition, the electrical signals generated in the first pixel DX-1 and the second pixel DX-2 in each integration time are the same as the contents described above with reference to FIG. 21.

At this time, the control unit may process an average of the electrical signals obtained through the plurality of sub-integration times as the electrical signal of one integration time. Accordingly, it is possible to further improve the accuracy of the electrical signal for the depth.

FIG. 27A is a view for describing the driving of a control unit according to the embodiment.

Referring to FIG. 27A, in the camera apparatus according to the embodiment, the control unit may output a light irradiation signal for controlling the light source to emit light in a predetermined period (e.g., a frame period). In the embodiment, the light source may be periodically turned on or off by the light irradiation signal of the control unit.

The control unit may provide the light irradiation signal to the light source. Accordingly, the light source may emit light having a predetermined period according to the light irradiation signal. For example, the irradiated light may correspond to the above-described incident light. In addition, light may be irradiated in a predetermined frame period. For example, light may be irradiated at 30 FPS. Accordingly, the camera module according to the embodiment may generate 30 frames per second. In addition, the light irradiation signal may correspond to the above-described incident light or incident light signal.

The light irradiation signal is a signal for driving the light source, and may be composed of a plurality of pulses as described above. In the embodiment, the light irradiation signal may be a signal having a plurality of wavelengths.

In addition, for example, the light irradiation signal may be composed of a plurality of pulses in one frame period. In other words, the light irradiation signal has the plurality of pulses in one frame period, and the image sensor may generate the above-described electric signal for depth measurement according to the exposure signal with respect to the plurality of pulses.

In addition, as described above, a plurality of exposure signals in one frame period may be output simultaneously or in different integration times. This may be changed depending on the number of light receiving units of the image sensor and a phase driving method.

For example, the light irradiation signal may have four pulses in one frame period. Four electrical signals through four reference signals may be generated by the four pulses. In addition, as described above, an image may be generated for each frame by the four electrical signals. In addition, the integration time may be variously 1, 2, 4, and the like in response to the four electrical signals. Hereinafter, one frame period will be described as having one integration time. In other words, the four electrical signals will be described as being generated for a period of one exposure signal (integration time).

The control unit may be positioned in the image sensor. In other words, the light irradiation signal may move from the image sensor to the light source. With this configuration, synchronization or sync between the exposure signal and the light irradiation signal may be easily performed, thereby minimizing a time error due to transmission. In addition, it is possible to improve the driving accuracy of the component by the minimized time error.

In addition, the control unit may output the exposure signal for controlling the exposure of the image sensor. More specifically, the exposure signal may be output from an image sensor control unit (or driver) in the image sensor. A detailed description thereof will be given below.

In addition, the first and second light receiving units in the image sensor may convert the absorbed input light signal into an electric signal by the exposure signal and output the converted signal. This performance may be conducted in the above-described indirect-TOF.

In addition, in the direct-TOF, the exposure signal may be a signal that the image sensor receives the reflected light. In other words, after the incident light is output by the light irradiation signal, the control unit may receive the reflected light together with the exposure signal. At this time, the control unit may move the optical unit to a desired position by outputting a drive signal to be described below before the light irradiation signal, that is, the input light, is output in the same manner as will be described below.

Hereinafter, a description will be given based on the indirect-TOF.

The exposure signal may have the above-described integration time and read out, and an idle time. The idle time may be positioned after the integration time and the read out within the frame period. The idle time may be a time for which the operation of the light receiving unit in the image sensor is not performed.

In addition, the control unit may be positioned in the image sensor as described above. In addition, the light irradiation signal and the drive signal to be described below may be synchronized based on the exposure signal. Accordingly, the light irradiation signal may be output based on the exposure signal of the image sensor, thereby minimizing the error of the depth measurement according to the incident light and the reflected light.

In addition, as will be described below, the control unit may output the drive signal output to the drive unit for movement of the optical unit. The control unit may be positioned in the image sensor or within the camera module. In addition, the control unit may be positioned in the light receiving unit or the light emitting unit. In addition, the control unit may be configured separately from the control unit configured to output the light irradiation signal or the exposure signal. In other words, according to the embodiment, a plurality of control units may be provided, and may have various positions. A detailed description thereof will be given below.

In addition, according to the embodiment, when the light irradiation signal is applied, the optical unit of the camera module may be moved from an initial position to a spot where light provides the point form or a flood where light provides the planar form by the drive unit. Alternatively, the optical unit may be moved to a spot where light in the point form is provided or a flood where light in the planar form is provided by the drive unit. In the embodiment, the optical unit may move from an initial position to a first position (a position of the optical unit in the planar form or a position of the optical unit in the point form) before a predetermined time before the light source is turned on. Hereinafter, the movement of the optical unit will be described. In addition, in this specification, the initial position refers to a position of the optical unit when no drive signal is applied. In addition, light in the point form may be light that provides the smallest size in an object spaced apart from the light source or the optical unit (or camera module) by a predetermined distance after passing through the optical unit. Alternatively, light in the planar form may be light that provides the largest size in the object spaced apart from the light source or the optical unit (or camera module) by the predetermined distance after passing through the optical unit. In addition, this may be applied in a controlled range of the optical unit except for the initial position.

FIG. 27B is a view for describing the movement of an optical unit according to a first embodiment.

Referring to FIG. 27B, the optical unit according to the first embodiment may move to a first position when the light source is turned on, and move to an initial position when the light source is turned off. In other words, the optical unit is positioned at the first position according to the applied drive signal, and the light in any one of the planar form and the point form may be output through the optical unit according to the drive signal. Hereinafter, a case in which the light source is turned on means a case in which all of the plurality of pulses or one or more of the plurality of pulses are turned on or applied within a predetermined period. In addition, a case in which the light source is turned off means a case in which all of the plurality of pulses are turned off after or before the predetermined period. However, for the purpose of description, a description will be given based on all of the plurality of pulses.

According to the embodiment, when the optical unit is positioned at the initial position, the optical unit may output light in any one of the planar form and the multi-point form. In addition, when the optical unit is positioned at the first position, the optical unit may output the light in the other one of the planar form and the multi-point form.

In this embodiment, when the optical unit is located at the initial position, light may be output in the point form. In addition, when the optical unit is positioned at the first position, the camera module may output light in the planar form.

In addition, in the embodiment, when the optical unit is positioned at any one of the initial position or the first position, the distance between the optical unit and the light source may be equal to a back focal distance or a backfocus distance of the optical unit.

In the first embodiment, the back focal distance of the optical unit may be equal to the distance between the optical unit and the light source when the optical unit is positioned at the initial position or at a position of the point form.

In addition, in the first embodiment, a distance dd1 between the optical unit, which is positioned at the initial position or at the position of the point pattern, and the light source may be smaller than a distance dd2 between the optical unit in the planar pattern and the light source.

FIG. 27C is a view for describing the movement of an optical unit according to a second embodiment.

Referring to FIG. 27C, the optical unit according to the second embodiment may move to the first position when the light source is turned on, and move to the initial position when the light source is turned off.

According to the embodiment, when the optical unit is positioned at the initial position, the optical unit may output light in any one of the planar form and the multi-point form. In addition, when the optical unit is positioned at the first position, the optical unit may output the light in the other one of the planar form and the point form.

In this embodiment, the optical unit may output light in the planar form at the initial position. In addition, when the optical unit is positioned at the first position, light may be output in the multi-point form.

In addition, as described above, when the optical unit is positioned at any one of the initial position or the first position in the camera module according to the embodiment, the distance between the optical unit and the light source may be equal to the back focal distance or backfocus distance of the optical unit.

In the second embodiment, the back focal distance of the optical unit may be equal to the distance between the optical unit and the light source when the optical unit is positioned at the initial position or at a position of the planar pattern.

In addition, as described above, in the second embodiment, the distance dd1 between the optical unit in the point pattern and the light source may be smaller than the distance dd2 between the optical unit, which is positioned at the initial position or the position of the planar pattern, and the light source.

FIG. 27D is a view for describing the movement of an optical unit according to a third embodiment.

Referring to FIG. 27D, the optical unit according to the third embodiment may move to the first position when the light source is turned on, and move to the initial position when the light source is turned off.

According to the embodiment, when the optical unit is positioned at the first position, the optical unit may output light in any one of the planar form and of the multi-point form. In addition, when the optical unit is positioned at the first position, the optical unit may output the light in the other one of the planar form and the point form.

More specifically, the optical unit may be positioned at a 1-A position when outputting light in the point form. In addition, the optical unit may be positioned at a 1-B position when outputting light in the planar form.

In this embodiment, the optical unit may be moved to the initial position, the 1-A position, and the 1-B position. In addition, the distance dd1 between the light source and the optical unit at the 1-A position may be greater than a distance dd0 between the light source and the optical unit at the initial position. In addition, the distance dd2 between the light source and the optical unit at the 1-B position may be greater than the distance dd1 between the light source and the optical unit at the 1-A position.

In addition, a distance (dd1-dd0) between the initial position and the 1-A position may be smaller than a distance (dd2-dd0) between the initial position and the 1-B position.

Accordingly, in the camera module according to this embodiment, the optical unit may output light in the point pattern or the planar pattern while moving in one direction. Accordingly, the movement of the optical unit may be easily controlled. Furthermore, when a long distance is mainly used, the optical unit may provide light in the point pattern more easily than in the planar pattern. Accordingly, it is possible to improve power efficiency.

FIG. 27E is a view for describing the movement of an optical unit according to a fourth embodiment.

Referring to FIG. 27E, the optical unit according to the fourth embodiment may move to the first position when the light source is turned on, and move to the initial position when the light source is turned off.

In addition, in the embodiment, when the optical unit is positioned at the first position, the optical unit may output light in any one of the planar form and the multi-point form. In addition, when the optical unit is positioned at the first position, the optical unit may output the light in the other one of the planar form and the point form.

More specifically, the optical unit may be positioned at a 1-A position when outputting light in the point form. In addition, the optical unit may be positioned at a 1-B position when outputting light in the planar form. Accordingly, the optical unit may move to the initial position, the 1-A position, and the 1-B position.

In addition, a distance dd1' between the light source and the optical unit at the 1-A position may be smaller than a distance dd0' between the light source and the optical unit at the initial position. In addition, a distance dd2' between the light source and the optical unit at the 1-B position may be greater than the distance dd0' between the light source and the optical unit at the initial position.

In addition, a distance (dd0'-dd1') between the initial position and the 1-A position may be smaller than a distance (dd2'-dd0') between the initial position and the 1-B position.

Accordingly, in the camera module according to this embodiment, the optical unit may output light in the point pattern or the planar pattern while moving both up and down. Accordingly, the amount of movement of the optical unit may be reduced. Accordingly, it is possible to improve power efficiency. Furthermore, the distance between the initial position and the 1-A position and the distance between the initial position and the 1-B position may be adjusted to be the same or different. For example, when the distance between the initial position and the 1-A position and the distance between the initial position and the 1-B position are the same as each other, the movement range of the optical unit can be minimized. In addition, when the distance between the initial position and the 1-A position and the distance between the initial position and the 1-B position are different, it is possible to further improve power efficiency according to a mainly used case. For example, when it is mainly used for a distant object, the distance between the initial position and the 1-A position may be smaller than the distance between the initial position and the 1-B position in the optical unit. Conversely, when it is mainly used for a close object, the distance between the initial position and the 1-A position may be greater than the distance between the initial position and the 1-B position in the optical unit.

FIG. 27F is a view for describing the movement of an optical unit according to a fifth embodiment.

Referring to FIG. 27F, the optical unit according to the fifth embodiment may move to the first position when the light source is turned on, and move to the initial position when the light source is turned off.

In addition, in the embodiment, when the optical unit is positioned at the first position, the optical unit may output light in any one of the planar form and the multi-point form. In addition, when the optical unit is positioned at the first position, the optical unit may output the light in the other one of the planar form and the point form.

More specifically, the optical unit may be positioned at a 1-A position when outputting light in the point form. In addition, the optical unit may be positioned at a 1-B position when outputting light in the planar form. Accordingly, the optical unit may move to the initial position, the 1-A position, and the 1-B position.

In addition, a distance dd0" between the light source and the optical unit at the initial position may be greater than a distance dd2" between the light source and the optical unit at the 1-B position. In addition, the distance dd2" between the light source and the optical unit at the 1-B position may be greater than a distance dd1" between the light source and the optical unit at the 1-A position.

In addition, a distance (dd0"-dd1") between the initial position and the 1-A position may be greater than a distance (dd2"-dd1") between the 1-B position and the 1-A position.

Accordingly, in the camera module according to this embodiment, the optical unit may output light in the point pattern or the planar pattern while moving in one direction (downward). Accordingly, the movement of the optical unit may be easily controlled. Furthermore, when it is mainly used for a close distance, the optical unit may provide light in the planar pattern more easily than in the plurality of point patterns. Accordingly, it is possible to improve power efficiency.

FIG. 27G is a block diagram of the camera module according to the embodiment.

Referring to FIG. 27G, the camera module according to the embodiment may include a control unit CLO, a sensor control unit ISD of the image sensor IS, a light control unit LSD of the light source LS, and a drive control unit ATD of a drive unit AT. In the embodiment, the camera module may include the control unit CLO therein. Alternatively, the control unit CLO may be an application processor.

First, the sensor control unit ISD of the image sensor IS may output a trigger signal synchronized to the exposure signal to the control unit CLO. Furthermore, the sensor control unit ISD may output a light output signal Mode SE_out of the light source corresponding to the exposure signal to the control unit CLO. In other words, a trigger signal Trigger out and the light output signal Mode SE_out may be output simultaneously or with a predetermined time difference because both the trigger signal Trigger out and the light output signal Mode SE_out correspond to the exposure signal. In addition, the sensor control unit ISD may be positioned in the image sensor IS. In addition, a light irradiation unit in the light source LS may be, for example, vertical cavity surface emitting lasers (VCSELs). Accordingly, the light control unit LSD is shown as a "vcsels driver IC" corresponding to the light irradiation unit. In addition, in the drive unit AT, a VCM corresponds to the drive coil part 150 to which the current is applied, and thus the drive control unit ATD is referred to as a "VCM driver IC."

In addition, in the embodiment, the sensor control unit ISD may output a signal LD_EN for turning on the light control unit LSD of the light source LS. Thereafter, since the light control unit LSD receives a light irradiation signal Mode SE_in from the control unit CLO, it is possible to maximize power efficiency.

In addition, when receiving the trigger signal Trigger out and the light output signal Mode SE_out from the image sensor IS, the control unit ISD according to the embodiment may output the light irradiation signal Mode SE_in and the drive signal synchronized thereto. Accordingly, the light source LS may output light by the light irradiation signal. In addition, the optical unit may be moved by the drive unit by the drive signal.

At this time, the light irradiation signal and the drive signal may be synchronized with the exposure signal. For example, the light source LS may output light according to the light irradiation signal before a time interval for receiving light according to the exposure signal. Furthermore, before the light is output from the light source LS, the optical unit may be moved by the drive unit. In other words, a time synchronization may be conducted by applying the drive signal before the light irradiation signal is applied. A detailed description thereof will be given below.

FIG. 28 is a view for describing the driving of a control unit according to the first embodiment.

Referring to FIG. 28, as described above, the control unit may output the drive signal output to the drive unit for the movement of the optical unit.

The drive signal is output to the optical unit, and the optical unit may perform the vertical movement by the drive signal output from the control unit. In addition, light irradiated from the light source by the vertical movement of the optical unit may be converted into the point form or the planar form to be irradiated to the object. In addition, the movement of the optical unit according to the above-described third embodiment will be described below.

The drive signal may be output in synchronization with the exposure signal by the control unit. In the embodiment, the drive signal may be output after the exposure signal in one frame period by the control unit. Hereinafter, one frame period will be described based on the period of the exposure signal as shown in the drawing. In addition, the exposure signal may be composed of a plurality of integration times, but will be described below based on one integration time. Accordingly, the start and end of the exposure signal will be described in a plurality of integration times or one integration time for which one frame may be generated. In addition, the light irradiation signal may also be composed of a plurality of pulses, but will be described below with one pulse. In addition, the start and end of the light irradiation signal will also be described in the plurality of integration times or one integration time for which one frame may be generated. In addition, the period of the light irradiation signal may be the same as one frame period. In addition, in this specification, the light irradiation signal and the drive signal will be described as being output from a pulse portion. In addition, output or application may correspond to a high section. In addition, high corresponds to on. In addition, the end may be in a low state. In addition, low corresponds to off.

The drive signal may be output before the light irradiation signal is output. In the embodiment, the drive signal may be output between the exposure signal and the light irradiation signal within one frame period. In other words, after the exposure signal is output within one frame period by the control unit, the drive signal may be output. The control unit may adjust the output of the light irradiation signal and the drive signal based on the output of the exposure signal.

In addition, the drive signal may be maintained even after the light irradiation signal is output. In addition, the drive signal may be ended in the same manner as the end of the output of the light irradiation signal, or may not be output after the output of the light irradiation signal is ended. For example, the drive signal may be applied before the light irradiation signal is output in the frame period immediately before the frame period. Alternatively, after the drive signal is output in the frame period, the light irradiation signal may be output in the same frame period. In addition, the exposure signal may be output after a predetermined time or a time difference dh after the light irradiation signal is output. With this configuration, in consideration of the time it takes for the optical unit to move to a desired position in the camera module according to the embodiment (e.g., a settling time), the optical unit may be moved before light is irradiated by the light source.

In addition, the optical unit may be moved to the desired position before the light irradiation signal is output, which may be maintained until light is completely irradiated by the light source within the frame period. Accordingly, a depth image may be captured in a desired pattern. Accordingly, depth measurement may be performed more accurately.

In addition, according to the embodiment, the drive signal may not overlap the exposure signal. The output of the drive signal may be ended between an output end point of the light irradiation signal and an output start point of the exposure signal (next frame period). Accordingly, it is possible to minimize energy consumption for the movement of the optical unit. In other words, it is possible to improve energy efficiency of the camera module. In addition, it is possible to improve the reliability of the element by minimizing the oscillation generated by an actuator or the like configured to move the optical unit.

In the embodiment, the drive signal may include a first section PE1 before the light irradiation signal is output and a second section PE2 continued from the first section PE1.

The first section PE1 may overlap an idle time of the exposure signal. In addition, the first section PE1 may not overlap the light irradiation signal (application of the light irradiation signal). Accordingly, it is possible to reduce energy consumption for driving the optical unit within one frame period.

In addition, the drive signal may be applied with the time difference dh after the application of the exposure signal is ended. Accordingly, it is possible to reduce power consumption due to the drive signal. The time difference dh may be set in consideration of the time of application of the light irradiation signal output within a preset time after the end of the exposure signal. In other words, the time difference dh may be a maximum delay time difference in consideration of a maximum settling time for emitting light in the planar form or the point form. In addition, with this configuration, it is possible to improve energy efficiency.

FIG. 29 is a view for describing the adjustment of the drive signal for providing the planar form or the point form.

Referring to FIG. 29, in the camera module according to the embodiment, the control unit may adjust light in the point form or the planar form by adjusting a width of the first section PE1 in the drive signal.

In the embodiment, the first section PE1 in the drive signal may have a first width TW1 or a second width TW2. In addition, the first width TW1 may be smaller than the second width TW2. In other words, the control unit may adjust the overall width of the drive signal to be different.

In the embodiment, when the first section PE1 has the first width TW, the amount of movement of the optical unit may be smaller than when the second section PE2 has the second width TW2. In addition, when the initial position of the optical unit is positioned at the bottom, the drive signal has the first width TW1, so that light in the point form may be output. In addition, when the initial position of the optical unit is positioned at the bottom, the drive signal has the second width TW2, so that light in the planar form may be output. However, a description of the adjustment will be made based on a case in which the initial position of the optical unit is set to the bottom adjacent to the image sensor as described above. A case in which the initial position of the optical unit is set to the top may be opposite.

In the embodiment, the initial position of the optical unit may be set at a point or adjacent thereto at which light in the point form where energy is concentrated is emitted for accuracy of the depth image. Accordingly, it is possible to further improve energy efficiency for the movement of the optical unit.

In addition, in the embodiment, the drive signal may have a maximum width when light has the planar form. At this time, in one frame period, the first section PE1 having the maximum width and the exposure signal may have the time difference dh.

In addition, the second section PE2 may be maintained regardless of the planar form or the point form. With this configuration, it is possible to minimize the movement or oscillation of the optical unit in the section where the light source is irradiated, thereby improving the accuracy of the depth image.

FIG. 30 is a view for describing a first example of the drive signal for providing the planar form or the point form.

Referring to FIG. 30, a width (e.g., pulse width) of the drive signal may be changed as shown in FIG. 29, and light may have the point form or the planar form corresponding thereto. Hereinafter, as described above, the initial position of the optical unit will be described based on the case of being positioned at the bottom. In other words, when the distance between the optical unit and the light source increases, light is sequentially converted from the point form to the planar form. In addition, the applied current refers to a current applied to the coil to move the optical unit, and a magnitude of the current may be adjusted to correspond to a magnitude of the width of the above-described drive signal.

In the embodiment, in the drive signal, a polarity of the planar form may be the same as a polarity of the point form. A current Iini of the drive signal corresponding to the initial position, a current Ispot due to the drive signal corresponding to the point form, and a current Iflood of the drive signal corresponding to the planar form may be sequentially positioned. Accordingly, when the width of the drive signal increases, the optical unit may move from the initial position to a position where the point form is provided and a position where the planar form is provided. In the embodiment, the initial position of the optical unit may be set adjacent to a point at which light in the point form where energy is concentrated is emitted for the accuracy of the depth image, thereby further improving energy efficiency for the movement of the optical unit.

In addition, when the optical unit moves to the maximum, that is, when the current Iflood of the drive signal corresponding to the planar form is applied, the maximum power Pmax1 may be consumed.

FIG. 31 is a view for describing a second example of the drive signal for providing the planar form or the point form.

As shown in FIG. 29, the width (e.g., pulse width) of the drive signal may be changed, and light may have the point form or the planar form corresponding thereto. In addition, as described above, a description will be given based on a case in which the initial position of the optical unit is positioned between the position where the point form is provided and the position where the planar form is provided. For example, the initial position may be adjacent to the top or the bottom. In the drawing, the initial position may be positioned adjacent to the bottom. In other words, when the distance between the optical unit and the light source decreases, light may be converted into the point form, and when the distance between the optical unit and the light source increases, the light source may be converted into the planar form. The conversion between the point form and the planar form occurs when the distance is smaller than or larger than a predetermined distance as described above.

In addition, the applied current refers to a current applied to the coil to move the optical unit, and a magnitude of the current may be adjusted to correspond to a magnitude of the width of the above-described drive signal.

In the embodiment, in the drive signal, the polarity of the planar form and the polarity of the point form may be different. For example, in the drive signal, the polarity of the planar form and the polarity of the point form may be opposite.

Accordingly, the current Iini of the drive signal corresponding to the initial position may be positioned between the current Ispot by the drive signal corresponding to the point form and the current Iflood of the drive signal corresponding to the planar form. Accordingly, the position of the optical unit may be adjusted according to the width and polarity of the drive signal. In the embodiment, the polarity of the drive signal may determine the movement direction of the optical unit.

For example, the optical unit may be moved from the initial position to the position where the point form is provided and the position where the planar form is provided. At this time, the initial position is present between the position where the point form is provided and the position where the planar form is provided.

In addition, when the polarity of the drive signal is negative (−), the optical unit may move down, and when the polarity of the drive signal is positive (+), the optical unit may move up.

In addition, when the optical unit moves to the maximum, that is, when the current Iflood of the drive signal corresponding to the planar form is applied, the maximum power Pmax1 may be consumed. However, this is because light is emitted in the point form as described above, and the initial position may also be positioned between the spot and the flood.

In addition, when the polarity of the drive signal corresponding to the planar form and the polarity of the drive signal corresponding to the point form are opposite to each other, the maximum power Pmax2 may be smaller than the above-described maximum power Pmax1 when the optical unit moves to the maximum (e.g., when the current Iflood of the drive signal corresponding to the planar form is applied). In other words, it is possible to improve power efficiency.

In the embodiment, the initial position of the optical unit may be set adjacent to a point at which light in the point form where energy is concentrated is emitted for the accuracy of the depth image, thereby further improving energy efficiency for the movement of the optical unit.

Furthermore, with the above-described configuration, it is possible to reduce the maximum magnitude of the current compared to the case described with reference to FIG. 31. For example, the current Iini of the drive signal corresponding to the initial position may have an intermediate value (e.g., zero) between the current Ispot by the drive signal corresponding to the point form and the current Iflood of the drive signal corresponding to the planar form. With this configuration, it is possible to reduce the maximum magnitude of the current applied to drive the optical unit. Accordingly, it is possible to minimize power consumed for the movement of the optical unit.

In addition, a method of driving the control unit according to the embodiment may include transmitting the drive signal for the movement of the optical unit to the drive unit before light is output from the light source, transmitting the light irradiation signal for controlling the light output of the light source, and receiving light according the integration time by the image sensor. Here, the above-described contents may be applied to the drive signal and the light irradiation signal, and the exposure signal or the integration time in the same manner.

More specifically, the control unit may transmit the light irradiation signal for controlling on/off of the light source. In addition, the control unit may move the optical unit to the first position when the light source is turned on by the light irradiation signal, and output the drive signal for moving the optical unit to the initial position when the light source is turned off. However, the drive signal may be irradiated before the light source is turned on by the light irradiation signal. In addition, the optical unit may convert the light output from the light source into the planar form or the multi-point form and output the converted light.

Furthermore, before the transmitting of the drive signal for the movement of the optical unit to the drive unit, the control unit may receive the trigger signal Trigger out and the light output signal Mode SE_out from the image sensor. Both the trigger signal Trigger out and the light output signal Mode SE_out correspond to the exposure signal. Accordingly, since the trigger signal Trigger out and the light output signal Mode SE_out are output to the control unit based on the exposure period of the image sensor, the operation of the image sensor (integration time), the operation of the light source (on/off), and the movement of the optical unit (operation of the drive unit) may be performed based on one operation. Accordingly, these operations may be easily performed by minimizing a temporal error between these operations.

In other words, in the embodiment, the control unit may receive the trigger signal to output the drive signal to the drive control unit, and in response thereto, the drive control unit may move the position of the optical unit to the initial position or the first position according to the on or off of the drive signal.

In addition, in the embodiment, the drive signal may be turned on after the trigger signal is turned off. In addition, the drive signal may be maintained in the on state even after the trigger signal is converted from off to on. In addition, the drive signal may be turned off when the maintained trigger signal is changed from on to off or after the trigger signal is turned off (see FIG. 27A or FIG. 28). In other words, as described above, the optical unit may be moved by the drive signal before the light control unit is turned on in response to the on of the trigger signal, and after the movement of the optical unit is maintained, the drive signal is turned off in response to a change (off→on) of the trigger signal or after the change, which may correspond to the end of the movement of the optical unit.

In other words, a signal LD_EN for turning on the light control unit LSD of the light source LS in synchronization with the output of the trigger signal may be output. Furthermore, it should be understood that the operation of each control unit may be performed as described above. Furthermore, the driving of the control unit according to another embodiment to be described below may be performed in the same manner.

FIG. 32 is a view for describing the driving of a control unit according to the second embodiment.

Referring to FIG. 32, the control unit according to the second embodiment may provide the light irradiation signal to the light source as described above. Accordingly, the light source may emit light having a predetermined period according to the light irradiation signal. The light irradiation signal may respond to the above-described incident light or incident light signal. In addition, the light irradiation signal is a signal for driving the light source, and may be composed of a plurality of pulses as described above. In the embodiment, the light irradiation signal may be a signal having a plurality of wavelengths. Except for contents to be described below, the above-described contents may be applied to a description of the light irradiation signal in the same manner.

In addition, the control unit may be positioned in the image sensor. In other words, the light irradiation signal may move from the image sensor to the light source. With this configuration, synchronization between the exposure signal and the light irradiation signal may be easily performed, thereby minimizing a time error due to transmission. In addition, it is possible to improve the driving accuracy of the component by the minimized time error.

In addition, the control unit may output the exposure signal for controlling the exposure of the image sensor. The first and second light receiving units in the image sensor may convert the absorbed input light signal into an electric signal by the exposure signal and output the electrical signal. Except for contents to be described below, the above-described contents may also be applied to a description of the exposure signal in the same manner.

In addition, the control unit may output the drive signal output to the drive unit for the movement of the optical unit. The control unit may be positioned in the image sensor. In addition, the control unit may be positioned in the light receiving unit or the light emitting unit. In addition, the control unit may be configured separately from the control unit configured to output the light irradiation signal or the exposure signal. In other words, according to the embodiment, a plurality of control units may be provided, and may have various positions.

In this embodiment, the control unit may output the drive signal output to the drive unit for the movement of the optical unit. At this time, the drive signal may at least partially overlap the exposure signal. In this embodiment, a description will be given by excluding the drive signal output in a previous frame period.

In addition, the drive signal may be output to the optical unit, and the optical unit may perform the vertical movement by the drive signal. Light irradiated from the light source by the vertical movement of the optical unit may be converted into the point form or the planar form to be irradiated to the object.

In this embodiment, the drive signal may be output before the light irradiation signal is output. In the embodiment, the drive signal may be output between the exposure signal and the light irradiation signal within one frame period. Alternatively, the output of the drive signal may be started between the exposure signal and the light irradiation signal within one frame period. In other words, after the exposure signal is output within one frame period, the drive signal may be output.

In addition, the drive signal may be maintained even after the light irradiation signal is output. The drive signal may be ended in the same manner as the light irradiation signal, or may not be output after the output of the light irradiation signal is ended. With this configuration, in consideration of the time it takes for the optical unit to move to a desired position in the camera module according to the embodiment (e.g., a settling time), the optical unit may be moved before light is irradiated by the light source. In addition, the optical unit is moved to the desired position before the light irradiation signal is output, which may be maintained until light irradiation by the light source is ended. Accordingly, the magnitude of the signal applied for maintenance may be the same as or different from the magnitude of the signal at the settling time. Accordingly, a depth image may be captured in a desired pattern. Accordingly, depth measurement may be performed more accurately.

In addition, according to the embodiment, the drive signal may partially overlap the exposure signal. The output of the drive signal may be ended after an output start point (next frame period) of the exposure signal. In this regard, the drive signal according to the embodiment may include a first section PE1' before the light irradiation signal is output and a second section PE2' continued from the first section PE1'.

The first section PE1' may overlap an idle time of the exposure signal. In addition, the first section PE1' may not overlap the light irradiation signal (application of the light irradiation signal). Accordingly, it is possible to minimize energy consumption for the movement of the optical unit. In other words, it is possible to improve the energy efficiency of the camera module. In addition, it is possible to improve the reliability of the element by minimizing the oscillation generated by an actuator or the like configured to move the optical unit.

In addition, the second section PE2' may at least partially overlap the exposure signal. Accordingly, the optical unit may move to the initial position for the integration time. Accordingly, it is possible to easily secure a margin in which the movement of the optical unit is ended after the output of the light irradiation signal is ended.

FIG. 33 is a view for describing the driving of a control unit according to the third embodiment.

The control unit according to the third embodiment may provide the light irradiation signal to the light source as described above. Accordingly, the light source may emit light having a predetermined period according to the light irradiation signal. The light irradiation signal may respond to the above-described incident light or incident light signal. In addition, the light irradiation signal is a signal for driving the light source, and may be composed of a plurality of pulses as described above. In the embodiment, the light irradiation signal may be a signal having a plurality of wavelengths. Except for contents to be described below, the above-described contents may be applied to a description of the light irradiation signal in the same manner.

In addition, the control unit may be positioned in the image sensor. In other words, the light irradiation signal may move from the image sensor to the light source. With this configuration, it is possible to easily synchronize the exposure signal and the light irradiation signal, thereby minimizing a time error due to transmission. In addition, it is possible to improve the driving accuracy of the component by the minimized time error.

In addition, the control unit may output the exposure signal for controlling the exposure of the image sensor. The first and second light receiving units in the image sensor may convert the absorbed input light signal into an electric signal by the exposure signal and output the electrical signal. Except for contents to be described below, the above-described contents may also be applied to a description of the exposure signal in the same manner.

In addition, the control unit may output the drive signal output to the drive unit for the movement of the optical unit. The control unit may be positioned in the image sensor. In addition, the control unit may be positioned in the light receiving unit or the light emitting unit. In addition, the control unit may be configured separately from the control unit configured to output the light irradiation signal or the exposure signal. In other words, according to the embodiment, a plurality of control units may be provided, and may have various positions.

In this embodiment, the control unit may output the drive signal output to the drive unit for the movement of the optical unit. At this time, the drive signal may overlap the exposure signal. Furthermore, the drive signal may be partially output even after the exposure signal. In this embodiment, a description will be given by excluding the drive signal output in a previous frame period.

In addition, the drive signal may be output to the optical unit, and the optical unit may perform the vertical movement by the drive signal. Light irradiated from the light source by the vertical movement of the optical unit may be converted into the point form or the planar form to be irradiated to the object.

In this embodiment, the drive signal may be output before the light irradiation signal is output. In the embodiment, the drive signal may be output between the exposure signal and the light irradiation signal within one frame period. Alternatively, the output of the drive signal may be started between the exposure signal and the light irradiation signal within one frame period. In other words, after the exposure signal is output within one frame period, the drive signal may be output.

In addition, the drive signal may be maintained even after the light irradiation signal is output. The drive signal may be ended in the same manner as the light irradiation signal, or may not be output after the output of the light irradiation signal is ended. With this configuration, in consideration of the time it takes for the optical unit to move to a desired position in the camera module according to the embodiment (e.g., a settling time), the optical unit may be moved before light is irradiated by the light source. In addition, the optical unit is moved to the desired position before the light irradiation signal is output, which may be maintained until light irradiation by the light source is ended. Accordingly, a depth image may be captured in a desired pattern. Accordingly, depth measurement may be performed more accurately.

In addition, according to the embodiment, the drive signal may overlap the exposure signal. The output of the drive signal may be ended after the output start point (next frame period) of the exposure signal followed by the output end point thereof. In this regard, the drive signal according to the embodiment may include a first section PE1" before the light irradiation signal is output and a second section PE2" continued from the first section PE1". In the embodiment, the first section PE1" may overlap an idle time of the exposure signal. In addition, the first section PE1" may not overlap the light irradiation signal (application of the light irradiation signal). Accordingly, it is possible to minimize energy consumption for the movement of the optical unit. In other words, it is possible to improve the energy efficiency of the camera module. In addition, it is possible to improve the reliability of the element by minimizing the oscillation generated by an actuator or the like configured to move the optical unit.

In addition, the second section PE2" may overlap the exposure signal (or the output of the exposure signal). Furthermore, the second section PE2" may be maintained for a predetermined time even after the output of the exposure signal is ended. Accordingly, it is possible to prevent an oscillation due to the movement of the optical unit (e.g., movement to the initial position) from occurring while the exposure signal is output, that is, for the integration time. Accordingly, it is possible to improve the accuracy of the depth image.

FIG. 34 is a perspective view of a camera module according to another embodiment, FIG. 35 is an exploded perspective view of the camera module according to another embodiment, FIG. 36A is a cross-sectional view taken along line A-A' in FIG. 34, FIG. 36B is a cross-sectional view taken along line B-B' in FIG. 34, FIG. 36C is a cross-sectional view taken along line C-C' in FIG. 34, and FIG. 36D is a cross-sectional view taken along line D-D' in FIG. 34.

The TOF camera apparatus may include a camera apparatus. The TOF camera apparatus may include a camera module.

Referring to FIGS. 34 to 36D, the camera module may include a light emitting unit 1. The light emitting unit 1 may be a light emitting module, a light emitting unit, a light emitting assembly, or a light emitting device. The above-described contents may be applied to a description of the light emitting unit 1 in the same manner.

In addition, the camera module 20 may include a light receiving unit 2. The light receiving unit 2 may be a light receiving module, a light receiving unit, a light receiving assembly, or a light receiving device, and may be one component of the camera module. The light receiving unit 2 may receive light emitted from the light emitting unit 1 and reflected from an object, and convert the received light into an electrical signal. Except for contents to be described below, the above-described contents may be applied to a description of the light receiving unit 2 in the same manner.

In this embodiment, the light receiving unit 2 may include a housing 1000, a lens module 2000, a substrate 3000, a coil unit 4000, a holder 5000, a magnet unit 6000, an elastic member 7000, an optical member 8000, a cover 9000, and an image sensor IS.

First, the housing 1000 may be positioned inside the cover 9000 to be described below. The housing 1000 may be coupled to the lens module 2000, the substrate 3000, the coil unit 4000, and the elastic member 7000, which will be described below. A detailed description thereof will be given below.

In the embodiment, the housing 1000 may include an inner part 1100, an outer part 1200, and a connection part 1300 disposed between the inner part 1100 and the outer part 1200. A detailed description thereof will be given below.

The lens module 2000 may pass light reflected from the object. An optical axis of the lens module 2000 and an optical axis of the image sensor IS may be aligned. In addition, the lens module 2000 may be coupled to the housing 1000. In addition, the lens module 2000 may be fixed to the housing 1000. The lens module 2000 may be composed of a plurality of optical members, but is not limited thereto.

The lens module 2000 may include a lens accommodation part 2100 on which the optical member is seated and a lens cover 2200 configured surround the lens accommodation part 2100. The lens cover 2200 may come into contact with the housing 1000 and may be moved up and down by a voice coil motor or the like, as will be described below. Accordingly, a focus of the light passing through the lens module 2000 may be changed.

The substrate 3000 may be coupled to the housing 1000. The substrate 3000 may be coupled to a substrate protrusion formed on a side surface of the housing 1000. In addition, the substrate 3000 may further include a terminal part 3200. The terminal part 3200 is a portion extending downward from a body part 3100 of the substrate 3000, and may be electrically connected to a main substrate 4.

The coil unit 4000 may include a plurality of coils, and may be positioned on the side surface of the housing 1000. The coil unit 4000 may be positioned in each housing hole formed in the side surface of the housing 1000. The coil unit 4000 may be electrically connected to the substrate 3000. For example, the coil unit 4000 may be connected to the substrate 3000 through a wire or the like. In addition, since the substrate 3000 is coupled to the housing 1000 as described above, the coil unit 4000 may also be seated in the housing hole formed in the side surface of the housing 1000 and coupled to the housing. A detailed description thereof will be given below.

The holder 5000 may be accommodated in the housing 1000. In addition, the holder 5000 may be coupled to the optical member 8000 and the magnet unit 6000, which will be described below. In the embodiment, the holder 5000 may be tilted. The holder 5000 may include a base 5100, a sidewall 5200, and a second protrusion 5300. A detailed description thereof will be given below.

The magnet unit 6000 may be composed of a plurality of magnets. The magnet unit 6000 may be seated in a holder groove formed in a side surface of the holder 5000. In addition, the magnet unit 6000 may be positioned to face the coil unit 4000. With this configuration, a Lorentz force may be generated, and the magnet unit 6000, the holder 5000 coupled to the magnet unit 6000, and the optical member 8000 coupled to the holder 5000 may be tilted by the Lorentz force. A detailed description thereof will be given below.

The elastic member 7000 may be disposed on the housing 1000 and the holder 5000. The elastic member 7000 may be positioned between the cover 9000 and the holder 5000. A detailed description thereof will be given below.

The optical member 8000 may be coupled to the holder 5000. The optical member 8000 may be disposed between the lens module 2000 and the image sensor IS. The optical member 8000 may be disposed on a light path between the object and the image sensor IS. The optical member 8000 may filter light having a predetermined wavelength range. The optical member 8000 may pass light having a specific wavelength. In other words, the optical member 8000 may block light by reflecting or absorbing light other than the specific wavelength. For example, the optical member 8000 may pass infrared rays and block light having wavelengths other than the infrared rays. Alternatively, the optical member 8000 may pass visible rays and block light having wavelengths other than the visible rays.

In addition, the optical member 8000 may be moved. The optical member 8000 may move integrally with the holder 5000. In the embodiment, the optical member 8000 may be tilted. The optical member 8000 may be tilted to adjust the light path. When the optical member 8000 is tilted, a path of light incident on the image sensor IS may be changed. The optical member 8000 may change a field of view (FOV) angle or a direction of the FOV of the incident light.

The optical member 8000 may be a filter. For example, the optical member 8000 may be an infrared ray bandpass filter. Accordingly, the optical member 8000 may pass only infrared rays. Alternatively, the optical member may be a separate focus fixed lens or variable focus lens (e.g., liquid lens) separated from the lens module.

In addition, in the embodiment, the optical member 8000 may enable high-resolution time of flight (TOF) by changing a path through which light enters as it is tilted.

The cover 9000 may be a bracket. The cover 9000 may include a "cover can." The cover 9000 may be disposed to surround the housing 1000. The cover 9000 may be coupled to the housing 1000. The cover 9000 may accommodate the housing 1000 therein. The cover 9000 may be positioned at an outermost side of the camera module. The cover 9000 may have a hexahedral shape with an open lower surface.

In addition, the cover 9000 may be a non-magnetic substance. In addition, the cover 9000 may be made of a metal. In addition, the cover 9000 may be made of a metal plate.

The cover 9000 may be connected to a ground portion of the main substrate 4. Accordingly, the cover 9000 may be grounded. In addition, the cover 9000 may block electromagnetic interference (EMI). At this time, the cover 9000 may be referred to as an "EMI shield can." The cover 9000 may protect a product from an external impact as a finally assembled component. The cover 9000 may be made of a material having a small thickness and a high strength.

The image sensor IS may detect input light. In addition, the image sensor IS may detect the input light and output the detected input light as an electrical signal. In the embodiment, the image sensor IS may detect light having a wavelength corresponding to the wavelength of light output from the light source 400. For example, the image sensor IS may detect infrared rays. Alternatively, the image sensor IS may detect visible rays. The image sensor IS may include various image sensors configured to sense light.

The image sensor IS may include a pixel array configured to receive light passing through the lens module 2000 and convert the light into an electric signal corresponding to the light, a drive circuit configured to drive a plurality of pixels included in the pixel array, and a read out circuit configured to read an analog pixel signal of each pixel. The read out circuit may generate a digital pixel signal (or an image signal) through analog-to-digital conversion by comparing the analog pixel signal with a reference signal. Here, the digital pixel signal of each pixel included in the pixel array may constitute an image signal, and may be defined as an image frame as the image signal is transmitted in a frame unit. In other words, the image sensor may output a plurality of image frames.

In addition, the light receiving unit 2 may further include a position sensor 4500. The position sensor 4500 may be used for a feedback control. The position sensor 4500 may include a Hall sensor or a Hall IC. The position sensor 4500 may detect the magnet unit 6000. The position sensor 4500 may detect a magnetic force of the magnet unit 6000. The position sensor 4500 may be disposed between the coil units 4000. In addition, the position sensor 4500 may be disposed on an inner surface of the substrate 3000. However, the present invention is not limited thereto, and the position sensor 4500 may also be removed to reduce complexity in the camera module.

The position sensor 4500 may include a plurality of position sensors. The position sensor 4500 may include two sensors. The position sensor 4500 may include a first position sensor 4510 and a second position sensor 4520. The first position sensor 4510 and the second position sensor 4520 may be disposed to be perpendicular to each other. Accordingly, the first position sensor 4510 and the second position sensor 4520 may detect both X-axis and Y-axis movements of the magnet unit 6000 in a horizontal direction. In addition, in the embodiment, an additional sensor configured to detect the movement of the magnet unit 6000 in a Z-axis direction (vertical direction, optical axis direction) may be further provided. In this specification, the Z-axis direction is an optical axis direction or a vertical direction as a third direction. In addition, the X-axis direction is a direction perpendicular to the Z-axis direction, and is a direction from the light emitting part to the light receiving part in the embodiment. In addition, the Y-axis direction is a direction perpendicular to the X-axis direction and the Z-axis direction. A description based on this will be made below.

The light receiving unit 2 may further include an image synthesis part. The image synthesis part may include an image processor configured to receive the image signal from the image sensor IS, and process (e.g., interpolation and frame synthesis) the image signal. In particular, the image synthesis part may use and synthesize image signals (low resolution) of a plurality of frames into an image signal (high resolution) of one frame. In other words, the image synthesis part may synthesize a plurality of image frames included in the image signal received from the image sensor IS, and generate the synthesized result as a synthesized image. The synthesized image generated by the image synthesis part may have a higher resolution than those of a plurality of image frames output from the image sensor IS. In other words, the image synthesis part may generate a high-resolution image through a super resolution (SR) technique. The plurality of image frames may include image frames generated by being changed into different light paths by the movement of the optical member 8000. The image synthesis part may be positioned inside or outside the light receiving unit 2.

The camera module 20 may include the main substrate 4 (printed circuit board (PCB)). The light emitting unit 1 and the light receiving unit 2 may be disposed on the main substrate 4. The main substrate 4 may be electrically connected to the light emitting unit 1 and the light receiving unit 2.

In addition, the camera module may include a connect part 3. The connect part 3 may be electrically connected to the main substrate 4. The connect part 3 may include an extension substrate 5 on which a connector 7 is disposed and connected to a connection substrate 6. The extension substrate 5 may be a PCB, but is not limited thereto.

The camera module may include the connection substrate 6. The connection substrate 6 may connect the main substrate 4 and the extension substrate 5 of the connect part 3. The connection substrate 6 may have flexibility. The connection substrate 6 may be a flexible printed circuit board (FPCB).

In addition, the main substrate 4, the connection substrate 6, and the extension substrate 5 may be formed integrally or separately.

The camera module may include a reinforcement plate 8. The reinforcement plate 8 may include a stiffener. The reinforcement plate 8 may be disposed on a lower surface of the main substrate 4. The reinforcement plate 8 may be made of a stainless steel.

The camera module (or the light receiving unit) may include a lens drive device. The camera module may include a voice coil motor (VCM). The camera module may include a lens drive motor. The camera module may include a lens drive actuator. With this configuration, as described above, the camera module according to another embodiment may perform three-dimensional tilting with respect to the optical member 8000. In addition, as the optical member 8000 is tilted, the light path of the input light passing through the optical member 8000 may move repeatedly according to a predetermined rule.

FIG. 37 is a perspective view of a partial configuration of the light receiving unit of the camera module according to another embodiment, FIG. 38 is a perspective view of the housing of the camera module according to another embodiment, and FIG. 39 is a perspective view of a partial configuration of the camera module according to another embodiment.

Referring to FIGS. 37 to 39, in the embodiment, the cover 9000 may include an upper plate 9100 and a side plate 9200. Specifically, the cover 9000 may include the upper plate 9100 including a cover hole 9110, and the side plate 9200 extending downward from an outer periphery or edge of the upper plate 9100.

The housing 1000, the holder 5000, and the like may be positioned inside the upper plate 9100. In addition, the side plate 9200 may be positioned on the side surface of the housing 1000. A first stepped portion 1240 of the housing 1000 may be positioned at a lower end of the side plate 9200.

In addition, an inner surface of the side plate 9200 may be coupled to the housing 1000. An adhesive member (not shown) may be disposed between the inner surface of the side plate 9200 and the housing 1000. Accordingly, the side plate 9200 may be fixed to the housing 1000. The upper plate 9100 of the cover 9000 may include the cover hole 9110 corresponding to a holder hole 5110 of the holder 5000.

In addition, the cover 9000 may function to support the substrate 3000 and the coil unit 4000 so as not to be pushed by the Lorentz force. In addition, the cover 9000 may function to dissipate heat generated from the coil unit 4000 through conduction. The side plate 9200 of the cover 9000 may include a bent portion in which a part of the side plate 9200 is bent inward and comes into contact with an outer surface of the substrate 3000. The bent portion may include one or more of a pressed portion, a press-fitted portion, and a concaved portion. In this embodiment, as an optimized heat dissipation structure, the coil unit 4000, the substrate 3000, and the cover 9000 are connected through a structure in which the bent portion comes into contact with the substrate 3000, so that the heat generated in the coil unit 4000 may be dissipated to the outside through conduction.

The side plate 9200 of the cover 9000 may include a plurality of side plates. The plurality of side plates may include first to fourth side plates. The side plate 9200 of the cover 9000 may include the first side plate and the second side plate disposed to face each other or opposite to each other, and the third side plate and the fourth side plate disposed to face each other or opposite to each other between the first side plate and the second side plate. In addition, the first to fourth side plates may come into contact with a first portion to a fourth portion 301 to 304 (see FIG. 40) of the substrate 3000 to be described below, respectively.

In addition, in the embodiment, the housing 1000 may be disposed on the main substrate 4.

In addition, the housing 1000 may accommodate the holder 5000 therein. In addition, the lens module 2000 may be coupled to the housing 1000. The housing 1000 may be coupled to a barrel of the lens module 2000.

In addition, the housing 1000 may be a coil case to which a coil is fixed. Accordingly, the housing 1000 may be coupled to the coil unit 4000 and the substrate 3000 connected to the coil unit 4000.

Specifically, the housing 1000 may include the inner part 1100 to which the lens module 2000 is coupled and the outer part 1200 to which the coil unit 4000 is coupled. The inner part 1100 and the outer part 1200 may be formed integrally or separately.

The inner part 1100 may be positioned inside the housing 1000. In addition, the inner part 1100 of the housing 1000 may include a hole 1110. The hole 1110 may be hollow. The hole 1110 may pass through the housing 1000 in the optical axis direction.

In addition, a screw thread 1120 may be provided on an inner peripheral surface of the inner part 1100. The screw thread 1120 of the inner part 1100 may be coupled to the lens module 2000.

In the embodiment, the screw thread 1120 may be positioned at a bottom of the inner peripheral surface of the inner part 1100. Accordingly, a top of the inner peripheral surface of the inner part 1100 may be disposed to face the outer peripheral surface of the lens module 2000 and to be spaced apart from the outer peripheral surface of the lens module 2000.

In addition, the inner part 1100 of the housing 1000 may include a protrusion 1130. The protrusion 1130 may extend upward. The protrusion 1130 may prevent foreign substances from being injected into the lens module 2000 positioned inside the inner part 1100.

The outer part 1200 may be disposed outside the inner part 1100. The outer part 1200 and the inner part 1100 may be formed as separate members or integrally. The outer part 1200 of the housing 1000 may include a sidewall. The sidewall of the housing 1000 may be disposed outside the holder 5000. In addition, the coil unit may be disposed on the outer part 1200.

In addition, the sidewall of the housing 1000 may include a first housing sidewall to a fourth housing sidewall. The housing 1000 may include the first housing sidewall and the second housing sidewall disposed opposite to each other, and the third housing sidewall and the fourth housing sidewall disposed opposite to each other between the first housing sidewall and the second housing sidewall.

In addition, the outer part 1200 of the housing 1000 may include a housing hole 1210. The housing hole 1210 may have a shape corresponding to a shape of the coil unit 4000. The housing hole 1210 may have a larger area than that of the coil unit 4000. Accordingly, the housing hole 1210 may accommodate the coil unit 4000. In other words, the housing hole 1210 may be positioned on the sidewall of the housing 1000. In the embodiment, the housing hole 1210 may be formed in each of the first housing sidewall to the fourth housing sidewall of the housing 1000.

The housing hole 1210 may include an extension groove 1220 extending downward. An end of the coil unit 4000 may be disposed in the extension groove 1220.

Specifically, the sidewall of the housing 1000 may include a first groove and a second groove, which are formed to be diagonally recessed from a lower end of the housing hole 1210. In other words, the first groove and the second groove may be formed to be recessed from the housing hole 1210 toward a sidewall of the adjacent housing 1000. With this configuration, electrical connection between the wire connected to the coil unit 4000 and the substrate may be easily made.

In addition, a coupling protrusion 1230 may be positioned on the outer surface of the housing 1000 (or an outer surface of the outer part 1200). The housing 1000 may be coupled to the substrate through the coupling protrusion 1230. The coupling protrusion 1230 may be positioned to correspond to the body part 310 of the substrate (see FIG. 40). A plurality of coupling protrusions 1230 may be provided.

In addition, the outer part 1200 of the housing 1000 may include the first stepped portion 1240 and a second stepped portion 1260. The first stepped portion 1240 and the second stepped portion 1260 may be positioned at an upper portion and a lower portion of the sidewall of the housing 1000. In addition, the first stepped portion 1240 and the second stepped portion 1260 may have a structure extending outward from an outer surface of the sidewall of the housing 1000. In addition, the first stepped portion 1240 and the second stepped portion 1260 may overlap the substrate in the optical axis direction.

The first stepped portion 1240 may be disposed at a lower portion of a part of the substrate 3000. In the embodiment, the first stepped portion 1240 may be positioned at a lower portion of the body part 3100 of the substrate 3000. In addition, the terminal part 3200 and the first stepped portion 1240 may overlap in a direction perpendicular to the optical axis direction.

The second stepped portions 1260 may be positioned on the outer surface of the housing 1000 and corners of the outer surface thereof. The second stepped portion 1260 may be positioned at an upper portion of the body part 3100.

In addition, the first stepped portion 1240 and the second stepped portion 1260 may be formed in a shape corresponding to the substrate 3000. In addition, the substrate 3000 may be disposed on the outer surface of the sidewall of the housing 1000 by the first stepped portion 1240 and the second stepped portion 1260.

In addition, the first stepped portion 1240 may include a first stepped groove 1250. The first stepped groove 1250 may be formed in the first stepped portion 1240. A foreign substance prevention member may be disposed in the first stepped groove 1250. With this configuration, it is possible to prevent foreign substances from being injected into the housing 1000 from the outside. Accordingly, it is possible to improve the reliability and accuracy of the camera module according to another embodiment.

The second stepped portion 1260 may be disposed to be spaced apart from the substrate 3000 at an end thereof.

The outer part 1200 of the housing 1000 may include a damper protrusion 1270. The damper protrusion 1270 may be formed on the outer surface of the outer part 1200 of the housing 1000. The damper protrusion 1270 may be inserted into a substrate hole 3110 of the substrate 3000. The damper protrusion 1270 may include a plurality of protrusions.

The outer part 1200 of the housing 1000 may include the damper protrusion 1270 protruding inward, for example, toward the holder 5000. The damper protrusion 1270 may be positioned on an inner surface of the outer part 1200.

In addition, the damper protrusion 1270 may overlap the elastic member 7000 to be described below in a direction perpendicular to the optical axis direction. In addition, the damper protrusion 1270 may be coupled to at least a part of the elastic member 7000 by a damper liquid. With this configuration, it is possible to reduce an oscillation generated upon tilting to improve the reliability of the element and minimize the tilting of the optical member due to the oscillation.

The outer part 1200 of the housing 1000 may include a housing protrusion 1280. The housing protrusion 1280 may be inserted into a hole of a second coupling part 7200. Accordingly, the housing protrusion 1280 may be coupled to the second coupling part 7200.

The outer part 1200 of the housing 1000 may include a housing guide part 1290. The housing guide parts 1290 may be positioned at the corners of the housing 1000. The cover 9000 may be seated on the housing guide part 1290. In other words, the cover 9000 and an uppermost portion of the sidewall 5200 (e.g., an uppermost surface of the sidewall 5200) may be spaced apart from each other by the housing guide part 1290.

The housing protrusion 1280 may be disposed inside the housing guide part 1290. In other words, the housing guide part 1290 may be disposed outside the housing protrusion 1280. In addition, the housing guide part 1290 may be disposed outside the elastic member to be described below.

A bottom surface 1280a of the housing protrusion 1280 may be positioned below a bottom surface 1290a of the housing guide part 1290. In other words, the bottom surface 1280a of the housing protrusion 1280 and the bottom surface 1290a of the housing guide part 1290 may form a stepped portion.

In addition, an upper surface of the housing protrusion 1290 may be positioned below an upper surface of the housing guide part 1290. In other words, the housing guide part 1290 may be disposed to be spaced apart from a first protrusion of the holder to provide a space in which the first protrusion may be easily tilted in the housing 1000.

A guiding part GP may be disposed outside the elastic member. In addition, the guiding part GP may protrude from the housing 1000 in the optical axis direction or the third direction.

The guiding part GP may be positioned at each corner of the housing 1000. In the embodiment, the guiding part GP may be disposed at corners facing each other. In addition, the guiding part GP may be positioned between the housing guide parts 1290 facing each other. For example, the guiding part GP and the housing guide part 1290 may be disposed in different diagonal directions. With this configuration, the elastic member can minimize deformation due to a tilt, an impact, and the like by being coupled to the housing and the holder.

The guiding part GP may be formed to protrude from the bottom surface 1280a of the housing protrusion 1280 in the optical axis direction. For example, the guiding part GP may be positioned between the bottom surface 1280a of the housing protrusion 1280 and the bottom surface 1290a of the housing guide part 1290. In addition, the guiding part GP may be disposed outside the elastic member and the housing protrusion 1280.

In addition, the guiding part GP may include a shape corresponding to at least a part of an outer periphery of the second coupling part of the elastic member. In the embodiment, the second coupling part may extend in the first direction (X-axis direction) and the second direction (Y-axis direction). Correspondingly, the guiding part GP has a side surface GE2 extending in the first direction corresponding to a portion in which the second coupling part extends in the first direction, and a side surface GE1 extending in the second direction corresponding to a portion in which the second coupling part extends in the second direction. In other words, an inner surface of the guiding part GP may correspond to an outer surface of the second coupling part. In particular, the inner surface of the guiding part GP may correspond to the facing outer periphery or outer surface of the second coupling part. In other words, the inner surface of the guiding part GP may be formed along an edge of the adjacent second coupling part.

With this structure, the position movement of the elastic member is limited by the guiding part GP of the housing 1000 and deformation and the like may be blocked. In other words, the guiding part GP of the housing 1000 may prevent the deformation of the elastic member and reliably maintain the accurate movement of the holder and the like connected to the elastic member by fixing the position.

The housing 1000 may include the connection part 1300. The connection part 1300 may connect the inner part 1100 and the outer part 1200. At least a part of the connection part 1300 may overlap the holder 5000 in the optical axis direction. The connection part 1300 may be disposed on at least a part of the holder 5000.

In addition, the housing 1000 can reduce the size and reduce the number of parts through the above-described integrated structure. Furthermore, the housing 1000 may be made of a non-magnetic material.

In addition, the housing 1000 may include a first corner corresponding to a first corner portion of the holder 5000, a second corner corresponding to a second corner portion of the holder 5000, a third corner corresponding to a third corner portion of the holder 5000, and a fourth corner corresponding to a fourth corner portion of the holder 5000, which will be described below.

FIG. 40 is a perspective view of a substrate and a coil of the camera module according to another embodiment, and FIG. 41 is a view showing the coupling between coils and substrates of camera modules according to various other embodiments.

Referring to FIGS. 40 and 41, the substrate 3000 may be positioned on the outer surface of the sidewall of the housing as described above. In addition, the substrate 3000 may be disposed between the side plate of the cover and the sidewall of the housing. A part of the substrate 3000 may be positioned between the first stepped portion and the second stepped portion of the housing. The substrate 3000 may be disposed to surround outer surfaces of four sidewalls of the housing.

In addition, the substrate 3000 may be electrically connected to the coil unit 4000. The coil unit 4000 may be disposed on the inner surface of the substrate 3000. In addition, the substrate 3000 may be electrically connected to the main substrate to provide a signal to the coil unit 4000. The substrate 3000 may be fixed to the housing 1000, which is a coil case, so that the coil unit 4000 is stably fixed thereto. The position sensor 4500 configured to sense a position of the magnet unit 6000 may also be coupled to the substrate 3000.

In addition, the substrate 3000 may include an FPCB. In addition, the position sensor 4500 and the coil unit 4000 may be surface-mounted to the substrate 3000. In the embodiment, as the position sensor 4500 is coupled to the substrate 3000, it may be a structure that does not require a separate part for electrically conducting the position sensor 4500.

In addition, in the embodiment, the substrate 3000 is disposed outside the housing 1000 so that the terminal part 3200 of the substrate 3000 and the main substrate 4 may be soldered, and thus a space required for connection can be minimized.

First, the substrate 3000 may include a first portion 3010 to a fourth portion 3040. The substrate 3000 may include the first portion 3010 disposed on the first housing sidewall of the housing 1000, the second portion 3020 disposed on the second housing sidewall of the housing 1000, the third portion 3030 disposed on the third housing sidewall of the housing 1000, and the fourth portion 3040 disposed on the fourth housing sidewall of the housing 1000.

The fourth portion 3040 may connect the first portion 3010 and the second portion 3020, and the second portion 3020 may connect the third portion 3030 and the fourth portion 3040.

In addition, the first portion 3010 and the third portion 3030 may be spaced apart from each other. An end of the first portion 3010 and an end of the third portion 3030 may be positioned on a seating part formed to protrude from a corner where the first housing sidewall and the third housing sidewall of the housing 1000 meet.

In addition, lengths of the first portion 3010 to the fourth portion 3040 in the third direction may be reduced at portions coming into contact with each other. In addition, an inner surface of the contacted portion may have a curvature. Accordingly, the substrate 3000 may be easily coupled to the outer surface of the housing 1000 and stress may be reduced in an area where the substrate 3000 is bent.

More specifically, the substrate 3000 may include the body part 3100. The coil unit 4000 may be seated on the body part 3100, and the body part 3100 may be coupled to the coil unit 4000. In addition, the position sensor 4500 may be coupled to the body part 3100.

The body part 3100 may be disposed on the outer surface of the housing 1000. The body part 3100 of the substrate 3000 may include the substrate hole 3110. The coupling protrusion 1230 of the housing 1000 may pass through the substrate hole 3110. Accordingly, the substrate 3000 and the housing 1000 may be coupled to each other through the coupling protrusion 1230 and the substrate hole 3110.

In addition, the substrate 3000 may include the terminal part 3200. The terminal part 3200 may extend downward from the body part 3100 and include a plurality of terminals. In other words, the terminal part 3200 may extend from the body part 3100 toward the main substrate thereunder. In addition, the terminal part 3200 may be coupled to the main substrate by soldering. Since the terminal part 3200 is positioned at the lower portion of the substrate 3000, the terminal part 3200 may be positioned between the main substrate and the body part 3100. With this configuration, the substrate 3000 and the terminal part 3200 may be easily connected electrically. For example, the coil unit 4000 and the substrate 3000 may be easily connected electrically. In addition, it is possible to secure assembly easiness by minimizing the space for electrical connection.

In addition, the terminal part 3200 may be formed to correspond to the shape of the first stepped portion 1240. In the embodiment, the terminal part 3200 may be positioned between the first stepped portions 1240.

The substrate 3000 may include an extension 3300. The extension 3300 may extend upward from the body part 3100. The extension 3300 may be positioned at an upper end of the substrate 3000. In other words, the extension 3300 may be formed to extend from the body part 3100 toward an upper plate of the cover.

The extension 3300 may be formed to correspond to a shape of the second stepped portion 1260. The extension 3300 may be positioned between the second stepped portions 1260.

In addition, the coil unit 4000 may be positioned on the substrate 3000 and coupled to the substrate 3000. The coil unit 4000 may be coupled to the substrate 3000 through a bonding member or the like. The coil unit 4000 may be coupled to the inner surface of the substrate 3000. In addition, the coil unit 4000 may be electrically connected to the substrate 3000. In addition, the coil unit 4000 may be positioned in the housing hole of the sidewall of the housing 1000.

In addition, the coil unit 4000 may be disposed to face the magnet unit to be described below. In other words, the coil unit 4000 may be disposed to face the magnet unit. In addition, the coil unit 4000 may electromagnetically interact with the magnet unit. In the embodiment, when a current is supplied to the coil unit 4000 to form an electromagnetic field around the coil unit 4000, the magnet unit may move with respect to the coil unit 4000 by electromagnetic interaction between the coil unit 4000 and the magnet unit. The coil unit 4000 and the magnet unit 6000 may be disposed at positions opposite to each other.

In addition, the coil unit 4000 may include a pair of ends (lead-out wires) for supplying power. At this time, a first end 4010 may be drawn out to left and lower sides of the coil unit 4000, and a second end 4020 may be drawn out to right and lower sides of the coil unit 4000. The coil unit 4000 may include the first end 4010 and the second end 4020 coupled to the substrate 3000. In addition, when the first end 4010 and the second end 4020 extend only upward or downward, both ends of the coil are concentrated at a center and thus an impact is concentrated in a central area of the coil unit 4000, so that the coil unit is easily deformed or cracked and it is also difficult to manufacture the coil unit, but according to the embodiment, this problem can be solved.

As shown in FIG. 41A, the first end 4010 and the second end 4020 may be coupled to a terminal 3120 of the substrate 3000. In the embodiment, the first end 4010 and the second end 4020 may be coupled to the terminal 3120 of the substrate 3000 by soldering or Ag epoxy. Accordingly, the coil unit 4000 may be coupled to the substrate 3000.

Meanwhile, as shown in FIG. 41B, as a modified example, the first end 4010 and the second end 4020 are coupled to the terminal 3120 of the substrate 3000 through a separate coupling member 3050. The coupling member 3050 may be a coil support. The coil unit 4000 may be surface-mounted to the substrate 3000 by applying the coupling member 3050. In this case, there is an advantage in that assembly convenience increases through manual solder arrangement workability and shortening of an operation time, and there is an advantage in that a tolerance of position twist of the coil unit 4000 due to assembly decreases compared to manual soldering. In addition, a center twist between the coil unit 4000 and the magnet unit can be prevented.

The first end 4010 and the second end 4020 may be disposed in the extension groove 1220 of the housing 1000. At this time, an electrically conducting material connected to the first end 4010 and the second end 4020 and/or the above-described coupling member 3050 may also be disposed in the extension groove 1220 of the housing 1000.

The coil unit 4000 may include a plurality of coils. The coil unit 4000 may include four coils. The coil unit 4000 may include a first coil 4100 to a fourth coil 4400. A current may be applied to each of the first coil 4100 to the fourth coil 4400. The first coil 4100 to the fourth coil 4400 may be electrically separated. Alternatively, the first coil 4100 to the fourth coil 4400 may have opposite directions of the currents flowing through the coils facing each other. For example, the first coil 4100 and the third coil 4300 may be formed in a structure antiparallel to each other, and the second coil 4200 and the fourth coil 4400 may be formed in a structure antiparallel to each other.

In addition, the first coil 4100 to the fourth coil 4400 are coils facing each other and currents having different directions may be applied thereto. Accordingly, the control of diagonal tilting or horizontal tilting of the optical member may be performed.

In addition, currents may be applied to two coils facing each other among the first coil 4100, the second coil 4200, the third coil 4300, and the fourth coil 4400. Accordingly, as will be described below, the tilt control of the optical member in the horizontal direction may be performed. A detailed description thereof will be given below.

Specifically, the coil unit 4000 may include the first coil 4100 facing a first magnet 6010 (see FIG. 42), the second coil 4200 facing a second magnet 6020 (see FIG. 42), the third coil 4300 facing a third magnet 6030 (see FIG. 42), and the fourth coil 4400 facing a fourth magnet 6040 (see FIG. 42).

In addition, the first coil 4100 may be disposed on the first housing sidewall of the housing. In addition, the second coil 4200 may be disposed on the second housing sidewall of the housing. The third coil 4300 may be disposed on the third housing sidewall of the housing. In addition, the fourth coil 4400 may be disposed on the fourth housing sidewall of the housing.

In addition, in the embodiment, the four coils may be controlled by two channels. The first coil 4100 and the second coil 4200 may be electrically connected. However, a direction of the Lorentz force generated between the first coil 4100 and the first magnet 6010 and a direction of the Lorentz force generated between the second coil 4200 and the second magnet 6020 may be opposite. For example, the first coil 4100 and the second coil 4200 may be disposed so that currents flow in opposite directions. In the embodiment, the first coil 4100 and the second coil 4200 may be disposed to be wound in opposite directions. Alternatively, the first coil 4100 and the second coil 4200 may be disposed to be wound in the same direction, and a polarity arrangement of the first magnet 6010 and a polarity arrangement of the second magnet 6020 may be made in different directions. Meanwhile, the first coil 4100 and the second coil 4200 may be electrically separated and may also be integrally controlled by the control unit.

In addition, the third coil 4300 and the fourth coil 4400 may be electrically connected. However, a direction of the Lorentz force generated between the third coil 4300 and the third magnet 6030 and a direction of the Lorentz force generated between the fourth coil 4400 and the fourth magnet 6040 may be opposite. The third coil 4300 and the fourth coil 4400 may be disposed so that currents flow in opposite directions. For example, the third coil 4300 and the fourth coil 4400 may be disposed to be wound in opposite directions. Alternatively, the third coil 4300 and the fourth coil 4400 may be disposed to be wound in the same direction, and a polarity arrangement of the third magnet 6030 and a polarity arrangement of the fourth magnet 6040 may be made in different directions. Meanwhile, the third coil 4300 and the fourth coil 4400 may be electrically separated and may also be integrally controlled by the control unit.

FIG. 42 is an exploded perspective view showing the holder, the magnet, and the optical member of the camera module according to another embodiment, FIG. 43 is an exploded perspective view showing the holder, the magnet, and the optical member of the camera module according to another embodiment, FIG. 44 is a perspective view from another angle in FIG. 43, FIG. 45 is a top view of the holder, the magnet, and the optical member of the camera module according to another embodiment, FIG. 46 is a view for describing a Lorentz force between the magnet and the coil in the embodiment, and FIG. 47 is a view for describing the diagonal tilting control of the optical member in the embodiment.

Referring to FIGS. 42 to 47, the holder 5000 may be coupled to the magnet unit 6000 and the optical member 8000.

First, the holder 5000 may include the holder hole 5110 as described above. In addition, the lens module may be seated in the holder hole 5110. A groove portion 5110a extending outward may be added to the holder hole 5110. It is possible to minimize an assembly tolerance while assembling by the groove portion 5110a.

In addition, the holder 5000 may include a sidewall groove 5220, and the magnet unit 6000 may be disposed in the sidewall groove 5220. In addition, the optical member 8000 may be disposed under the holder 5000. The holder 5000 may move integrally with the optical member 8000. For example, when the holder 5000 is tilted, the optical member 8000 coupled to the holder 5000 may also be tilted. In addition, when the holder 5000 is tilted, the magnet unit 6000 coupled to the holder 5000 may also be tilted. The holder 5000 may be a case in which the optical member 8000 and the magnet unit 6000 are assembled.

The holder 5000 may use a non-magnetic material in order to minimize the influence of a magnetic force with the magnet unit 6000. The holder 5000 may be spaced apart from the housing 1000 in the housing 1000. In addition, the holder 5000 may be connected to the elastic member 7000. The holder 5000 may be tilted by being coupled to the elastic member 7000 and the optical member 8000 in a first diagonal direction. Since the holder 5000 is a portion that is actually driven, a weight (size) needs to be minimized.

The holder 5000 may include a first side surface, a second side surface disposed opposite to the first side surface, and third and fourth side surfaces disposed opposite to each other between the first side surface and the second side surface. The holder 5000 may include the first corner portion between the first side surface and the third side surface, the second corner portion between the second side surface and the third side surface, the third corner portion between the second side surface and the fourth side surface, and the fourth corner portion between the fourth side surface and the first side surface. The diagonal direction may be a direction from the first corner portion toward the third corner portion or a direction from the third corner portion toward the first corner portion. In addition, the diagonal direction may be a direction from the second corner portion toward the fourth corner portion or a direction from the fourth corner portion toward the second corner portion.

The holder 5000 may include the base 5100, the sidewall 5200, and the second protrusion 5300.

The base 5100 may be positioned in the housing. The optical member 8000 may be positioned under the base 5100. In the embodiment, the base 5100 may include a base groove 5120 formed in a lower surface. The optical member 8000 may be disposed in the base groove 5120. The base groove 5120 may be formed in a shape corresponding to the optical member 8000. At least a part of the optical member 8000 may be accommodated in the base groove 5120. In addition, the optical member 8000 in the base groove 5120 may be coupled to the base 5100 by an adhesive member.

In order to improve a coupling force between the base 5100 and the optical member 8000 by the adhesive member, coupling grooves 5120a to 5120d may be positioned at corners of the lower portion of the base 5100.

In the embodiment, the base groove 5120 may include a first coupling groove 5120a, a second coupling groove 5120b, a third coupling groove 5120c, and a fourth coupling groove 5120d. The first coupling groove 5120a may be positioned between a first edge surface M1 and a fourth edge surface M4. In addition, the second coupling groove 5120b may be positioned between a second edge surface M2 and a third edge surface M3. In addition, the third coupling groove 5120c may be positioned between the second edge surface M2 and the fourth edge surface M4. In addition, the fourth coupling groove 5120d may be positioned between the first edge surface M1 and the third edge surface M3. The first edge surface M1 to the fourth edge surface M4 may be each side surface of the base 5100 formed by the base groove 5120.

A bonding member may be injected into the first coupling groove 5120a, the second coupling groove 5120b, the third coupling groove 5120c, and the fourth coupling groove 5120d. In the embodiment, after the optical member 8000 is seated in the base groove 5120, the bonding member may be injected into the first coupling groove 5120a, the second coupling groove 5120b, the third coupling groove 5120c, and the fourth coupling groove 5120d. At this time, the bonding member may spread to a bottom surface of the base groove 5120 through a capillary phenomenon. In other words, the bonding member may be positioned between one surface of the optical member 8000 and the bottom surface of the base groove 5120.

In addition, the optical member 8000 may be disposed to be spaced apart from the base groove 5120 by a first separation distance in the third direction or the first and second directions. The first separation distance may be 20 μm to 100 μm. There is a problem in that when the separation distance is smaller than 20 μm, the coupling force between the optical member and the holder may be decreased, and when the separation distance is greater than 100 μm, it is difficult to easily perform the capillary phenomenon by the bonding member and the size of the holder increases.

In addition, the base 5100 may include the base hole, and the base hole may be hollow. The base hole may be formed to pass through the base 5100 in the optical axis direction.

The sidewall 5200 may extend upward from the base 5100. The sidewall 5200 may be positioned on an upper surface of the base 5100 and may be disposed along an edge of the base 5100. The magnet unit 6000 may be fixed to the sidewall 5200.

The sidewall 5200 may include a first protrusion 5210. The first protrusion 5210 may be positioned at an upper portion of the sidewall 5200. The first protrusion 5210 may be coupled to the elastic member. More specifically, the first protrusion 5210 may be coupled to a first coupling part 7100. In addition, the first protrusion 5210 and the housing may be coupled to each other through the elastic member.

The sidewall 5200 or the first protrusion 5210 may include a protrusion 5210a and a guide protrusion 5210b. The protrusion 5210a may be positioned on an upper surface of the first protrusion 5210 and may protrude upward. The protrusion 5210a may be coupled to the first coupling part 7100. The protrusion 5210a may be inserted into a hole of the first coupling part 7100. In the embodiment, the protrusion 5210a may be positioned to correspond to the first protrusion 5210. The first protrusion 5210 may protrude upward in a diagonal direction. In addition, corresponding to this configuration, the protrusion 5210a may include a first protrusion 5210a-1 and a second protrusion 5210a-2. At this time, the first protrusion 5210a-1 and the second protrusion 5210a-2 may be disposed in the diagonal direction. For example, the first protrusion 5210a-1 and the second protrusion 5210a-2 may be disposed at corner portions facing each other, and may be disposed symmetrically in the optical axis direction.

The guide protrusion 5210b may be positioned outside the protrusion 5210a. In the embodiment, the guide protrusion 5210b is disposed on the first protrusion 5210 and thus may be positioned in the diagonal direction. In addition, the protrusion 5210a disposed in the diagonal direction may be positioned between the guide protrusions 5210b disposed in the diagonal direction. Accordingly, the elastic member 7000 to be described below may be guided by the guide protrusion 5210b while being coupled to the protrusion 5210a. The guide protrusion 5210b may guide the elastic member 7000 to be seated on the first protrusion 5210 of the holder 5000, and prevent deformation of the elastic member 7000 even when an impact occurs due to tilt or the like.

A thickness of the guide protrusion 5210b may have a ratio of 1:1 to 1:2 with a thickness of the elastic member 7000. There is a problem in that when the ratio of the thickness is smaller than 1:1, there is a limit in which the deformation of the elastic member due to the impact occurs, and when the ratio of the thickness is greater than 1:2, a range in which the optical member is tilted is limited and a separation occurs. Here, the thickness refers to a length in the third direction.

The guide protrusion 5210b may include a shape corresponding to at least a part of an outer periphery of the first coupling part 7100 disposed at the corner of the elastic member 7000.

The guide protrusion 5210b may include a first guide protrusion 5210b-1 and a second guide protrusion 5210b-2. The first guide protrusion 5210b-1 and the second guide protrusion 5210b-2 may be disposed to face each other. For example, the first guide protrusion 5210b-1 and the second guide protrusion 5210b-2 may have inner surfaces corresponding to at least a part of the outer periphery of the first coupling part. Accordingly, the inner surfaces of the first guide protrusion 5210b-1 and the second guide protrusion 5210b-2 may be positioned to correspond to an outer surface of the first coupling part. In the embodiment, the inner surfaces of the first guide protrusion 5210b-1 and the second guide protrusion 5210b-2 may be positioned to face the outer surface of the first coupling part.

For example, the first coupling part may have the outer surface extending in the first direction or the second direction. Corresponding to the outer surface of the first coupling part, the guide protrusion 5210b may have the inner surface extending in the first direction or the second direction corresponding to the outer surface of the first coupling part. At this time, the first guide protrusion 5210b-1 and the second guide protrusion 5210b-2 may include at least one of the inner surface extending in the first direction or the inner surface extending in the second direction. In addition, the first guide protrusion 5210b-1 and the second guide protrusion 5210b-2 may be positioned outside the elastic member. With this configuration, the guide protrusion 5210b may maintain the coupling force between the elastic member and the protrusion 5210a and easily prevent the movement deformation of the elastic member.

The sidewall 5200 may include the sidewall groove 5220. The sidewall groove 5220 may be positioned on an outer surface of the sidewall 5200. The sidewall groove 5220 may be positioned to correspond to the housing grooves of the first housing sidewall to the fourth housing sidewall of the housing. The magnet unit 6000 may be seated in the sidewall groove 5220. The sidewall groove 5220 may be a recess.

In other words, the sidewall groove 5220 may support the magnet unit 6000. The magnet unit 6000 may be bonded to the sidewall groove 5220 by an adhesive member. Accordingly, the sidewall groove 5220 may fix the magnet unit 6000.

In addition, an adhesive groove 5230 may be disposed in an upper end and/or a lower end of the sidewall 5200. In addition, the bonding member may be disposed in the adhesive groove 5230. In the embodiment, the magnet unit 6000 may be seated in the sidewall groove 5220, and the bonding member may be injected through the adhesive groove 5230 for fixing between the holder 5000 and the magnet unit 6000. The bonding member may be injected between the magnet unit 6000 and the sidewall groove 5220 by the capillary phenomenon along the adhesive groove 5230. Accordingly, the bonding member may improve the coupling force between the housing and the substrate. In this case, the magnet unit 6000 and the sidewall groove 5220 may have a second separation distance d11. The second separation distance d11 may be 20 μm to 100 μm. There is a problem in that when the second separation distance is smaller than 20 μm, the coupling force between the holder and the magnet may be reduced, and when the second separation distance is greater than 100 μm, it is difficult to easily perform the capillary phenomenon by the bonding member and the size of the holder increases.

In addition, the bonding member may fix the magnet unit 6000 to the sidewall groove 5220 by ultraviolet (UV) curing, thermal curing, or the like.

In addition, the stepped structure or hole in each component of the camera module as well as the holder 5000 facilitates the coupling between the components as an alignment mark, and finally minimizes a weight of the camera module by minimizing volumes of the components.

In the embodiment, an assembly groove 5200k may be positioned on the upper surface of the sidewall 5200. When the housing 1000 and the holder 5000 are coupled, a coupling position may be easily identified through the assembly groove 5200k. Accordingly, assembly may be easily performed.

The second protrusion 5300 may protrude downward from the base 5100. In this specification, an upward or a top may refer to one direction in the optical axis direction or the third direction, and a downward or a bottom may refer to a direction opposite to the one direction in the optical axis direction or the third direction. Correspondingly, the upper portion may refer to an area in one direction in the optical axis direction or the third direction, and the lower portion may refer to an area in a direction opposite to the one direction in the optical axis direction or the third direction.

The optical axis direction or the second protrusion 5300 may be positioned at the corner of the base 5100. The second protrusion 5300 may limit a tilt range when the optical member 8000 and the holder 5000 are tilted in the diagonal direction. In addition, the second protrusion 5300 may be prevented from being transmitted directly to the optical member 8000, the magnet unit 6000, or the like upon tilting. With this configuration, the second protrusion 5300 may improve the reliability of the camera module.

The magnet unit 6000 may be disposed in the holder 5000. The magnet unit 6000 may be disposed on the sidewall 5200 of the holder 5000. The magnet unit 6000 may be disposed on an outer peripheral surface of the holder 5000. The magnet unit 6000 may protrude from the outer surface of the holder 5000. The magnet unit 6000 may be disposed to face the coil unit in the above-described housing hole. In addition, the magnet unit 6000 may electromagnetically interact with the coil unit 4000.

In addition, the magnet unit 6000 may be a flat magnet having a flat plate shape. The present invention is not limited thereto, and the magnet unit 6000 may be disposed at the corner between the sidewalls 5200. At this time, the magnet unit 6000 may be a corner magnet having a hexahedral shape in which an inner side surface is wider than an outer side surface.

The magnet unit 6000 may include a plurality of magnets. The magnet unit 6000 may include four magnets. The magnet unit 6000 may include the first magnet 6010 to the fourth magnet 6040. The magnet unit 6000 may include the first magnet 6010, the second magnet 6020 disposed opposite to the first magnet 6010, the third magnet 6030, and the fourth magnet 6040 disposed opposite to the third magnet 6030.

In addition, the first magnet 6010 may be disposed on the first side surface of the holder 5000, the second magnet 6020 may be disposed on the second side surface of the holder 5000, the third magnet 6030 may be disposed on the third side surface of the holder 5000, and the fourth magnet 6040 may be disposed on the fourth side surface of the holder 5000.

In the embodiment, the optical member 8000 (or the holder 5000) may be tilted by a Lorentz force acting on the magnet unit 6000 and the coil unit 4000 through which current flows. In order to generate the Lorentz force, an actuator may be largely divided into a magnet unit and a coil unit. When the Lorentz force is generated, a portion that is actually operated may be the magnet unit 6000. However, as a modified example, the coil unit 4000 may be moved by the Lorentz force. In order to drive the magnet unit 600 in the vertical direction, the magnet unit 6000 may be magnetized to both poles as shown in FIG. 46B. In other words, the magnet unit 6000 may be in a form in which two magnets having both poles are stacked.

In addition, as shown in FIG. 46C, a current generating a Lorentz force may flow through the coil unit 4000 in one direction (a in FIG. 46C). In addition, the current may flow through the coil unit 4000 in a forward direction. Meanwhile, the current may flow through the coil unit 4000 in the other direction opposite to the one direction a. In other words, the current may flow through the coil unit 4000 in a reverse direction. In addition, a driving direction may act upward (c in FIG. 47A) according to the Lorentz force by disposing an N pole in an outer area (S pole in an inner area) on the upper portion of the magnet unit 6000 and an S pole in an outer area (N pole in the inner area) on the lower portion thereof and allowing the current to flow in one direction.

According to the above-described contents, the optical member 8000 may be disposed to be tilted in the diagonal direction of the optical member 8000 by applying a forward current to two adjacent coils among the first coil 4100 to the fourth coil 4400 and applying a reverse current to the other two coils. In the embodiment, the optical member 8000 may be tilted in the diagonal direction by controlling the current applied to the first coil 4100 and the third coil 4300. The optical member 8000 may be disposed to be tilted in the diagonal direction of the optical member 8000 by applying the current to the two adjacent coils among the first coil 4100 to the fourth coil 4400. The optical member 8000 may include a first edge disposed at a position corresponding to the first corner portion of the holder 5000. At this time, the first edge of the optical member 8000 may be tilted in an upward direction of the optical axis by the first coil 4100 and the third coil 4300. The optical member 8000 may include a third edge disposed at a position corresponding to the third corner portion of the holder 5000. At this time, the third edge of the optical member 8000 may be tilted in a downward direction of the optical axis by the second coil 4200 and the fourth coil 4400, and the first edge of the optical member 8000 may be further tilted in the upward direction of the optical axis by the second coil 4200 and the fourth coil 4400.

In the embodiment, a tilting driving principle of the camera module is as follows. The drive units at four places using the Lorentz force may be applied to the camera module. As shown in FIG. 47, when the Lorentz force is generated in a "positive (+) direction" at a first drive unit including the first coil 4100 and the first magnet 6010 and a third drive unit including the third coil 4300 and the third magnet 6030, and the Lorentz force is generated in a "negative (−) direction" at a second drive unit including the second coil 4200 and the second magnet 6020 and a fourth drive unit including the fourth coil 4400 and the fourth magnet 6040, an upper left diagonal may be tilted upward (a1 in FIG. 47), and conversely, a lower right diagonal may be tilted downward (a2 in FIG. 47). Thereafter, the Lorentz force may be generated in the "positive (+) direction" at the second drive unit including the second coil 4200 and the second magnet 6020 and the third drive unit including the third coil 4300 and the third magnet 6030, and the Lorentz force may be generated in the "negative (−) direction" at the first drive unit including the first coil 4100 and the first magnet 6010 and the fourth drive unit including the fourth coil 4400 and the fourth magnet 6040. In this case, the upper right diagonal may be tilted upward (a3 in FIG. 47), and conversely, the lower left diagonal may be tilted downward (a4 in FIG. 47).

Then, the Lorentz force may be generated in the "negative (−) direction" at the first drive unit including the first coil 4100 and the first magnet 6010 and the third drive unit including the third coil 4300 and the third magnet 6030, and the Lorentz force may be generated in the "positive (+) direction" at the second drive unit including the second coil 4200 and the second magnet 6020 and the fourth drive unit including the fourth coil 4400 and the fourth magnet 6040. In this case, the lower right diagonal may be tilted upward (a5 in FIG. 47), and conversely, the upper left diagonal may be tilted downward (a6 in FIG. 47).

Then, the Lorentz force may be generated in the "negative (−) direction" at the second drive unit including the second coil 4200 and the second magnet 6020 and the third drive unit including the third coil 4300 and the third magnet 6030, and the Lorentz force may be generated in the "positive (+) direction" at the first drive unit including the first coil 4100 and the first magnet 6010 and the fourth drive unit including the fourth coil 4400 and the fourth magnet 6040. In this case, the lower left diagonal may be tilted upward (a7 in FIG. 47), and conversely, the upper right diagonal may be tilted downward (a8 in FIG. 47). The positive direction used above may be upward, and the negative direction may be downward. In this embodiment, the tilting driving may be sequentially performed in four directions (upper left, upper right, lower right, and lower left).

In this embodiment, it is possible to control the force of the drive unit by applying the drive units at four places, which is advantageous for a precise control. Meanwhile, the tilting may be performed symmetrically up and down, thereby shortening a tilting distance.

The elastic member 7000 may be connected to the housing 1000. The elastic member 7000 may connect the holder 5000 and the housing 1000. The elastic member 7000 may have elasticity. Alternatively, the elastic member 7000 may include a portion having elasticity. In the embodiment, the elastic member 7000 may include a leaf spring. The elastic member 7000 may be made of a metallic material.

The elastic member 7000 may be assembled to the housing protrusion 1280 of the housing 1000 and the protrusion 5210a of the first protrusion 5210 of the holder 5000 and then fixed by bonding. In this embodiment, since the assembly and fixing portions of the elastic member 7000 are positioned at the outside, a relatively easy assembly structure can be secured. In this embodiment, the elastic member 7000 may have a structure that can have the up and down degrees of freedom in a spring position. The elastic member 7000 may be positioned only at the top, positioned at both the top and the bottom, and positioned only at the bottom according to each embodiment.

The elastic member 7000 may include the first coupling part 7100 and the second coupling part 7200.

The first coupling part 7100 may be coupled to the corner of the holder 5000. Two first coupling parts 7100 may be provided. The first coupling parts 7100 may be disposed to be symmetrical to the optical axis in the first diagonal direction of the optical member 8000. The two first coupling parts may be disposed opposite to each other with respect to the optical axis. The first coupling part 7100 may be coupled to each of the first corner portion of the holder 5000 and the third corner portion of the holder 5000.

The second coupling part 7200 may be coupled to the corner of the housing 1000 corresponding to another corner portion of the holder 5000 adjacent to the corner portion of the holder 5000 to which the first coupling part 7100 is coupled.

In addition, the second coupling part 7200 may be coupled to the housing protrusion 1280 of the housing 1000. In the embodiment, two second coupling parts 7200 may be provided.

The second coupling parts 7200 may be disposed to be symmetrical to the optical axis in a second diagonal direction different from the first diagonal direction of the optical member 8000. The second coupling parts 7200 may be disposed opposite to each other with respect to the optical axis. The second coupling part 7200 may be coupled to each of the second corner of the housing 1000 and the fourth corner of the housing 1000.

The protrusion 5200a of the holder 5000 and the housing protrusion 1280 of the housing 1000 may be disposed to overlap at least partially in the first direction (X-axis direction) or in the second direction (Y-axis direction). In the embodiment, a center of the protrusion 5200a and a center of the housing protrusion 1280 may be displaced in the first direction (X-axis direction) or in the second direction (Y-axis direction). Accordingly, the center of the protrusion 5200a and the center of the housing protrusion 1280 may not overlap in the first direction (X-axis direction) or in the second direction (Y-axis direction). Accordingly, even when the holder 5000 is seated inside the housing 1000, it is possible to easily block an impact and an oscillation with the coupling force between the housing 1000 and the holder 5000. As described above, the holder 5000 and the housing 1000 may be connected and fixed to each other through the elastic member 7000.

The elastic member 7000 may include an elastic connection part 7300. The elastic connection part 7300 may connect the first coupling part 7100 and the second coupling part 7200. The elastic connection part 7300 may elastically connect the first coupling part 7100 and the second coupling part 7200. The elastic connection part 7300 may have elasticity. The elastic connection part 7300 may include a bent portion 7310. The bent portion 7310 may be a portion that is not formed by being folded but formed in a zigzag shape. The elastic connection part 7300 may include a bending portion or a rounded portion. A plurality of bent portions 7310 may be continuously formed in a longitudinal direction of the elastic connection part 7300.

The elastic member 7000 may be coupled to the housing 1000 and the holder 5000 at the upper portion of the housing 1000 and the upper portion of the holder 5000.

In addition, the elastic member 7000 may be formed in various shapes to find an optimal shape and a stiffness.

In the embodiment, the bent portion 7310 of the elastic connection part 7300 may be formed to be flat in an area (e.g., a facing area 0) corresponding to the damper protrusion 1270 of the housing 1000. In addition, the damper protrusion 1270 may be coupled to the adjacent elastic connection part 7300 through a damper member dp. Accordingly, the elastic member 7000 may also oscillate due to the tilting of the holder 5000, the optical member 8000, or the like. At this time, the damper member dp can improve the reliability of the element by easily reducing the oscillation of the elastic member 7000. The damper member dp may be made of a material that is cured by ultraviolet rays or heat.

In addition, the elastic connection part 7300 may be formed to be rounded at a point where it meets the first coupling part 7100 and the second coupling part 7200.

In a modified example, as shown in FIG. 50, the elastic connection part 7300 may include the plurality of bent portions 7310. The elastic connection part 7300 may include an elastic protrusion 7320. In addition, a plurality of damper protrusions 1270-1 and 1270-2 of the housing 1000 may be provided. At this time, the damper protrusions 1270-1 and 1270-2 may at least partially overlap the elastic protrusion 7320 in the first direction (X-axis direction) or in the second direction (Y-axis direction). In addition, the elastic protrusion 7320 and the damper protrusions 1270-1 and 1270-2 may be coupled to each other by the damper member dp. The damper protrusions 1270-1 and 1270-2 may prevent the damper member dp from flowing to areas other than the damper protrusions 1270-1 and 1270-2. In addition, it is possible to minimize the influence of the damper member dp on the stiffness of the elastic member 7000.

In addition, the elastic member 7000 may have different diagonal directions connected to the holder or the housing according to the arrangement position, such as the lower portion or the upper portion of the holder 5000. Accordingly, it is possible to prevent the tilting of the holder 5000 in the initial state and perform the diagonal direction control with the same current.

In addition, in the embodiment, the elastic member 7000 may disperse stress in the first direction (X-axis direction), in the second direction (Y-axis direction), and in the third direction (Z-axis direction) so as not to cause the deformation due to the stress from an external impact. For example, the elastic member 7000 may have a safety factor of 2 or higher in the first direction (X-axis direction), the second direction (Y-axis direction), and the third direction (Z-axis direction).

In addition, the elastic connection part 7300 may be positioned on each of the first side surface, second side surface, third side surface, and fourth side of the holder 5000, and the elastic connection parts 7300 are disposed symmetrically. In other words, the elastic connection part 7300 of the elastic member 7000 may have the same shape when moving by 90 degrees clockwise or counterclockwise. Accordingly, the holder 5000 may be tilted (e.g., diagonally tilted) symmetrically.

Additionally, each of the first coupling part 7100 and the second coupling part 7200 has first and second coupling holes for coupling with the protrusion 5210a and the housing protrusion 1280, and each of the first and second coupling holes may further include a coupling groove formed to extend toward the adjacent elastic connection part 7300. The coupling grooves may absorb an external impact, thereby minimizing the deformation of the elastic member 7000 due to the external impact.

In the embodiment, the stiffness of the elastic member 7000 may range from 53 mN/mm to 80 mN/mm. At this time, the stiffness of the elastic member 7000 may be the stiffness of the elastic connection part 7300 of the elastic member 7000. When the stiffness of the elastic member 7000 is smaller than 53 mN/mm, a problem occurs that a tilting angle is greater than a target tilting angle even when a current level is reduced and 80 mN/mm may be the greatest value in a limited space of this embodiment when referring to a measured value in an analysis stage.

In addition, in this embodiment, a level of the current applied to the coil unit 4000 may range from 18 mA to 22 mA. There is a problem in that the tilting angle is small when the stiffness of the elastic member 7000 is 53 mN/mm in the analysis stage test when the current applied to the coil unit 4000 is smaller than 18 mA, and there is a limit in that an amount of consumed current is large and heat is generated from the coil when the current exceeds 22 mA.

In addition, the housing 1000 may include a stopper configured to limit a range in which the holder 5000 is tilted in the first direction (X-axis direction) or the second direction (Y-axis direction). The stopper may be positioned on the inner surfaces of the first housing sidewall to the fourth housing sidewall. In addition, the stopper may protrude inward.

In the embodiment, the stopper may include a first stopper ST1 and a second stopper ST2. In addition, the first stopper ST1 and the second stopper ST2 may be positioned on the inner surface of the outer part 1200 of the housing 1000.

The first stopper ST1 may be positioned on the second housing sidewall or the fourth housing sidewall. In addition, the second stopper ST2 may be positioned on the first housing sidewall or the fourth housing sidewall. With this configuration, the first stopper ST1 may limit a range in which the holder 5000 rotates in the second direction (Y-axis direction). In addition, the second stopper ST2 may limit a range in which the holder 5000 rotates in the first direction (X-axis direction). Accordingly, it is possible to prevent the occurrence of the deformation of the elastic member 7000 by minimizing the stress applied to the elastic member 7000 according to the separation distance between the housing 1000 and the holder 5000.

In addition, the stopper may further include a third stopper ST3. The third stopper ST3 may be positioned on an upper surface of the connection part 1300. In addition, the third stopper ST3 may be formed to protrude upward. Accordingly, the third stopper ST3 may limit a range in which the holder 5000 rotates in the third direction (Z-axis direction). Accordingly, it is possible to prevent the occurrence of the deformation of the elastic member 7000 by minimizing the stress applied to the elastic member 7000 according to the separation distance between the housing 1000 and the holder 5000.

As an additional modified example, the camera module may have an elastic member disposed on the lower portion. Hereinafter, a lower elastic member will be described. The lower elastic member may be coupled to a lower portion of the housing 1000 and a lower portion of the holder 5000. The lower elastic member may include a first coupling area coupled to the lower portion of the holder 5000, a second coupling area coupled to the lower portion of the housing 1000, and a connection area connecting the first coupling area and the second coupling area.

The first coupling area of the lower elastic member may be coupled to another corner of the holder 5000 (a corner different from the corner connected between an upper elastic member and the holder). The first coupling area of the lower elastic member may also be coupled to the second protrusion of the holder 5000.

For example, in the embodiment, the upper elastic member and the lower elastic member may be coupled in different diagonal directions. In other words, a diagonal direction connecting a portion to which the upper elastic member is coupled and a diagonal direction connecting a portion to which the lower elastic member is coupled may be different. Accordingly, the tilting of the holder 5000 in the initial state can be prevented and all controls of four diagonal directions may be performed with the same current.

FIG. 51 is a perspective view of the camera module according to another embodiment, FIG. 52 is a cross-sectional view taken along line E-E' in FIG. 51, FIG. 53 is a cross-sectional view taken along line F-F' in FIG. 51, and FIG. 54 is a cross-sectional view taken along line G-G' in FIG. 51.

Referring to FIGS. 51 to 54, as described above, the first protrusion 5210 may be positioned in the holder 5000 in the first diagonal direction, and may not be positioned in the second diagonal direction. In the embodiment, the sidewall 5200 of the holder 5000 may have a different length in the third direction at each corner. In other words, in the sidewall of the holder 5000, lengths at the first corner portion and the third corner portion may be greater than lengths at the second corner portion and the fourth corner portion. The first protrusion 5210 may be positioned in the first diagonal direction, for example, only at the first corner portion and the third corner portion.

In addition, the first protrusion 5210 may be disposed to be spaced apart from the upper surface of the housing 1000 by a first distance d1 in the third direction. For example, when the protrusion 5210a is disposed on the first protrusion 5210, an upper surface of the protrusion 5210a and an uppermost surface of the housing 1000 may be disposed to be spaced apart from each other by the first distance d10.

In addition, since the first protrusion 5210 is disposed to be spaced apart from the upper surface of the housing 1000 by the first distance d1 in the third direction, the holder 5000 may be easily tilted in the diagonal direction in the space by the first distance d10.

The holder 5000 may rotate at a first angle θ1 in the first diagonal direction. Since the first angle θ1 includes both positive/negative (+/−0), STEP1 and STEP3 (or STEP2 and STEP4) may be performed as will be described below.

In addition, the holder 5000 may rotate at a second angle θ2 in the second diagonal direction. Since the second angle θ2 includes both positive/negative (+/−0), STEP2 and STEP4 (or STEP1 and STEP3) may be performed as will be described below.

The first distance d1 may be determined by Equation 3 below.

$$L*\tan(0.75*\theta) \leq \text{first distance} \leq L*\tan(1.25*\theta) \quad \text{[Equation 3]}$$

(where L refers to a maximum length of the base, and θ refers to a maximum tilting angle of the holder in the diagonal direction)

θ may also correspond to the tilting angle of the holder required to perform STEP1 to STEP4 to be described below in order to obtain an SR image.

There is a problem in that when the first distance is smaller than $L*\tan(0.75*\theta)$, interference between the holder and the housing occurs when the holder is tilted, thereby reducing the reliability of the element. For example, the elastic member may be damaged by an overshoot by the elastic member.

In addition, there is a limit in that when the first distance is greater than $L*\tan(1.25*\theta)$, the overall height of the camera module increases due to an increase in the size of the housing.

FIG. 55 is a view for describing a tilt unit according to another embodiment.

As shown in FIG. 55, the camera module may include the control unit CLO that may three-dimensionally tilt the optical member (or the filter, hereinafter described as tilting of the filter) or the lens module. As described above, the control unit CLO may tilt the filter so that the light path of the input light signal passing through the filter moves repeatedly according to a predetermined rule. The control unit CLO may correspond to or include the above-described control unit CLO.

In addition, the predetermined rule may include a first tilt sequence to a fourth tilt sequence. The first tilt sequence to the fourth tilt sequence may allow the light paths of the input light signals passing through the filter to be disposed at different positions. The first to fourth tilt sequences may allow the light paths of the input light signals passing through the filter to move in different diagonal directions.

The control unit CLO may tilt the filter so that the light path of the input light signal passing through the filter moves toward an upper left end of the sensor according to the first tilt sequence. The control unit CLO may tilt the filter so that the light path of the input light signal passing through the filter moves toward an upper right end of the sensor according to the second tilt sequence. The control unit CLO may tilt the filter so that the light path of the input light signal passing through the filter moves toward a lower right end of the sensor according to the third tilt sequence. The control unit CLO may tilt the filter so that the light path of the input light signal passing through the filter moves toward a lower left end of the sensor according to the fourth tilt sequence.

According to the first tilt sequence, the control unit CLO may tilt the filter so that a line segment formed by an upper left vertex and center of the filter forms a positive tilting angle with a reference face that is a face of an IR filter before tilting and a line segment formed by a lower right vertex and center of the filter forms a negative tilting angle with the reference face. According to the second tilt sequence, the control unit CLO may tilt the filter so that a line segment formed by an upper right vertex and center of the filter forms a positive tilting angle with the reference face that is the face of the filter before tilting and a line segment formed by a lower left vertex and center of the filter forms a negative tilting angle with the reference face. According to the third tilt sequence, the control unit CLO may tilt the filter so that the line segment formed by the lower right vertex and center of the filter forms the positive tilting angle with the reference face that is the face of the filter before tilting and the line segment formed by the upper left vertex and center of the filter forms the negative tilting angle with the reference face. According to the fourth tilt sequence, the control unit CLO may tilt the filter so that the line segment formed by the lower left vertex and center of the filter forms the positive tilting angle with the reference face that is the face of the filter before tilting and the line segment formed by the upper right vertex and center of the filter forms the negative tilting angle with the reference face.

The control unit CLO may tilt the filter so that any one of combinations in which the first to fourth tilt sequences are sequentially performed is repeated. For example, the control unit CLO may tilt the filter by repeating a predetermined rule having an order of [first tilt sequence→second tilt sequence→third tilt sequence→fourth tilt sequence]. As another example, the control unit CLO may tilt the filter by repeating a predetermined rule having an order of [second tilt sequence→third tilt sequence→fourth tilt sequence→first tilt sequence]. As still another example, the control unit CLO may tilt the filter by repeating a predetermined rule having an order of [first tilt sequence→third tilt sequence→second tilt sequence→fourth tilt sequence].

In order to implement the above function, the control unit CLO may include a tilt controller TC and a tilt driver TD. In some cases, the control unit CLO may include a tilt actuator TA, but will be described as a separate component hereinafter. In addition, the tilt actuator TA may be included in the light receiving unit 2, and driven by the above-described coil unit and magnet unit. A detailed description thereof will be given below.

First, the tilt controller TC may generate a control signal for controlling the driving of the tilt driver TD. The tilt controller TC may be a micro controller unit (MCU) capable of generating a control signal, but is not limited thereto. The tilt controller TC may input the generated control signal to the tilt driver TD. The tilt controller TC may transmit and receive the control signal to and from the tilt driver TD through an Inter-Integrated Circuit (I2C) communication method. For example, in the I2C communication, the tilt controller TC may be a device in a master mode, and the tilt driver TD may be a device in a slave mode. The tilt controller TC in the master mode may transmit the control signal to the tilt driver TD in the slave mode. To this end, the tilt controller TC may be connected to each of a serial clock (SCL) communication line and a serial data (SDA) communication line. For example, the tilt controller TC communicates with the tilt driver TD through the I2C method but is not limited thereto.

The tilt controller TC may control on/off of the tilt driver TD through the control signal. In other words, the control signal may include information that may control an operation start and an operation stop of the tilt driver TD. The tilt controller TC may control a voltage level of an output signal of the tilt driver TD through the control signal. In other words, the control signal may include information that may control a magnitude of the voltage of the output signal of the tilt driver TD. The tilt controller TC may control a delay time through the control signal. In other words, the control signal may include control information on the delay time. Here, the delay time may refer to an interval between a time point at which a specific waveform of a trigger signal is generated and a time point at which a specific waveform of the output signal is generated. The tilt controller TC may control a frame time through the control signal. In other words, the control signal may include control information on the frame time. Here, the frame time may refer to a time it takes for the camera apparatus to generate one image frame, and may be a period in which the specific waveform is generated in the trigger signal.

Meanwhile, the tilt controller TC may be disposed outside the camera module as shown in FIG. 55A. For example, when the camera module is installed in a mobile terminal, the tilt controller TC may be disposed in the mobile terminal. In this case, the control unit CLO included in the camera module may be configured to include the tilt driver TD. In another embodiment, the tilt controller TC may be included in the control unit CLO as shown in FIG. 55B. For example, the tilt controller TC may be disposed in one space of the camera module. In this case, the control unit CLO included in the camera module may include the tilt driver TD and the tilt controller TC.

The tilt driver TD may generate an output signal synchronized with the integration time of the above-described sensor based on the trigger signal received from the sensor (e.g., the image sensor).

The tilt driver TD may receive a voltage from the camera module. In the embodiment, the tilt driver TD may receive a first voltage and a second voltage branched from the voltage supplied from the camera module. The control unit CLO may further include an inductor as a branching element in order to branch the voltage input from the power source of the camera module into the first voltage and the second voltage. Each of the branched first voltage and second voltage may be input to the tilt driver TD. The first voltage may be a voltage used to drive the tilting tilt driver TD, and the second voltage may be a voltage used to drive the tilt actuator TA. The first voltage and the second voltage may have the same voltage magnitude, and may be a DC voltage of 3.3 [V], but are not limited thereto. The tilt driver TD may include a first power input terminal configured to receive the first voltage and a second power input terminal configured to receive the second voltage.

The tilt driver TD may receive the trigger signal. The trigger signal may be output from the sensor, that is, the image sensor. The trigger signal may be a square wave signal having a certain period. The tilt driver TD may use the trigger signal to synchronize a driving period of the tilt actuator TA and a driving period of the sensor. The tilt driver TD may include a terminal configured to receive the trigger signal.

The tilt driver TD may receive the control signal from the tilt controller TC. The tilt driver TD may include a communication connection terminal for communication connection with the tilt driver TD. When the I2C communication method is used, the communication connection terminal may be composed of two terminals.

The tilt driver TD generates the output signal based on the voltage and trigger signal received from the camera module, and the control signal received from the tilt controller TC. A detailed description of the generation of the output signal will be described with reference to the drawings below.

The tilt driver TD may output the output signal to the tilt actuator TA. The output signal is a signal composed of two channels, and may include a first output signal and a second output signal. Accordingly, the tilt driver TD may include a first output terminal configured to output the first output signal and an output terminal configured to output the second output signal, and each terminal may be connected to the tilt actuator TA through a signal line. However, the output signal may vary depending on the channel. This will be described below based on various embodiments.

The tilt actuator TA may tilt the filter in the diagonal direction through the output signal. The tilt actuator TA may include a first drive unit to a fourth drive unit, and each drive unit may include one coil and one magnet. In other words, the tilt actuator TA may include a magnet unit and a coil unit. Furthermore, the tilt actuator TA may further include the above-described substrate 3000 and holder 5000. Accordingly, the filter may be tilted in the diagonal direction or the horizontal direction by receiving the first output signal, the second output signal, and the like.

For example, the first output signal may be input to the first drive unit and the third drive unit. Specifically, the first output signal may be input to a first coil of the first drive unit and a third coil of the third drive unit. The second output signal may be input to the second drive unit and the fourth drive unit. Specifically, the first output signal may be input to a second coil of the second drive unit and a fourth coil of the fourth drive unit. In other words, the tilt actuator TA may tilt the filter in the diagonal direction through the output signal including the first output signal and the second output signal.

In the embodiment, the tilt actuator TA may apply at least one of the first output signal and the second output signal to the coil unit, and correspondingly, the camera module may tilt the filter in the diagonal direction or the horizontal direction.

FIG. 56 is a view for specifically describing the tilt actuator.

FIG. 56A shows a form in which the first coil to the fourth coil of the tilt actuator TA are disposed on the substrate 3000. The first to fourth coils may be disposed on the substrate 3000 to be spaced apart from each other by a certain distance. The substrate 3000 may be implemented in a form in which the substrate 3000 may be folded between the first coil and the second coil, between the second coil and the third coil, and between the third coil and the fourth coil. Coils facing each other among the first to fourth coils may be formed in an antiparallel structure in which directions of currents flowing through the coils are opposite to each other. In other words, the first coil and the third coil may be formed in the structure antiparallel to each other, and the second coil and the fourth coil may be formed in the structure antiparallel to each other. Since the first coil and the third coil have the structure antiparallel to each other, a current I1 flowing through the first coil and a current I3 flowing through the third coil may have an antiparallel relationship with each other (I1=−I3). Since the second coil and the fourth coil have the structure antiparallel to each other, a current I2 flowing through the second coil and a current I4 flowing through the fourth coil may have an antiparallel relationship with each other (I2=−I4).

In the embodiment, the camera module may apply both the first output signal and the second output signal to the tilt actuator TA in order to tilt the filter in the diagonal direction. However, the camera module may apply only one of the first output signal and the second output signal to the tilt actuator TA in the frame period in order to tilt the filter in the horizontal direction. For example, within the frame period, the first output signal and the second output signal may be applied to the tilt actuator TA without overlapping time. With this configuration, it is possible to improve energy efficiency for the output of the signal.

FIG. 56B shows a printed circuit board 4 on which the substrate 3000 on which the first coil to the fourth coil are disposed is disposed. A pad equipped with the tilt actuator TA may be disposed on a portion in which a light receiving unit of the printed circuit board 4 is disposed. The pad may include a first pad and a second pad disposed at a position facing the first pad.

FIG. 56C shows a form in which the substrate on which the first coil to the fourth coil shown in FIG. 56A are disposed is coupled to the printed circuit board 4. The substrate on which the first coil to the fourth coil shown in FIG. 56A are disposed may have a rectangular shape that is folded at regular intervals and regular angles. The substrate 3000 on which the rectangular first to fourth coils are disposed may be coupled to the printed circuit board 4. The first pad and the second pad disposed on the printed circuit board 4 may be coupled to a portion of the substrate on which the first coil and the second coil are disposed. At this time, the substrate and the printed circuit board 4 may be coupled by soldering the portions of the first pad and the second pad. The first magnet to the fourth magnet may be disposed to correspond to the first coil to the fourth coil, respectively. A first output signal X may be input to the first coil and the third coil. A second output signal Y may be input to the second coil and the fourth coil.

FIG. 57A is a view for describing a drive sequence of a tilt unit, FIG. 57B is a view for describing an output of the drive unit in FIG. 57A in STEP 1, and FIG. 57C is a view for describing the output of the drive unit in FIG. 57A per frame period.

FIG. 57A shows a first output signal and a second output signal generated according to the trigger signal. The first output signal may be input to the first coil and the third coil, and the second output signal may be input to the second coil and the fourth coil.

As shown in FIG. 57A, the trigger signal may be a square wave signal in which a pulse is generated at a regular period. The trigger signal may be generated in response to the driving of the drive (integration time) sensor of the above-described sensor. In addition, a pulse interval, that is, the pulse period of the trigger signal may be one frame interval. In addition, an interval from a rising edge of a pulse of the trigger signal to a rising edge of a next pulse of the trigger signal may be one frame interval. A pulse width of the trigger signal may be set to be smaller than one frame interval.

Before the driving sequence of the tilt actuator starts, that is, in a default state, the current levels of the first output signal and the second output signal may be Level 0. Here, Level 0 may refer to a current of 0 [A] but is not limited thereto.

When the driving sequence of the tilt actuator starts, the current levels of the first output signal and the second output signal are controlled after a set delay time (Delay T) elapses based on a falling edge of the pulse of the trigger signal. The current levels of the first output signal and the second output signal may be controlled for each frame interval. The first output signal and the second output signal may be controlled to have a high-level current or a low-level current for each frame interval. The high-level current may refer to a state having a current value greater than that of a reference level current, and the low-level current may refer to a state having a current value lower than that of the reference level current. For example, when the reference level is set to 0 [A], the high level may refer to a current having a (+) value, and the low-level may refer to a current having a (−) value. In other words, the reference level may be a level at which no current is applied. When the current level of the output signal is different in a successive step, it may take a predetermined time to increase or decrease the current level.

Table 1 below is a table showing the first output signal and the second output signal shown in FIG. 57A.

TABLE 1

| STEP | First output signal X | Second output signal Y |
|------|----------------------|------------------------|
| 1    | (−)                  | (+)                    |
| 2    | (+)                  | (+)                    |
| 3    | (+)                  | (−)                    |
| 4    | (−)                  | (−)                    |

In Table 1, (−) refers to a low-level current, and (+) refers to a high-level current. The low-level current and the high-level current may refer to currents having the same magnitude and different directions. In addition, STEP 1 refers to a first tilt sequence, STEP 2 refers to a second tilt sequence, STEP 3 refers to a third tilt sequence, and STEP 4 refers to a fourth tilt sequence. When the driving sequence of the tilt actuator TA starts, the current levels of the first output signal and the second output signal may be controlled after the set delay time elapses from the falling edge of the first pulse (STEP 1). The first output signal may be controlled from the reference level current to the low-level current. The second output signal may be controlled from the reference level current to the high-level current. In other words, in STEP 1, the first output signal may be controlled to have the low-level current and the second output signal may be controlled to have the high-level current.

The first output signal and the second output signal may include a first signal sg1 and a second signal sg2.

First, based on the first output signal, the second signal sg2 may be continuously present after the first signal sg1. In addition, the first signal sg1 may have a first magnitude A1 or A1'. In addition, the second signal sg2 may have a second magnitude A2 or A2'. Here, the second signal sg2 may correspond to the above-described high level or low-level current. In addition, the high level or low-level current may be a value set to tilt the filter. It should be understood that since the tilt degree of the filter is changed depending on the size of the sensor, the size of the pixel in the sensor, the type of the lens module, and the like, the high level or low-level current may also be changed accordingly.

In addition, the first magnitude A1 or A1' of the first signal sg1 may be a value between the reference level (e.g., Level 0) and the second magnitude A2 or A2' of the second signal sg2. Accordingly, the second magnitude A2 or A2' of the second signal sg2 may be greater than the first magnitude A1 or A1' of the first signal sg1. The first magnitude A1 or A1' of the first signal sg1 may be 0.3 times to 0.7 times the second magnitude A2 or A2' of the second signal sg2. For example, the first magnitude A1 or A1' of the first signal sg1 may be set to 0.5 times the second magnitude A2 or A2' of the second signal sg2.

In addition, the first signal sg1 may be maintained for a first period TA. The first period may be 0.6 times to 0.9 times a natural oscillation period of the tilt actuator. When the first period is smaller than 0.6 times the natural oscillation period of the tilt actuator, the oscillation by the second signal may not be easily removed. In addition, when the first period is greater than 0.9 times the natural oscillation period of the tilt actuator, there is a limit to a reduction in time response. The natural oscillation period is a reciprocal of a natural frequency, and at this time, the natural frequency may be a natural frequency of an actual tilt actuator considering attenuation or an attenuation natural frequency of a spring-damper system.

As described above, the first output signal and the second output signal have the continuous first signal sg1 before the second signal sg2, so that an improved time response may be provided compared to a threshold response. In other words, the tilt actuator according to another embodiment includes the elastic member. In addition, since the tilt actuator has a mechanical drive called tilt, the tilt actuator may be a system in which a motion of a vibratory meter in which mechanical drive and elasticity are combined is finally performed. In addition, the output signal may be an input applied for the motion, and the positions of the above-described first to fourth drive units may be an output as a displacement generated according to the input.

In addition, the time response of the tilt actuator may have a rising time, an overshoot, and a setting time in response to the output signal. The output signal of the tilt actuator according to another embodiment has the first signal sg1 and the second signal sg2, so that it is possible to easily generate the frame image by the tilt by reducing the overshoot and the setting time.

According to the embodiment, the first signal sg1 and the second signal sg2 of the tilt actuator may provide an output corresponding to a response according to a threshold attenuation as the time response. In other words, the first signal sg1 and the second signal sg2 of the tilt actuator may provide the movements of the first to fourth drive units corresponding to the threshold attenuation. With this configuration, the tilt actuator according to another embodiment of the present invention may accurately tilt the filter quickly.

In addition, the first signal may be output when a second signal of another output signal is maintained or turned off (not applied). For example, a first signal of a second output signal may be output when a second signal of a first output signal is maintained at a high or low-level or is changed to the reference level.

FIG. 57B(a) is a graph showing the movement of the drive unit for one frame period when the output signal is composed of only the second signal, and FIG. 57B(b) is a graph showing the movement of the drive unit for one frame period in the case of the output signal according to another embodiment. When the movement of the drive unit is detected by a Hall sensor or a position sensor, the movement of the drive unit is shown as a voltage (V) in this graph.

Referring to FIGS. 57B(a) and 57B(b), as described above, it can be seen that the overshoot when the output signal includes the first signal sg1 and the second signal sg2 is smaller than the overshoot when the output signal is composed of only the second signal sg2, and the magnitude of oscillation when the output signal includes the first signal sg1 and the second signal sg2 is smaller than the magnitude of oscillation when the output signal is composed of only the second signal sg2. In addition, it can be seen that the settling time when the output signal includes the first signal sg1 and the second signal sg2 is also smaller than the settling time when the output signal includes only the second signal sg2. Accordingly, the tilt actuator according to another embodiment may quickly tilt the filter to a desired angle, and reduce the generation of oscillation due to the tilt, thereby improving the resolution of an image by the SR technique to be described below.

FIG. 57C(a) is a graph showing the movement of the drive unit for a plurality of frame periods when the output signal is composed of only the second signal, and FIG. 57B(b) is a graph showing the movement of the drive unit for the plurality of frame periods in the case of the output signal according to another embodiment.

Referring to FIGS. 57C(a) and 57C(b), it can be seen that the overshoot when the output signal includes the first signal sg1 and the second signal sg2 is smaller than the overshoot when the output signal is composed of only the second signal sg2 and the magnitude of the oscillation when the output signal includes the first signal sg1 and the second signal sg2 is smaller than the magnitude of oscillation when the output signal is composed of only the second signal sg2 even for the plurality of frame periods. In addition, it can be seen that the settling time is reduced as described above.

Furthermore, after a set delay time elapses from a falling edge of a second pulse, the current levels of the first output signal and the second output signal may be controlled (STEP 2). The first output signal may be controlled from the low-level current controlled in STEP 1 to the high-level current. The second output signal may be controlled to maintain the high-level current controlled in STEP 1. In other words, in STEP 2, the first output signal may be controlled to have the high-level current and the second output signal may be controlled to have the high-level current.

As described above, the first output signal may have the first signal after the set delay time elapses from the falling edge of the second pulse and have the second signal having a high level after the first signal.

After a set delay time elapses from a falling edge of a third pulse, the current levels of the first output signal and the second output signal may be controlled (STEP 3). The first output signal may be controlled to maintain the high-level current controlled in STEP 2. The second output signal may be controlled from the high-level current controlled in STEP 2 to the low-level current. In other words, in STEP 3, the first output signal may be controlled to have the high-level current and the second output signal may be controlled to have the low-level current.

In addition, the second output signal may have the first signal after the set delay time elapses from the falling edge of the third pulse, and have the second signal having a low-level after the first signal.

After a set delay time elapses from a falling edge of a fourth pulse, the current levels of the first output signal and the second output signal may be controlled (STEP 4). The first output signal may be controlled from the high-level current controlled in STEP 3 to the low-level current. The second output signal may be controlled to maintain the low-level current controlled in STEP 3. In other words, in STEP 4, the first output signal may be controlled to have the low-level current and the second output signal may be controlled to have the low-level current.

The first output signal may have the first signal after the set delay time elapses from the falling edge of the fourth pulse, and have the second signal having the low level after the first signal.

STEP 1 to STEP 4 may operate in one cycle, and may be continuously repeated while the driving sequences of the tilt actuator TA operate.

In addition, in STEP1 and STEP2, since the second output signal is maintained as the second signal (high level) after the first signal, power consumption for controlling the output signal may be reduced and the oscillation of the drive units (second and fourth drive units) is further reduced, and thus the filter may be tilted more accurately.

In addition, in STEP2 and STEP3, since the first output signal is maintained as the second signal (high level) after the first signal, power consumption for controlling the output signal is reduced and the oscillation of the drive units (first and third drive units) is further reduced, and thus the filter may be tilted more accurately.

In addition, in STEP3 and STEP4, since the second output signal is maintained as the second signal (low level) after the first signal, power consumption for controlling the output signal is reduced and the oscillation of the drive units (second and fourth drive units) is further reduced, and thus the filter may be tilted more accurately.

Table 2 below shows a modified example of the driving sequence of the tilt actuator TA.

TABLE 2

| STEP | First output signal X | Second output signal Y |
|---|---|---|
| 1 | (+) | (+) |
| 2 | (+) | (−) |
| 3 | (−) | (−) |
| 4 | (−) | (+) |

As shown in Table 2, the current levels for each STEP of the first output signal and the second output signal described with reference to Table 1 and FIG. 57A are one embodiment, and may be set in other combinations as in the modified example. To this end, the current levels for each STEP of the first output signal and the second output signal may be set by the control signal of the tilt controller TC. The contents described with reference to Table 1 with respect to the tilt actuator may be applied in the same manner. However, in STEP1 and STEP2, since the first output signal is maintained as the second signal (high level) after the first signal, power consumption for controlling the output signal is reduced and the oscillation of the drive units (first and third drive units) is further reduced, and thus the filter may be tilted more accurately.

In addition, in STEP2 and STEP3, since the second output signal is maintained as the second signal (low level) after the first signal, power consumption for controlling the output signal is reduced and the oscillation of the drive units (second and fourth drive units) is further reduced, and thus the filter may be tilted more accurately.

In addition, in STEP3 and STEP4, since the first output signal is maintained as the second signal (low level) after the first signal, power consumption for controlling the output signal is reduced and the oscillation of the drive units (first and third drive units) is further reduced, and thus the filter may be tilted more accurately.

FIG. 58 shows a light path movement process according to the first another embodiment. FIG. 59 is a conceptual diagram conceptually showing sequentially a plurality of images acquired for a super resolution (SR) technique in the camera module according to the first another embodiment. FIG. 60 is a view sequentially showing images of first to fourth frames acquired for the SR technique in the camera module according to the first another embodiment.

First, in STEP 0 (neutral sequence) before the driving sequence of the tilt actuator starts, the filter may be maintained in a state of not being tilted. FIG. 59A shows a light path of the input light in STEP 0. In FIG. 59, a point represents a center of a pixel with respect to the input light. In STEP 0, the center of the pixel with respect to the input light and a center of the pixel with respect to the sensor may match each other. In other words, this means that the light path of light passing through the filter is not changed.

When the driving sequence of the tilt actuator starts, the tilt actuator may tilt the filter according to STEP 1. Due to the tilting according to STEP 1, an upper left end of the filter may move up and a lower right end may move down with respect to a reference face. The reference face may refer to a face on which the filter is disposed in STEP 0. Moving-up may refer to moving away from the sensor, and moving-down may refer to getting closer to the sensor. FIG. 59B shows the light path of the input light in STEP 1. When the filter is tilted according to STEP 1, the light path of the input light may move 0.25 pixels leftward and 0.25 pixels upward from a reference light path. Then, the camera module according to another embodiment of the present invention may acquire a first frame image from the light path moved according to STEP 1.

After the driving sequence of the tilt actuator according to STEP 1, the tilt actuator may tilt the filter according to STEP 2. Due to the tilting according to STEP 2, an upper right end of the filter may move up and a lower left end thereof may move down with respect to the reference face. Edges of the upper left end and the lower right end of the filter moving up or down in STEP 1 may be moved to reference positions. FIG. 59C shows the light path of the input light in STEP 2. When the filter is tilted according to STEP 2, the light path of the input light may move 0.25 pixels rightward and 0.25 pixels upward from the reference light path. The light path of the input light may move 0.5 pixels rightward with respect to the light path of the input light in STEP 1. Then, the camera module according to another embodiment of the present invention may acquire a second frame image from the light path moved according to STEP 2.

After the driving sequence of the tilt actuator according to STEP 2, the tilt actuator may tilt the filter according to STEP 3. Due to the tilting according to STEP 3, an upper left end of the filter may move down and a lower right end thereof may move up with respect to the reference face. Edges of the upper right end and the lower left end of the filter moving up or down in STEP 2 may be moved to reference positions. FIG. 59D shows the light path of the input light in STEP 3. When the filter is tilted according to STEP 3, the light path of the input light may move 0.25 pixels rightward and 0.25 pixels downward from the reference light path. The light path of the input light may move 0.5 pixels downward with respect to the light path of the input light in STEP 2. Then, the camera module according to another embodiment of the present invention may acquire a third frame image from the light path moved according to STEP 3.

After the driving sequence of the tilt actuator according to STEP 3, the tilt actuator may tilt the filter according to STEP 4. Due to the tilting according to STEP 4, an upper right end of the filter may move up and a lower left end thereof may move down with respect to the reference face. The edges of the upper left end and the lower right end of the filter moving up or down in STEP 3 may be moved to the reference positions. FIG. 59E shows the light path of the input light in STEP 4. When the filter is tilted according to STEP 4, the light path of the input light may move 0.25 pixels leftward and 0.25 pixels downward from the reference light path. The light path of the input light may move 0.5 pixels leftward with respect to the light path of the input light in STEP 2. Then, the camera module according to another embodiment of the present invention may acquire a fourth frame image from the light path moved according to STEP 4.

The tilt actuator has been described as having the VCM structure in which the magnet and the coil are applied, but the present invention is not limited thereto and the present invention may also be implemented through a liquid lens that may control the light path by controlling one or two (conductive liquid or non-conductive liquid that form a mutual interface) or more liquids or a variable lens such as an optical member configured to control the light path by controlling a thin film and liquid.

In addition, the first output signal and the second output signal may be generated by the tilt drivers that are driven individually. For example, the tilt driver may include a plurality of drivers. The tilt driver includes a first tilt driver and a second tilt driver, wherein the first tilt driver may generate the first output signal and transmit the first output signal to the tilt actuator, and the second tilt driver may generate the second output signal and transmit the second output signal to the tilt actuator. Accordingly, the first tilt driver and the second tilt driver may individually generate the output signals to reduce power consumption of the tilt drivers when at least one of the first output signal or the second output signal is not generated (e.g., Level 0). This may also be applied to other embodiments in the same manner.

FIG. 61 is a view for describing an SR image.

FIG. 61 shows a process of generating one high-resolution SR image using the first to fourth frame images generated through STEP 1 to STEP 4. For convenience of description, FIG. 61 shows that each of the first to fourth frame images is assumed to be a 4×4 frame image, that is, an image composed of 16 pixels. As shown in FIG. 61, one SR image may be generated by disposing pixel values of four frame images in response to the movement direction of the light path. In other words, the first to fourth frame images having a size of 4×4 (16 pixels) may be one SR image having a size of 8×8 (64 pixels).

A process of disposing the pixel value will be described on the assumption that a pixel at an upper left end of the first to fourth frames is Pixel 1 and a pixel at a lower right end thereof is Pixel 16 and on the assumption that a pixel at an upper left end of the SR image is Pixel 1 and a pixel at a lower right end thereof is Pixel 64.

Pixel 1 of the first frame image moving 0.25 pixels leftward and 0.25 pixels upward from the reference light path may be disposed as a value of Pixel 1 of the SR image. Pixel 2 of the first frame image may be disposed as a value of Pixel 3 of the SR image. Pixel 3 of the first frame image may be disposed as a value of Pixel 5 of the SR image. Pixel 4 of the first frame image may be disposed as a value of Pixel 7 of the SR image.

Pixel 1 of the second frame image moving 0.25 pixels rightward and 0.25 pixels upward from the reference light path may be disposed as the value of Pixel 2 of the SR image. Pixel 2 of the second frame image may be disposed as a value of Pixel 4 of the SR image. Pixel 3 of the second frame image may be disposed as a value of Pixel 6 of the SR image. Pixel 4 of the second frame image may be disposed as a value of Pixel 8 of the SR image.

Pixel 1 of the third frame image moving 0.25 pixels rightward and 0.25 pixels downward from the reference light path may be disposed as a value of pixel 9 of the SR image. Pixel 2 of the third frame image may be disposed as a value of Pixel 11 of the SR image. Pixel 3 of the third frame image may be disposed as a value of Pixel 13 of the SR image. Pixel 4 of the third frame image may be disposed as a value of Pixel 15 of the SR image.

Pixel 1 of the fourth frame image moving 0.25 pixels leftward and 0.25 pixels downward from the reference light path may be disposed as a value of Pixel 10 of the SR image.

Pixel 2 of the fourth frame image may be disposed as a value of Pixel 12 of the SR image. Pixel 3 of the fourth frame image may be disposed as a value of Pixel 14 of the SR image. Pixel 4 of the fourth frame image may be disposed as a value of Pixel 16 of the SR image.

As described above, the pixel values of the first to fourth frame images may be disposed to generate one SR image. In other words, one image is acquired through four images. Accordingly, an image of 100 FPS may be an SR image of 25 FPS.

Meanwhile, the image synthesis part may correct the SR image by removing the outermost pixels of the SR image, that is, the pixel values shaded in FIG. 61. The pixel values disposed at the outermost portion of the SR image may include data irrelevant to information to be captured in the tilting process. The image synthesis part may remove the shadow of the outermost pixels in order to remove the data irrelevant to information to be captured.

Although the embodiments of the present invention have been described with reference to the accompanying drawings, those skilled in the art to which the present invention pertains will be able to understand that the present invention may be carried out in other specific forms without changing the technical spirit or essential features thereof. Accordingly, it should be understood that the above-described embodiments are illustrative and not restrictive in all respects.

FIG. 62 is a view for describing a driving sequence of a tilt unit according to a second another embodiment.

Referring to FIG. 62, FIG. 62 shows a first output signal and a second output signal generated according to a trigger signal. As described above, the first output signal may be input to the first coil and the third coil, and the second output signal may be input to the second coil and the fourth coil.

As shown in FIG. 62, the trigger signal may be a square wave signal in which a pulse is generated at a regular period. The trigger signal may be generated in response to the driving of the drive (integration time) sensor of the above-described sensor. In addition, a pulse interval, that is, the pulse period of the trigger signal may be one frame interval. In addition, an interval from a rising edge of a pulse of the trigger signal to a rising edge of a next pulse of the trigger signal may be one frame interval. A pulse width of the trigger signal may be set to be smaller than one frame interval.

Before the driving sequence of the tilt actuator starts, that is, in a default state, the current levels of the first output signal and the second output signal may be Level 0. Here, Level 0 may be a level at which a current is not applied. For example, Level 0 may refer to a current of 0 [A], but is not limited thereto. The above-described contents may be applied to the above description in the same manner.

In addition, as described above, when the driving sequence of the tilt actuator starts, the current levels of the first output signal and the second output signal are controlled after a set delay time (Delay T) elapses based on a falling edge of a pulse of the trigger signal. The current levels of the first output signal and the second output signal may be controlled for each frame interval. The first output signal and the second output signal may be controlled to have a high-level current or a low-level current for each frame interval. The high-level current may refer to a state having a current value greater than that of a reference level current, and the low-level current may refer to a state having a current value lower than that of the reference level current. For example, when the reference level is set to 0 [A], the high level may refer to a current having a (+) value, and the low level may refer to a current having a (−) value. When the current levels of the output signals are different in successive steps, it may take a predetermined time to increase or decrease the current level.

Table 3 below is a table showing the first output signal and the second output signal shown in FIG. 62.

TABLE 3

| STEP | First output signal X | Second output signal Y |
|---|---|---|
| 1 | (+) | Level 0 |
| 2 | Level 0 | (+) |
| 3 | (−) | Level 0 |
| 4 | Level 0 | (−) |

In Table 3, (−) refers to a low-level current, and (+) refers to a high-level current. Level 0 may be the reference level. In addition, the low-level current and the high-level current may refer to currents having the same magnitude and different directions. In addition, STEP 1 refers to a first tilt sequence, STEP 2 refers to a second tilt sequence, STEP 3 refers to a third tilt sequence, and STEP 4 refers to a fourth tilt sequence. When the driving sequence of the tilt actuator starts, the current levels of the first output signal and the second output signal may be controlled after the set delay time elapses from a falling edge of a first pulse (STEP 1). The first output signal may be controlled from the reference level current to the high-level current. The second output signal may be controlled to the reference level. In other words, in STEP 1, the first output signal may be controlled to have the high-level current and the second output signal may be controlled to have the reference level current.

After the set delay time elapses from a falling edge of a second pulse, the current levels of the first output signal and the second output signal may be controlled (STEP 2). The first output signal may be controlled from the high-level current controlled in STEP 1 to the reference level current. The second output signal may be controlled from the reference level current controlled in STEP 1 to the high-level current. In other words, in STEP 2, the first output signal may be controlled to have the reference level current and the second output signal may be controlled to have the high-level current.

As described above, the second output signal may have the first signal after the set delay time elapses from the falling edge of the second pulse, and have the second signal having the high level after the first signal.

In other words, the first output signal and the second output signal may include a first signal sg1 and a second signal sg2.

Based on the first output signal, the second signal sg2 may be continuously present after the first signal sg1. In addition, the first signal sg1 may have a first magnitude. In addition, the second signal sg2 may have a second magnitude. Here, the second signal sg2 may correspond to the above-described high level or low-level current. In addition, the high level or low-level current may be a value set to tilt the filter. It should be understood that since the tilt degree of the filter is changed depending on the size of the sensor, the size of the pixel in the sensor, the type of the lens module, and the like, the high level or low-level current may also be changed accordingly.

In addition, the first magnitude of the first signal sg1 may be a value between the reference level (e.g., Level 0) and the second magnitude of the second signal sg2. The second magnitude of the second signal sg2 may be greater than the first magnitude of the first signal sg1.

In addition, the first signal sg1 may be maintained for the first period TA. The first period may be 0.6 times to 0.9 times the natural oscillation period of the tilt actuator. When the first period is smaller than 0.6 times the natural oscillation period of the tilt actuator, the oscillation by the second signal may not be easily removed. In addition, when the first period is greater than 0.9 times the natural oscillation period of the tilt actuator, there is a limit to a reduction in time response.

With this configuration, the first output signal and the second output signal have the continuous first signal sg1 before the second signal sg2, thereby providing the improved time response than the threshold response. In addition, the tilt actuator according to another embodiment has the first signal sg1 and the second signal sg2, so that it is possible to easily generate the frame image by the tilt by reducing the overshoot and the setting time.

After the set delay time elapses from a falling edge of a third pulse, the current levels of the first output signal and the second output signal may be controlled (STEP 3). The first output signal may be controlled from the reference level current controlled in STEP 2 to the low-level current. The second output signal may be controlled from the high-level current controlled in STEP 2 to the reference level current. In other words, in STEP 3, the first output signal may be controlled to have the low-level current and the second output signal may be controlled to have the reference level current.

In addition, the first output signal may have the first signal after the set delay time elapses from the falling edge of the third pulse, and have the second signal having the low level after the first signal.

After the set delay time elapses from a falling edge of a fourth pulse, the current levels of the first output signal and the second output signal may be controlled (STEP 4). The first output signal may be controlled from the low-level current controlled in STEP 3 to the reference level current. The second output signal may be controlled from the reference level current controlled in STEP 3 to the low-level current. In other words, in STEP 4, the first output signal may be controlled to have the reference level current and the second output signal may be controlled to have the low-level current.

The second output signal may have the first signal after the set delay time elapses from the falling edge of the fourth pulse and have the second signal having the low level after the first signal.

In addition, STEP 1 to STEP 4 operate in one cycle, and may be continuously repeated while the driving sequences of the tilt actuator operate.

In this embodiment, the first output signal may have a 1-1 output signal corresponding to a first trigger signal and a 1-2 output signal corresponding to a third trigger signal. In other words, the 1-1 output signal is the first output signal in STEP1, and the 1-2 output signal is the first output signal in STEP3.

In addition, the second output signal may have a 2-1 output signal corresponding to a second trigger signal and a 2-2 output signal corresponding to a fourth trigger signal. In other words, the 2-1 output signal is the second output signal in STEP2, and the 2-2 output signal is the first output signal in STEP4.

The 1-1 output signal may have an opposite direction to the 1-2 output signal. In addition, the 2-1 output signal may have an opposite direction to the 2-2 output signal. In addition, the 2-1 output signal may be applied between the 1-1 output signal and the 1-2 output signal, and the 1-2 output signal may be applied between the 2-1 output signal and the 2-2 output signal.

As described above, there is a section in which the reference level current is maintained (section to which the 2-1 output signal is applied) between the 1-1 output signal and the 1-2 output signal. In addition, there is a section in which the reference level current is maintained (section to which the 1-2 output signal is applied) between the 2-1 output signal and the 2-2 output signal.

As described, the first output signal and the second output signal are reduced to the reference voltage before the high or low-level current is applied, so that it is possible to minimize the influence of the residual current in the coil by the first output signal and the second output signal on a next sequence. For example, since the current remaining in the tilt actuator is attenuated by the 1-1 output signal by the section in which the reference level current is maintained between the 1-1 output signal and the 1-2 output signal, an initial current value may be close to zero at the time of driving the tilt actuator by the 1-2 output signal. With this configuration, it is possible to reduce the oscillation due to the tilting of the filter through the tilt actuator.

Furthermore, as described above, when the plurality of tilt drivers are provided, the driving of the tilt driver is stopped in the section in which the reference level current is maintained between the 1-1 output signal and the 1-2 output signal, so that it is possible to reduce power consumption of the tilt actuator.

FIG. 63 is a view for describing a tilting control of a filter by driving the tilt unit according to the second another embodiment, FIG. 64 is a view showing a light path movement process according to the second another embodiment, and FIG. 65 is a conceptual diagram conceptually showing sequentially a plurality of images acquired for a super resolution (SR) technique from the camera module according to the second another embodiment.

Referring to FIGS. 63 to 65, the camera module according to another embodiment may acquire a plurality of images for the SR technique with horizontal tilting in addition to the above-described diagonal tilting.

In STEP 0 (neutral sequence) before the driving sequence of the tilt actuator starts, the optical member (or filter) may be maintained in a state of not being tilted. FIG. 65A shows the light path of the input light in STEP 0. In FIG. 65, a point represents a center of a pixel with respect to the input light. In STEP 0, the center of the pixel with respect to the input light and a center of the pixel with respect to the sensor may match each other. In other words, this means that the light path of the light passing through the optical member (or filter) is not changed.

When the driving sequence of the tilt actuator starts, the tilt actuator may tilt the optical member (or filter) in the horizontal direction according to STEP 1. Due to the tilting according to STEP 1, the left portion of the optical member (or filter) may move down and the right portion thereof may move up with respect to the reference face. The reference face may refer a face on which the optical member (or filter) is disposed in STEP 0. Moving-up may refer to moving away from the sensor, and moving-down may refer to getting closer to the sensor. FIG. 65B shows the light path of the input light in STEP 1. When the optical member (or filter) is tilted according to STEP 1, the light path of the input light may move 0.25 pixels rightward from the reference light path. The movement of the pixel may be changed depending on the SR technique or depending on the sensor. In other words, it should be understood that a movement distance of the pixel relative to the reference light path may be changed by the driving sequence of the tilt actuator.

First, the first frame image may be acquired from the light path moved according to STEP 1.

After the driving sequence of the tilt actuator according to STEP 1, the tilt actuator may tilt the optical member (or filter) according to STEP 2. Due to the tilting according to STEP 2, the upper end of the optical member (or filter) may move up and the lower end thereof may move down with respect to the reference face.

FIG. 65C shows the light path of the input light in STEP 2. When the optical member (or filter) is tilted according to STEP 2, the light path of the input light may move 0.25 pixels upward from the reference light path. The light path of the input light may move 0.25 pixels upward with respect to the light path of the input light in STEP 1. Then, the camera module according to another embodiment of the present invention may acquire the second frame image from the light path moved according to STEP 2.

After the driving sequence of the tilt actuator according to STEP 2, the tilt actuator may tilt the optical member (or filter) according to STEP 3. Due to the tilting according to STEP 3, the left of the optical member (or the filter) may move up and the right thereof may move down with respect to the reference face. FIG. 65D shows the light path of the input light in STEP 3. When the optical member (or filter) is tilted according to STEP 3, the light path of the input light may move 0.25 pixels leftward from the reference light path. The light path of the input light may move 0.25 pixels leftward with respect to the light path of the input light in STEP 2. Then, the camera module according to another embodiment of the present invention may acquire the third frame image from the light path moved according to STEP 3.

After the driving sequence of the tilt actuator according to STEP 3, the tilt actuator may tilt the optical member (or filter) according to STEP 4. Due to the tilting according to STEP 4, the lower end of the optical member (or the filter) may move up and the upper end thereof may move down with respect to the reference face. FIG. 65E shows the light path of the input light in STEP 4. When the optical member (or filter) is tilted according to STEP 4, the light path of the input light may move 0.25 pixels downward from the reference light path. The light path of the input light may move 0.25 pixels downward with respect to the light path of the input light in STEP 2. Then, the camera module according to another embodiment of the present invention may acquire the fourth frame image from the light path moved according to STEP 4. FIG. 66 is a view for describing a tilt actuator according to still another embodiment.

FIG. 66A shows a form in which the first coil to the fourth coil of the tilt actuator are disposed on the substrate 3000. The first to fourth coils may be disposed on the substrate 3000 to be spaced apart from each other by a certain distance. The substrate 3000 may be implemented in a form in which the substrate 3000 may be folded between the first coil and the second coil, between the second coil and the third coil, and between the third coil and the fourth coil. In addition, currents I1 to I4 may be individually applied to the first coil to the fourth coil.

In addition, the contents described with reference to FIG. 56 may be applied to FIGS. 66B and 66C in the same manner except for the contents described below. Hereinafter, a third output signal X1 and a fourth output signal X2 for controlling the tilt in the X-axis direction may be input to the first coil and the third coil, respectively. A fifth output signal Y1 and a sixth output signal Y2 for controlling the tilt in the Y-axis direction may be input to the second coil and the fourth coil. The following description will be given based on the above description.

FIG. 67 is a view for describing a driving sequence of a tilt unit according to a third another embodiment.

FIG. 67 shows a third output signal to a sixth output signal generated according to a trigger signal. The third output signal and the fourth output signal may be input to the first coil and the third coil, respectively, and the fifth output signal and the sixth output signal may be input to the second coil and the fourth coil, respectively.

As described above, the trigger signal may be a square wave signal in which a pulse is generated at a regular period. The trigger signal may be generated in response to the driving of the drive (integration time) sensor of the above-described sensor. In addition, a pulse interval, that is, the pulse period of the trigger signal may be one frame interval. In addition, an interval from a rising edge of a pulse of the trigger signal to a rising edge of a next pulse of the trigger signal may be one frame interval. A pulse width of the trigger signal may be set to be smaller than one frame interval.

In addition, before the driving sequence of the tilt actuator starts, that is, in a default state, current levels of the third output signal to the sixth output signal may be Level 0. Here, Level 0 may refer to a current of 0 [A] but is not limited thereto.

When the driving sequence of the tilt actuator starts, the current levels of the third output signal to the sixth output signal are controlled after a set delay time (Delay T) elapses based on a falling edge of a pulse of the trigger signal. The current levels of the third output signal to the sixth output signal may be controlled for each frame interval. The third output signal to the sixth output signal may be controlled to have a high-level current or a low-level current for each frame interval. The high-level current may refer to a state having a current value greater than that of a reference level current, and the low-level current may refer to a state having a current value lower than that of the reference level current. For example, when the reference level is set to 0 [A], the high level may refer to a current having a (+) value, and the low-level may refer to a current having a (−) value. When the current levels of the output signals are different in successive steps, it may take a predetermined time to increase or decrease the current level.

Table 4 below is a table showing the third output signal to the sixth output signal shown in FIG. 67.

TABLE 4

| STEP | Third output signal X1 | Fourth output signal X2 | Fifth output signal Y1 | Sixth output signal Y2 |
|---|---|---|---|---|
| 1 | (−) | (+) | (+) | (−) |
| 2 | (+) | (−) | (+) | (−) |
| 3 | (+) | (−) | (−) | (+) |
| 4 | (−) | (+) | (−) | (+) |

In Table 4, (−) refers to a low-level current, and (+) refers to a high-level current. The low-level current and the high-level current may refer to currents having the same magnitude and different directions. In addition, STEP 1 refers to a first tilt sequence, STEP 2 refers to a second tilt sequence, STEP 3 refers to a third tilt sequence, and STEP 4 refers to a fourth tilt sequence. When the driving sequence of the tilt actuator starts, the current levels of the third output signal to the sixth output signal may be controlled after the set delay time elapses from a falling edge of a first pulse (STEP 1).

The third output signal may be controlled from the current to the low-level current. The fourth output signal may be controlled to the high-level current. The fifth output signal may be controlled to the high-level current. The sixth output signal may be controlled to the low-level current.

Each of the third output signal to the sixth output signal may include a first signal sg1 and a second signal sg2. In addition, in the third output signal to the sixth output signal, the second signal sg2 may be continuously present after the first signal sg1. The descriptions of the first signal and the second signal may be applied in the same manner. Accordingly, the tilt actuator according to another embodiment has the first signal sg1 and the second signal sg2, so that it is possible to easily generate the frame image by the tilt by reducing the overshoot and the setting time.

After the set delay time elapses from a falling edge of a second pulse, the current levels of the third output signal to the sixth output signal may be controlled (STEP 2). The third output signal may be controlled from the current to the high-level current. The fourth output signal may be controlled to the low-level current. The fifth output signal may be controlled to the high-level current. The sixth output signal may be controlled to the low-level current.

As described above, the third output signal and the fourth output signal may have the first signal after the set delay time elapses from the falling edge of the second pulse, and have the second signal having the high level after the first signal.

After the set delay time elapses from a falling edge of a third pulse, the current levels of the third output signal to the sixth output signal may be controlled (STEP 3). The third output signal may be controlled from the current to the high-level current. The fourth output signal may be controlled to the low-level current. The fifth output signal may be controlled to the low-level current. The sixth output signal may be controlled to the high-level current.

In addition, the fifth output signal and the sixth output signal may have the first signal after the set delay time elapses from the falling edge of the third pulse, and have the second signal having the low level after the first signal.

After the set delay time elapses from a falling edge of a fourth pulse, the current levels of the third output signal to the sixth output signal may be controlled (STEP 4). The third output signal may be controlled from the current to the low level current. The fourth output signal may be controlled to the high-level current. The fifth output signal may be controlled to the low-level current. The sixth output signal may be controlled to the high-level current.

The third output signal and the fourth output signal may have the first signal after the set delay time elapses from the falling edge of the fourth pulse, and have the second signal having the low level after the first signal.

STEP 1 to STEP 4 operate in one cycle, and may be continuously repeated while the driving sequences of the tilt actuator operate.

In addition, in STEP1 and STEP2, since the fifth output signal and the sixth output signal are maintained as the second signal (high level or low level) after the first signal, power consumption for controlling the output signal is reduced, and the oscillations of the drive units (second and fourth drive units) are further reduced, and thus the filter may be tilted more accurately.

In addition, in STEP2 and STEP3, since the third output signal and the fourth output signal are maintained as the second signal (high level or low level) after the first signal, power consumption for controlling the output signal is reduced, and the oscillations of the drive units (first and third drive units) are further reduced, and thus the filter may be tilted more accurately.

In addition, in STEP3 and STEP4, since the fifth output signal and the sixth output signal are maintained as the second signal (low level) after the first signal, power consumption for controlling the output signal is reduced, and the oscillations of the drive units (second and fourth drive units) are further reduced, and thus the filter may be tilted more accurately.

In addition, according to the driving sequence of the tilt unit according to the third another embodiment, the above-described contents of the light path movement process described in the tilt unit or camera module according to the first another embodiment, the plurality of images acquired for the SR technique, the images of the first to fourth frames may be applied thereto in the same manner.

FIG. 68 is a view for describing a driving sequence of a tilt unit according to a fourth another embodiment.

FIG. 67 shows a third output signal to a sixth output signal generated according to a trigger signal. The third output signal and the fourth output signal may be input to the first coil and the third coil, respectively, and the fifth output signal and the sixth output signal may be input to the second coil and the fourth coil, respectively.

Table 5 below is a table showing the third output signal to the sixth output signal shown in FIG. 67.

TABLE 5

| STEP | Third output signal X1 | Fourth output signal X2 | Fifth output signal Y1 | Sixth output signal Y2 |
|---|---|---|---|---|
| 1 | (+) | (−) | Level 0 | Level 0 |
| 2 | Level 0 | Level 0 | (+) | (−) |
| 3 | (−) | (+) | Level 0 | Level 0 |
| 4 | Level 0 | Level 0 | (−) | (+) |

In Table 5, (−) refers to a low-level current, and (+) refers to a high-level current. The low-level current and the high-level current may refer to currents having the same magnitude and different directions. In addition, STEP 1 refers to a first tilt sequence, STEP 2 refers to a second tilt sequence, STEP 3 refers to a third tilt sequence, and STEP 4 refers to a fourth tilt sequence. When the driving sequence of the tilt actuator starts, the current levels of the third output signal to the sixth output signal may be controlled after the set delay time elapses from a falling edge of a first pulse (STEP 1). The third output signal may be controlled from the current to the high-level current. The fourth output signal may be controlled to the low-level current. The fifth output signal may be controlled to the reference level current. The sixth output signal may be controlled to the reference level current.

Each of the third output signal and the fourth output signal may include a first signal sg1 and a second signal sg2. In addition, in the third output signal and the fourth output signal, the second signal sg2 may be continuously present after the first signal sg1. The descriptions of the first signal and the second signal may be applied in the same manner. Accordingly, the tilt actuator according to another embodiment has the first signal sg1 and the second signal sg2, so that it is possible to easily generate the frame image by the tilt by reducing the overshoot and the setting time.

After the set delay time elapses from a falling edge of a second pulse, the current levels of the third output signal to the sixth output signal may be controlled (STEP 2). The third output signal may be controlled from current to the reference level current. The fourth output signal may be controlled to reference level current. The fifth output signal may be controlled to the high-level current. The sixth output signal may be controlled to the low-level current.

As described above, the fifth output signal and the sixth output signal may have the first signal after the set delay time elapses from the falling edge of the second pulse, and have the second signal having the high level after the first signal.

After the set delay time elapses from a falling edge of a third pulse, the current levels of the third output signal to the sixth output signal may be controlled (STEP 3). The third output signal may be controlled from the current to the low-level current. The fourth output signal may be controlled to the high-level current. The fifth output signal may be controlled to the reference level current. The sixth output signal may be controlled to the reference level current.

In addition, the third output signal and the fourth output signal may have the first signal after the set delay time elapses from the falling edge of the third pulse, and have the second signal having the low level after the first signal.

After the set delay time elapses from a falling edge of a fourth pulse, the current levels of the third output signal to the sixth output signal may be controlled (STEP 4). The third output signal may be controlled from current to the reference level current. The fourth output signal may be controlled to reference level current. The fifth output signal may be controlled to the low-level current. The sixth output signal may be controlled to the high-level current.

The fifth output signal and the sixth output signal may have the first signal after the set delay time elapses from the falling edge of the fourth pulse, and have the second signal having the low level after the first signal.

STEP 1 to STEP 4 operate in one cycle, and may be continuously repeated while the driving sequences of the tilt actuator operate.

In addition, according to the driving sequence of the tilt unit according to the third another embodiment, the above-described contents of the light path movement process described in the tilt unit or camera module according to the first another embodiment, the plurality of images acquired for the SR technique, the images of the first to fourth frames may be applied thereto in the same manner. In addition, the above-described contents may be applied to other contents in the same manner.

FIG. 69 is a view for describing a driving sequence of a tilt unit according to a modified embodiment.

Referring to FIG. 69, as described above, the first output signal and the second output signal may include a first signal sg1 and a second signal sg2. As the modified example, the first output signal and the second output signal may further include a continuous third signal sg3 after the second signal sg2. At this time, the third signal sg3 may be continuous after the second signal sg2 within one frame interval.

In the tilt unit according to the modified example, since the tilt actuator receives the third signal sg3 after tilting the filter to a desired angle, the tilt actuator may return to the neutral sequence state. Accordingly, even when the tilt actuator receives the first signal sg1 and the second signal sg2 in a next STEP, the current value in the coil of each drive unit may approach 0 immediately before the first signal sg1 is applied. With this configuration, the current remaining in the coil can be removed, thereby removing the oscillation due to the initial current. In other words, it is possible to reduce the oscillation when the tilt actuator is driven.

FIG. 70 is a view showing an optical device including the camera module according to the embodiment.

Referring to FIG. 70, the optical device according to the embodiment includes a front case fc, a rear case rc, and a camera module 10 provided in or between the front case fc and the rear case rc.

In addition, the camera module 10 may be the camera module of the above-described embodiment or another embodiment. Accordingly, the optical device may capture a stereoscopic image through the camera module 10 configured to output the three-dimensional depth image.

Although the embodiments have been mainly described above, this is merely illustrative and does not limit the present invention, and those skilled in the art to which the present invention pertains will be able to understand that various modifications and applications not exemplified above are possible without departing from the essential characteristics of the embodiments. For example, each component specifically shown in the embodiment may be implemented by modification. In addition, differences related to the modifications and applications should be construed as being included in the scope of the present invention defined in the appended claims.

The invention claimed is:

1. A camera module comprising:
   a light source;
   an optical unit configured to convert light output from the light source in a planar form or a multi-point form and output the converted light; and
   an image sensor,
   wherein the light source is periodically turned on/off,
   wherein the optical unit moves to be positioned at a first position when the light source is turned on,
   wherein the optical unit moves to an initial position when the light source is turned off,
   wherein, when the optical unit is positioned at the initial position, the optical unit outputs the light in any one of the planar form and the multi-point form, and
   wherein, when the optical unit is positioned at the first position, the optical unit outputs the light in the other one of the planar form and the multi-point form.

2. The camera module of claim 1, wherein the optical unit moves from the initial position toward the first position before a predetermined time before the light source is turned on.

3. The camera module of claim 1, wherein, when the optical unit is positioned at any one of the initial position and the first position, a distance between the optical unit and the light source is equal to a back focal distance of the optical unit.

4. The camera module of claim 1, wherein the first position includes a 1-A position and a 1-B position,
   wherein, when the optical unit is positioned at the 1-A position, the optical unit outputs the light in the multi-point form, and
   wherein, when the optical unit is positioned at the 1-B position, the optical unit outputs the light in the planar form.

5. The camera module of claim 4, wherein a distance between the light source and the optical unit at the 1-A position is smaller than a distance between the light source and the optical unit at the initial position, and
   wherein a distance between the light source and the optical unit at the 1-B position is greater than the distance between the light source and the optical unit at the initial position.

6. The camera module of claim 5, wherein a distance between the initial position and the 1-A position is smaller than a distance between the initial position and the 1-B position.

7. The camera module of claim 4, wherein a distance between the light source and the optical unit at the 1-A position is greater than a distance between the light source and the optical unit at the initial position, and wherein a distance between the light source at the 1-B position and the optical unit is greater than a distance between the light source at the 1-A position and the optical unit.

8. The camera module of claim 7, wherein a distance between the 1-A position and the initial position is smaller than a distance between the 1-B position and the initial position.

9. The camera module of claim 4, wherein a distance between the light source and the optical unit at the initial position is greater than a distance between the light source and the optical unit at the 1-B position, and wherein a distance between the light source at the 1-B position and the optical unit is greater than a distance between the light source at the 1-A position and the optical unit.

* * * * *